United States Patent
Zhang et al.

(10) Patent No.: US 10,445,152 B1
(45) Date of Patent: Oct. 15, 2019

(54) SYSTEMS AND METHODS FOR DYNAMIC REPORT GENERATION BASED ON AUTOMATIC MODELING OF COMPLEX DATA STRUCTURES

(71) Applicant: Experian Information Solutions, Inc., Costa Mesa, CA (US)

(72) Inventors: Lingyun Zhang, San Diego, CA (US); Mason L. Carpenter, Richmond, VA (US); Gregor Bonin, Wimberley, TX (US); Shanji Xiong, San Diego, CA (US); Christer DiChiara, Carslbad, CA (US); David Zaleta, San Diego, CA (US); Yaqi Tao, Richmond, WA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 821 days.

(21) Appl. No.: 14/975,440

(22) Filed: Dec. 18, 2015

Related U.S. Application Data

(60) Provisional application No. 62/094,819, filed on Dec. 19, 2014.

(51) Int. Cl.
*G06F 15/18* (2006.01)
*G06F 9/54* (2006.01)
(Continued)

(52) U.S. Cl.
CPC .............. *G06F 9/542* (2013.01); *G06F 16/23* (2019.01); *G06N 7/005* (2013.01); *G06N 20/00* (2019.01)

(58) Field of Classification Search
CPC .................................................. G06F 21/552
(Continued)

(56) References Cited

U.S. PATENT DOCUMENTS 3,316,395 A  4/1967  Lavin et al.
4,305,059 A  12/1981  Benton
(Continued)

FOREIGN PATENT DOCUMENTS

DE  91 08 341  10/1991
EP  0 350 907  1/1990
(Continued)

OTHER PUBLICATIONS

Reinartz & Kumar, On the Profitability of Long-Life Customers in a Noncontractual Setting, Journal of Marketing vol. 64 at pp. 17-35 (2000) (Year: 2000).*

(Continued)

*Primary Examiner* — David R Vincent
(74) *Attorney, Agent, or Firm* — Knobbe, Martens, Olson & Bear, LLP

(57) ABSTRACT

Various systems and methods are disclosed for accessing and traversing disparate, complex, and multi-dimensional data structures to dynamically and interactively generate reports based on automated modeling of complex and non-uniformly formatted data. Automated analysis of probabilistic functions and temporal-based data records enable non-technical users to quickly and dynamically act on time-sensitive information. In response to various user inputs, the system automatically accesses and traverses complex data structures (including, for example, frequency distribution models) calculates complex data based on the traversals, displays the calculated complex data to the user, and enters the calculated complex data into the reports.

19 Claims, 11 Drawing Sheets

(51) Int. Cl.
*G06N 7/00* (2006.01)
*G06N 20/00* (2019.01)
*G06F 16/23* (2019.01)

(58) Field of Classification Search
USPC .................................................. 706/15, 45
See application file for complete search history.

(56) References Cited

U.S. PATENT DOCUMENTS

| | | | |
|---|---|---|---|
| 4,371,739 A | 2/1983 | Lewis et al. |
| 4,398,055 A | 8/1983 | Ijaz et al. |
| 4,578,530 A | 3/1986 | Zeidler |
| 4,617,195 A | 10/1986 | Mental |
| 4,672,149 A | 6/1987 | Yoshikawa et al. |
| 4,736,294 A | 4/1988 | Gill |
| 4,754,544 A | 7/1988 | Hanak |
| 4,774,664 A | 9/1988 | Campbell et al. |
| 4,775,935 A | 10/1988 | Yourick |
| 4,827,508 A | 5/1989 | Shear |
| 4,868,570 A | 9/1989 | Davis |
| 4,872,113 A | 10/1989 | Dinerstein |
| 4,876,592 A | 10/1989 | Von Kohorn |
| 4,895,518 A | 1/1990 | Arnold |
| 4,935,870 A | 6/1990 | Burk, Jr. et al. |
| 4,947,028 A | 8/1990 | Gorog |
| 5,025,138 A | 6/1991 | Cuervo |
| 5,025,373 A | 6/1991 | Keyser, Jr. et al. |
| 5,034,807 A | 7/1991 | Von Kohorn |
| 5,056,019 A | 10/1991 | Schultz et al. |
| 5,060,153 A | 10/1991 | Nakagawa |
| 5,148,365 A | 9/1992 | Dembo |
| 5,201,010 A * | 4/1993 | Deaton .............. G06Q 20/042 |
| | | | 382/139 |
| 5,220,501 A | 6/1993 | Lawlor et al. |
| 5,247,575 A | 9/1993 | Sprague et al. |
| 5,259,766 A | 11/1993 | Sack |
| 5,262,941 A | 11/1993 | Saladin |
| 5,274,547 A | 12/1993 | Zoffel et al. |
| 5,297,031 A | 3/1994 | Gutterman et al. |
| 5,325,509 A | 6/1994 | Lautzenheiser |
| 5,336,870 A | 8/1994 | Hughes et al. |
| 5,341,429 A | 8/1994 | Stringer et al. |
| 5,454,030 A | 9/1995 | de Oliveira et al. |
| 5,468,988 A | 11/1995 | Glatfelter et al. |
| 5,504,675 A | 4/1996 | Cragun et al. |
| 5,528,701 A | 6/1996 | Aref |
| 5,555,409 A | 9/1996 | Leenstra, Sr. et al. |
| 5,563,783 A | 10/1996 | Stolfo et al. |
| 5,583,763 A | 12/1996 | Atcheson et al. |
| 5,590,038 A | 12/1996 | Pitroda |
| 5,592,560 A | 1/1997 | Deaton et al. |
| 5,611,052 A | 3/1997 | Dykstra et al. |
| 5,615,408 A | 3/1997 | Johnson |
| 5,621,201 A | 4/1997 | Langhans et al. |
| 5,629,982 A | 5/1997 | Micali |
| 5,630,127 A | 5/1997 | Moore et al. |
| 5,640,551 A | 6/1997 | Chu et al. |
| 5,640,577 A | 6/1997 | Scharmer |
| 5,655,129 A | 8/1997 | Ito |
| 5,659,731 A | 8/1997 | Gustafson |
| 5,666,528 A | 9/1997 | Thai |
| 5,679,176 A | 10/1997 | Tsuzuki et al. |
| 5,689,651 A | 11/1997 | Lozman |
| 5,696,907 A | 12/1997 | Tom |
| 5,704,029 A | 12/1997 | Wright, Jr. |
| 5,732,400 A | 3/1998 | Mandler |
| 5,737,732 A | 4/1998 | Gibson et al. |
| 5,739,512 A | 4/1998 | Tognazzini |
| 5,745,654 A | 4/1998 | Titan |
| 5,748,098 A | 5/1998 | Grace |
| 5,754,938 A | 5/1998 | Herz et al. |
| 5,768,423 A | 6/1998 | Aref et al. |
| 5,771,562 A | 6/1998 | Harvey et al. |
| 5,774,692 A | 6/1998 | Boyer et al. |
| 5,774,868 A | 6/1998 | Cragun et al. |
| 5,774,883 A | 6/1998 | Andersen |
| 5,778,405 A | 7/1998 | Ogawa |
| 5,793,972 A | 8/1998 | Shane |
| 5,797,136 A | 8/1998 | Boyer et al. |
| 5,802,142 A | 9/1998 | Browne |
| 5,812,840 A | 9/1998 | Shwartz |
| 5,819,226 A | 10/1998 | Gopinathan et al. |
| 5,822,410 A | 10/1998 | McCausland et al. |
| 5,822,750 A | 10/1998 | Jou et al. |
| 5,822,751 A | 10/1998 | Gray et al. |
| 5,825,884 A | 10/1998 | Zdepski et al. |
| 5,828,833 A | 10/1998 | Belville et al. |
| 5,835,915 A | 11/1998 | Carr et al. |
| 5,844,218 A | 12/1998 | Kawan et al. |
| 5,848,396 A | 12/1998 | Gerace |
| 5,864,830 A | 2/1999 | Armetta et al. |
| 5,870,721 A | 2/1999 | Norris |
| 5,875,108 A | 2/1999 | Hoffberg et al. |
| 5,875,236 A | 2/1999 | Jankowitz |
| 5,878,403 A | 3/1999 | DeFrancesco |
| 5,881,131 A | 3/1999 | Farris et al. |
| 5,884,287 A | 3/1999 | Edesess |
| 5,884,289 A | 3/1999 | Anderson et al. |
| 5,893,090 A | 4/1999 | Friedman et al. |
| 5,905,985 A | 5/1999 | Malloy et al. |
| 5,912,839 A | 6/1999 | Ovshinsky et al. |
| 5,915,243 A | 6/1999 | Smolen |
| 5,924,082 A | 7/1999 | Silverman et al. |
| 5,926,800 A | 7/1999 | Baronowski et al. |
| 5,930,764 A | 7/1999 | Melchione et al. |
| 5,930,774 A | 7/1999 | Chennault |
| 5,930,776 A | 7/1999 | Dykstra et al. |
| 5,940,812 A | 8/1999 | Tengel et al. |
| 5,950,172 A | 9/1999 | Klingman |
| 5,950,179 A | 9/1999 | Buchanan et al. |
| 5,956,693 A | 9/1999 | Geerlings |
| 5,963,932 A | 10/1999 | Jakobsson et al. |
| 5,966,695 A | 10/1999 | Melchione et al. |
| 5,974,396 A | 10/1999 | Anderson et al. |
| 5,978,780 A | 11/1999 | Watson |
| 5,995,947 A | 11/1999 | Fraser et al. |
| 6,009,415 A | 12/1999 | Shurling et al. |
| 6,014,688 A | 1/2000 | Venkatraman et al. |
| 6,018,723 A | 1/2000 | Siegel et al. |
| 6,021,362 A | 2/2000 | Maggard et al. |
| 6,026,368 A | 2/2000 | Brown et al. |
| 6,029,139 A | 2/2000 | Cunningham et al. |
| 6,029,149 A | 2/2000 | Dykstra et al. |
| 6,029,154 A | 2/2000 | Pettitt |
| 6,038,551 A | 3/2000 | Barlow et al. |
| 6,044,357 A | 3/2000 | Garg |
| 6,058,375 A | 5/2000 | Park |
| 6,061,658 A | 5/2000 | Chou et al. |
| 6,061,691 A | 5/2000 | Fox |
| 6,064,973 A | 5/2000 | Smith et al. |
| 6,064,987 A | 5/2000 | Walker |
| 6,064,990 A | 5/2000 | Goldsmith |
| 6,070,141 A | 5/2000 | Houvener |
| 6,070,142 A | 5/2000 | McDonough et al. |
| 6,073,140 A | 6/2000 | Morgan et al. |
| 6,073,241 A | 6/2000 | Rosenberg et al. |
| 6,088,686 A | 7/2000 | Walker et al. |
| 6,094,643 A | 7/2000 | Anderson et al. |
| 6,098,052 A | 8/2000 | Kosiba et al. |
| 6,105,007 A | 8/2000 | Norris |
| 6,115,690 A | 9/2000 | Wong |
| 6,115,693 A | 9/2000 | McDonough et al. |
| 6,119,103 A | 9/2000 | Basch et al. |
| 6,121,901 A | 9/2000 | Welch et al. |
| 6,128,599 A | 10/2000 | Walker |
| 6,128,602 A | 10/2000 | Northington et al. |
| 6,128,603 A | 10/2000 | Dent |
| 6,128,624 A | 10/2000 | Papierniak et al. |
| 6,134,548 A | 10/2000 | Gottsman et al. |
| 6,144,957 A | 11/2000 | Cohen et al. |
| 6,151,601 A | 11/2000 | Papierniak et al. |
| 6,154,729 A | 11/2000 | Cannon et al. |
| 6,178,442 B1 | 1/2001 | Yamazaki |
| 6,182,060 B1 | 1/2001 | Hedgcock et al. |

(56) References Cited

U.S. PATENT DOCUMENTS

| | | |
|---|---|---|
| 6,198,217 B1 | 3/2001 | Suzuki et al. |
| 6,202,053 B1 | 3/2001 | Christiansen et al. |
| 6,208,979 B1 | 3/2001 | Sinclair |
| 6,223,171 B1 | 4/2001 | Chaudhuri et al. |
| 6,226,408 B1 | 5/2001 | Sirosh |
| 6,233,566 B1 | 5/2001 | Levine et al. |
| 6,236,977 B1 | 5/2001 | Verba et al. |
| 6,239,352 B1 | 5/2001 | Luch |
| 6,249,770 B1 | 6/2001 | Erwin et al. |
| 6,254,000 B1 | 7/2001 | Degen et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,266,649 B1 | 7/2001 | Linden et al. |
| 6,278,055 B1 | 8/2001 | Forrest et al. |
| 6,285,983 B1 | 9/2001 | Jenkins |
| 6,285,987 B1 | 9/2001 | Roth et al. |
| 6,289,252 B1 | 9/2001 | Wilson et al. |
| 6,304,860 B1 | 10/2001 | Martin et al. |
| 6,304,869 B1 | 10/2001 | Moore et al. |
| 6,307,958 B1 | 10/2001 | Deaton et al. |
| 6,311,169 B2 | 10/2001 | Duhon |
| 6,324,524 B1 | 11/2001 | Lent et al. |
| 6,330,546 B1 | 12/2001 | Gopinathan et al. |
| 6,330,575 B1 | 12/2001 | Moore |
| 6,334,110 B1 | 12/2001 | Walter et al. |
| 6,339,769 B1 | 1/2002 | Cochrane et al. |
| 6,345,300 B1 | 2/2002 | Bakshi et al. |
| 6,366,903 B1 | 4/2002 | Agrawal et al. |
| 6,385,594 B1 | 5/2002 | Lebda et al. |
| 6,393,406 B1 | 5/2002 | Eder |
| 6,397,197 B1 | 5/2002 | Gindlesperger |
| 6,405,173 B1 | 6/2002 | Honarvar |
| 6,405,181 B2 | 6/2002 | Lent et al. |
| 6,412,012 B1 | 6/2002 | Bieganski et al. |
| 6,418,436 B1 | 7/2002 | Degen et al. |
| 6,424,956 B1 | 7/2002 | Werbos |
| 6,430,539 B1 | 8/2002 | Lazarus et al. |
| 6,442,577 B1 | 8/2002 | Britton et al. |
| 6,456,979 B1 | 9/2002 | Flagg |
| 6,457,012 B1 | 9/2002 | Jatkowski |
| 6,460,036 B1 | 10/2002 | Herz |
| 6,496,819 B1 | 12/2002 | Bello et al. |
| 6,505,176 B2 | 1/2003 | DeFrancesco, Jr. et al. |
| 6,513,018 B1 | 1/2003 | Culhane |
| 6,523,022 B1 | 2/2003 | Hobbs |
| 6,523,041 B1 | 2/2003 | Morgan et al. |
| 6,532,450 B1 | 3/2003 | Brown et al. |
| 6,542,894 B1 | 4/2003 | Lee et al. |
| 6,543,683 B1 | 4/2003 | Hoffman |
| 6,549,919 B2 * | 4/2003 | Lambert .................. G06F 17/18 707/695 |
| 6,567,791 B2 | 5/2003 | Lent et al. |
| 6,574,623 B1 | 6/2003 | Laung et al. |
| 6,597,775 B2 | 7/2003 | Lawyer et al. |
| 6,598,030 B1 | 7/2003 | Siegel et al. |
| 6,601,234 B1 | 7/2003 | Bowman-Amuah |
| 6,611,816 B2 | 8/2003 | Lebda et al. |
| 6,615,193 B1 | 9/2003 | Kingdon et al. |
| 6,615,247 B1 | 9/2003 | Murphy |
| 6,622,266 B1 | 9/2003 | Goddard et al. |
| 6,623,529 B1 | 9/2003 | Lakritz |
| 6,631,496 B1 | 10/2003 | Li et al. |
| 6,640,215 B1 | 10/2003 | Galperin et al. |
| 6,651,220 B1 | 11/2003 | Penteroudakis et al. |
| 6,654,727 B2 | 11/2003 | Tilton |
| 6,658,393 B1 | 12/2003 | Basch et al. |
| 6,665,715 B1 | 12/2003 | Houri |
| 6,687,713 B2 | 2/2004 | Mattson et al. |
| 6,708,166 B1 | 3/2004 | Dysart et al. |
| 6,714,918 B2 | 3/2004 | Hillmer et al. |
| 6,735,572 B2 | 5/2004 | Landesmann |
| 6,748,426 B1 | 6/2004 | Shaffer et al. |
| 6,757,740 B1 | 6/2004 | Parekh et al. |
| 6,766,327 B2 | 7/2004 | Morgan, Jr. et al. |
| 6,801,909 B2 | 10/2004 | Delgado et al. |
| 6,804,346 B1 | 10/2004 | Mewhinney |
| 6,804,701 B2 | 10/2004 | Muret et al. |
| 6,807,533 B1 | 10/2004 | Land et al. |
| 6,823,319 B1 | 11/2004 | Lynch et al. |
| 6,836,764 B1 | 12/2004 | Hucal |
| 6,839,682 B1 | 1/2005 | Blume et al. |
| 6,839,690 B1 | 1/2005 | Foth et al. |
| 6,850,606 B2 | 2/2005 | Lawyer et al. |
| 6,859,785 B2 | 2/2005 | Case |
| 6,865,566 B2 | 3/2005 | Serrano-Morales et al. |
| 6,873,972 B1 | 3/2005 | Marcial et al. |
| 6,873,979 B2 | 3/2005 | Fishman et al. |
| 6,901,406 B2 | 5/2005 | Nabe et al. |
| 6,910,624 B1 | 6/2005 | Natsuno |
| 6,915,269 B1 | 7/2005 | Shapiro et al. |
| 6,925,441 B1 | 8/2005 | Jones, III et al. |
| 6,959,281 B1 | 10/2005 | Freeling et al. |
| 6,965,889 B2 | 11/2005 | Serrano-Morales et al. |
| 6,970,830 B1 | 11/2005 | Samra et al. |
| 6,983,379 B1 | 1/2006 | Spalink et al. |
| 6,983,478 B1 | 1/2006 | Grauch et al. |
| 6,985,882 B1 | 1/2006 | Del Sesto |
| 6,985,887 B1 | 1/2006 | Sunstein et al. |
| 6,991,159 B2 | 1/2006 | Zenou |
| 6,993,493 B1 | 1/2006 | Galperin et al. |
| 6,999,941 B1 | 2/2006 | Agarwal |
| 7,003,504 B1 | 2/2006 | Angus et al. |
| 7,003,792 B1 | 2/2006 | Yuen |
| 7,028,052 B2 | 4/2006 | Chapman et al. |
| 7,031,945 B1 | 4/2006 | Donner |
| 7,039,176 B2 | 5/2006 | Borodow et al. |
| 7,039,607 B2 | 5/2006 | Watarai et al. |
| 7,047,251 B2 | 5/2006 | Reed et al. |
| 7,050,982 B2 | 5/2006 | Sheinson et al. |
| 7,050,986 B1 | 5/2006 | Vance et al. |
| 7,050,989 B1 | 5/2006 | Hurt et al. |
| 7,054,828 B2 | 5/2006 | Heching et al. |
| 7,069,240 B2 | 6/2006 | Spero et al. |
| 7,072,963 B2 | 7/2006 | Anderson et al. |
| 7,076,462 B1 | 7/2006 | Nelson et al. |
| 7,076,475 B2 | 7/2006 | Honarvar et al. |
| 7,082,435 B1 | 7/2006 | Guzman et al. |
| 7,092,898 B1 | 8/2006 | Mattick et al. |
| 7,117,172 B1 | 10/2006 | Black |
| 7,133,935 B2 | 11/2006 | Hedy |
| 7,136,448 B1 | 11/2006 | Venkataperumal et al. |
| 7,139,734 B2 | 11/2006 | Nathans et al. |
| 7,143,063 B2 | 11/2006 | Lent |
| 7,152,053 B2 | 12/2006 | Serrano-Morales et al. |
| 7,165,036 B2 | 1/2007 | Kruk et al. |
| 7,165,037 B2 | 1/2007 | Lazarus et al. |
| 7,184,974 B2 | 2/2007 | Shishido |
| 7,185,016 B1 | 2/2007 | Rasmussen |
| 7,191,144 B2 | 3/2007 | White |
| 7,200,602 B2 | 4/2007 | Jonas |
| 7,206,768 B1 | 4/2007 | deGroeve et al. |
| 7,212,995 B2 | 5/2007 | Schulkins |
| 7,234,156 B2 | 6/2007 | French et al. |
| 7,236,950 B2 | 6/2007 | Savage et al. |
| 7,240,059 B2 | 7/2007 | Bayliss et al. |
| 7,249,048 B1 | 7/2007 | O'Flaherty |
| 7,249,114 B2 | 7/2007 | Burchetta et al. |
| 7,263,506 B2 | 8/2007 | Lee et al. |
| 7,275,083 B1 | 9/2007 | Seibel et al. |
| 7,277,869 B2 | 10/2007 | Starkman |
| 7,277,875 B2 | 10/2007 | Serrano-Morales et al. |
| 7,277,900 B1 | 10/2007 | Ganesh et al. |
| 7,283,974 B2 | 10/2007 | Katz et al. |
| 7,296,734 B2 | 11/2007 | Pliha |
| 7,308,418 B2 | 12/2007 | Malek et al. |
| 7,313,538 B2 | 12/2007 | Wilmes et al. |
| 7,313,618 B2 | 12/2007 | Braemer et al. |
| 7,314,166 B2 | 1/2008 | Anderson et al. |
| 7,314,167 B1 | 1/2008 | Kiliccote |
| 7,324,962 B1 | 1/2008 | Valliani et al. |
| 7,328,169 B2 | 2/2008 | Temares et al. |
| 7,337,133 B1 | 2/2008 | Bezos et al. |
| 7,343,149 B2 | 3/2008 | Benco |

(56) References Cited

U.S. PATENT DOCUMENTS

| | | |
|---|---|---|
| 7,346,551 B2 | 3/2008 | Pe Jimenez et al. |
| 7,346,573 B1 | 3/2008 | Cobrinik et al. |
| 7,360,251 B2 | 4/2008 | Spalink et al. |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,373,324 B1 | 5/2008 | Engin et al. |
| 7,376,603 B1 | 5/2008 | Mayr et al. |
| 7,376,618 B1 | 5/2008 | Anderson et al. |
| 7,376,714 B1 | 5/2008 | Gerken |
| 7,379,880 B1 | 5/2008 | Pathria et al. |
| 7,383,227 B2 | 6/2008 | Weinflash et al. |
| 7,386,786 B2 | 6/2008 | Davis et al. |
| 7,392,203 B2 | 6/2008 | Edison et al. |
| 7,392,216 B1 | 6/2008 | Palmgren et al. |
| 7,395,273 B2 | 7/2008 | Khan et al. |
| 7,403,923 B2 | 7/2008 | Elliott et al. |
| 7,403,942 B1 | 7/2008 | Bayliss |
| 7,409,362 B2 | 8/2008 | Calabria |
| 7,418,431 B1 | 8/2008 | Nies et al. |
| 7,421,322 B1 | 9/2008 | Silversmith et al. |
| 7,424,439 B1 | 9/2008 | Fayyad et al. |
| 7,428,509 B2 | 9/2008 | Klebanoff |
| 7,428,526 B2 | 9/2008 | Miller et al. |
| 7,433,855 B2 | 10/2008 | Gavan et al. |
| 7,444,302 B2 | 10/2008 | Hu et al. |
| 7,458,508 B1 | 12/2008 | Shao et al. |
| 7,467,127 B1 | 12/2008 | Baccash et al. |
| 7,467,401 B2 | 12/2008 | Cicchitto |
| 7,472,088 B2 | 12/2008 | Taylor et al. |
| 7,499,868 B2 | 3/2009 | Galperin et al. |
| 7,505,938 B2 | 3/2009 | Lang et al. |
| 7,509,117 B2 | 3/2009 | Yum |
| 7,512,221 B2 | 3/2009 | Toms |
| 7,516,149 B2 | 4/2009 | Motwani et al. |
| 7,529,698 B2 | 5/2009 | Joao |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,542,993 B2 | 6/2009 | Satterfield et al. |
| 7,546,266 B2 | 6/2009 | Beirne et al. |
| 7,548,886 B2 | 6/2009 | Kirkland et al. |
| 7,552,089 B2 | 6/2009 | Bruer et al. |
| 7,556,192 B2 | 7/2009 | Wokaty, Jr. |
| 7,562,184 B2 | 7/2009 | Henmi et al. |
| 7,571,139 B1 | 8/2009 | Giordano et al. |
| 7,575,157 B2 | 8/2009 | Barnhardt et al. |
| 7,580,856 B1 | 8/2009 | Pliha |
| 7,581,112 B2 | 8/2009 | Brown et al. |
| 7,584,126 B1 | 9/2009 | White |
| 7,584,146 B1 | 9/2009 | Duhon |
| 7,590,589 B2 | 9/2009 | Hoffberg |
| 7,593,893 B1 | 9/2009 | Ladd et al. |
| 7,596,512 B1 | 9/2009 | Raines et al. |
| 7,596,716 B2 | 9/2009 | Frost et al. |
| 7,606,778 B2 | 10/2009 | Dewar |
| 7,610,216 B1 | 10/2009 | May et al. |
| 7,610,243 B2 | 10/2009 | Haggerty et al. |
| 7,610,257 B1 | 10/2009 | Abrahams |
| 7,613,671 B2 | 11/2009 | Serrano-Morales et al. |
| 7,620,592 B2 | 11/2009 | O'Mara et al. |
| 7,620,596 B2 | 11/2009 | Knudson et al. |
| 7,623,844 B2 | 11/2009 | Herrmann et al. |
| 7,624,068 B1 | 11/2009 | Heasley et al. |
| 7,653,592 B1 | 1/2010 | Flaxman et al. |
| 7,653,593 B2 | 1/2010 | Zarikian et al. |
| 7,657,471 B1 | 2/2010 | Sankaran et al. |
| 7,657,540 B1 | 2/2010 | Bayliss |
| 7,668,769 B2 | 2/2010 | Baker et al. |
| 7,668,840 B2 | 2/2010 | Bayliss et al. |
| 7,672,865 B2 | 3/2010 | Kumar et al. |
| 7,676,410 B2 | 3/2010 | Petralia |
| 7,676,418 B1 | 3/2010 | Chung et al. |
| 7,676,751 B2 | 3/2010 | Allen et al. |
| 7,686,214 B1 | 3/2010 | Shao et al. |
| 7,689,494 B2 | 3/2010 | Torre et al. |
| 7,689,504 B2 | 3/2010 | Warren et al. |
| 7,689,505 B2 | 3/2010 | Kasower |
| 7,690,032 B1 | 3/2010 | Peirce |
| 7,693,787 B2 | 4/2010 | Provinse |
| 7,698,163 B2 | 4/2010 | Reed et al. |
| 7,702,550 B2 | 4/2010 | Perg et al. |
| 7,707,059 B2 | 4/2010 | Reed et al. |
| 7,707,102 B2 | 4/2010 | Rothstein |
| 7,708,190 B2 | 5/2010 | Brandt et al. |
| 7,711,635 B2 | 5/2010 | Steele et al. |
| 7,711,636 B2 | 5/2010 | Robida et al. |
| 7,720,846 B1 | 5/2010 | Bayliss |
| 7,725,300 B2 | 5/2010 | Pinto et al. |
| 7,734,523 B1 | 6/2010 | Cui et al. |
| 7,734,539 B2 | 6/2010 | Ghosh et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,761,379 B2 | 7/2010 | Zoldi et al. |
| 7,761,384 B2 | 7/2010 | Madhogarhia |
| 7,769,998 B2 | 8/2010 | Lynch et al. |
| 7,778,885 B1 | 8/2010 | Semprevivo et al. |
| 7,783,515 B1 | 8/2010 | Kumar et al. |
| 7,783,562 B1 | 8/2010 | Ellis |
| 7,788,147 B2 | 8/2010 | Haggerty et al. |
| 7,788,152 B2 | 8/2010 | Haggerty et al. |
| 7,792,732 B2 | 9/2010 | Haggerty et al. |
| 7,793,835 B1 | 9/2010 | Coggeshall et al. |
| 7,797,252 B2 | 9/2010 | Rosskamm et al. |
| 7,801,811 B1 | 9/2010 | Merrell et al. |
| 7,802,104 B2 | 9/2010 | Dickinson |
| 7,805,345 B2 | 9/2010 | Abrahams et al. |
| 7,805,362 B1 | 9/2010 | Merrell et al. |
| 7,814,004 B2 | 10/2010 | Haggerty et al. |
| 7,818,231 B2 | 10/2010 | Rajan |
| 7,822,665 B2 | 10/2010 | Haggerty et al. |
| 7,827,115 B2 | 11/2010 | Weller et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,844,534 B2 | 11/2010 | Haggerty et al. |
| 7,848,972 B1 | 12/2010 | Sharma |
| 7,848,978 B2 | 12/2010 | Imrey et al. |
| 7,848,987 B2 | 12/2010 | Haig |
| 7,849,004 B2 | 12/2010 | Choudhuri et al. |
| 7,853,518 B2 | 12/2010 | Cagan |
| 7,853,998 B2 | 12/2010 | Blaisdell et al. |
| 7,856,386 B2 | 12/2010 | Hazlehurst et al. |
| 7,856,397 B2 | 12/2010 | Whipple et al. |
| 7,856,494 B2 | 12/2010 | Kulkarni |
| 7,860,786 B2 | 12/2010 | Blackburn et al. |
| 7,870,078 B2 | 1/2011 | Clark et al. |
| 7,877,304 B1 | 1/2011 | Coulter |
| 7,877,320 B1 | 1/2011 | Downey |
| 7,877,322 B2 | 1/2011 | Nathans et al. |
| 7,890,420 B2 | 2/2011 | Haggerty et al. |
| 7,899,750 B1 | 3/2011 | Klieman et al. |
| 7,904,366 B2 | 3/2011 | Pogust |
| 7,908,242 B1 | 3/2011 | Achanta |
| 7,912,770 B2 | 3/2011 | Haggerty et al. |
| 7,912,842 B1 | 3/2011 | Bayliss et al. |
| 7,912,865 B2 | 3/2011 | Akerman et al. |
| 7,925,549 B2 | 4/2011 | Looney et al. |
| 7,925,582 B1 | 4/2011 | Kornegay et al. |
| 7,930,242 B2 | 4/2011 | Morris et al. |
| 7,930,285 B2 | 4/2011 | Abraham et al. |
| 7,941,363 B2 | 5/2011 | Tanaka et al. |
| 7,954,698 B1 | 6/2011 | Pliha |
| 7,958,126 B2 | 6/2011 | Schachter |
| 7,962,404 B1 | 6/2011 | Metzger, II et al. |
| 7,966,255 B2 | 6/2011 | Wong et al. |
| 7,970,676 B2 | 6/2011 | Feinstein |
| 7,970,701 B2 | 6/2011 | Lewis et al. |
| 7,974,860 B1 | 7/2011 | Travis |
| 7,983,976 B2 | 7/2011 | Nafeh et al. |
| 7,991,666 B2 | 8/2011 | Haggerty et al. |
| 7,991,677 B2 | 8/2011 | Haggerty et al. |
| 7,991,688 B2 | 8/2011 | Phelan et al. |

(56) References Cited

U.S. PATENT DOCUMENTS

| | | |
|---|---|---|
| 7,991,689 B1 | 8/2011 | Brunzell et al. |
| 7,996,521 B2 | 8/2011 | Chamberlain et al. |
| 8,001,042 B1 | 8/2011 | Brunzell et al. |
| 8,005,712 B2 | 8/2011 | von Davier et al. |
| 8,005,759 B2 | 8/2011 | Hirtenstein et al. |
| 8,006,261 B1 | 8/2011 | Haberman et al. |
| 8,015,045 B2 | 9/2011 | Galperin et al. |
| 8,019,843 B2 | 9/2011 | Cash et al. |
| 8,024,245 B2 | 9/2011 | Haggerty et al. |
| 8,024,263 B2 | 9/2011 | Zarikian et al. |
| 8,024,264 B2 | 9/2011 | Chaudhuri et al. |
| 8,024,778 B2 | 9/2011 | Cash et al. |
| 8,036,979 B1 | 10/2011 | Torrez et al. |
| 8,046,271 B2 | 10/2011 | Jimenez et al. |
| 8,060,424 B2 | 11/2011 | Kasower |
| 8,064,586 B2 | 11/2011 | Shaffer et al. |
| 8,065,233 B2 | 11/2011 | Lee et al. |
| 8,065,234 B2 | 11/2011 | Liao et al. |
| 8,073,752 B2 | 12/2011 | Haggerty et al. |
| 8,073,768 B2 | 12/2011 | Haggerty et al. |
| 8,078,453 B2 | 12/2011 | Shaw |
| 8,078,524 B2 | 12/2011 | Crawford et al. |
| 8,078,528 B1 | 12/2011 | Vicente et al. |
| 8,082,202 B2 | 12/2011 | Weiss |
| 8,086,509 B2 | 12/2011 | Haggerty et al. |
| 8,086,524 B1 | 12/2011 | Craig et al. |
| 8,095,443 B2 | 1/2012 | DeBie |
| 8,099,356 B2 | 1/2012 | Feinstein et al. |
| 8,103,530 B2 | 1/2012 | Quiring et al. |
| 8,104,671 B2 | 1/2012 | Besecker et al. |
| 8,104,679 B2 | 1/2012 | Brown |
| 8,121,918 B2 | 2/2012 | Haggerty et al. |
| 8,126,805 B2 | 2/2012 | Sulkowski et al. |
| 8,127,982 B1 | 3/2012 | Casey et al. |
| 8,131,614 B2 | 3/2012 | Haggerty et al. |
| 8,131,639 B2 | 3/2012 | Haggerty et al. |
| 8,135,642 B1 | 3/2012 | Krause |
| 8,145,754 B2 | 3/2012 | Chamberlain et al. |
| 8,160,960 B1 | 4/2012 | Fei et al. |
| 8,161,104 B2 | 4/2012 | Tomkow |
| 8,170,938 B2 | 5/2012 | Haggerty et al. |
| 8,175,945 B2 | 5/2012 | Haggerty et al. |
| 8,180,654 B2 | 5/2012 | Berkman et al. |
| 8,185,408 B2 | 5/2012 | Baldwin, Jr. et al. |
| 8,195,550 B2 | 6/2012 | Haggerty et al. |
| 8,204,774 B2 | 6/2012 | Chwast et al. |
| 8,209,250 B2 | 6/2012 | Bradway et al. |
| 8,214,238 B1 | 7/2012 | Fairfield et al. |
| 8,214,262 B1 | 7/2012 | Semprevivo et al. |
| 8,219,464 B2 | 7/2012 | Inghelbrecht et al. |
| 8,219,535 B1 | 7/2012 | Kobori et al. |
| 8,234,498 B2 | 7/2012 | Britti et al. |
| 8,239,130 B1 | 8/2012 | Upstill et al. |
| 8,271,378 B2 | 9/2012 | Chaudhuri et al. |
| 8,280,805 B1 | 10/2012 | Abrahams et al. |
| 8,285,577 B1 | 10/2012 | Galperin et al. |
| 8,285,656 B1 | 10/2012 | Chang et al. |
| 8,290,840 B2 | 10/2012 | Kasower |
| 8,296,213 B2 | 10/2012 | Haggerty et al. |
| 8,296,229 B1 | 10/2012 | Yellin et al. |
| 8,301,574 B2 | 10/2012 | Kilger et al. |
| 8,306,890 B2 | 11/2012 | Haggerty et al. |
| 8,315,933 B2 | 11/2012 | Haggerty et al. |
| 8,315,942 B2 | 11/2012 | Haggerty et al. |
| 8,315,943 B2 | 11/2012 | Torrez et al. |
| 8,321,335 B1 | 11/2012 | Bramlage et al. |
| 8,326,671 B2 | 12/2012 | Haggerty et al. |
| 8,326,672 B2 | 12/2012 | Haggerty et al. |
| 8,326,760 B2 | 12/2012 | Ma et al. |
| 8,340,685 B2 | 12/2012 | Cochran et al. |
| 8,341,073 B1 | 12/2012 | Bramlage et al. |
| 8,352,343 B2 | 1/2013 | Haggerty et al. |
| 8,364,518 B1 | 1/2013 | Blake et al. |
| 8,364,582 B2 | 1/2013 | Haggerty et al. |
| 8,364,588 B2 | 1/2013 | Celka et al. |
| 8,386,377 B1 | 2/2013 | Xiong et al. |
| 8,392,334 B2 | 3/2013 | Hirtenstein et al. |
| 8,401,889 B2 | 3/2013 | Chwast et al. |
| 8,417,587 B2 | 4/2013 | Jimenez et al. |
| 8,417,612 B2 | 4/2013 | Chatterji et al. |
| 8,433,512 B1 | 4/2013 | Lopatenko et al. |
| 8,438,105 B2 | 5/2013 | Haggerty et al. |
| 8,458,074 B2 | 6/2013 | Showalter |
| 8,468,198 B2 | 6/2013 | Tomkow |
| 8,473,354 B2 | 6/2013 | Psota et al. |
| 8,478,673 B2 | 7/2013 | Haggerty et al. |
| 8,489,482 B2 | 7/2013 | Haggerty et al. |
| 8,510,184 B2 | 8/2013 | Imrev et al. |
| 8,510,189 B2 | 8/2013 | Imrey et al. |
| 8,515,828 B1 | 8/2013 | Wolf et al. |
| 8,515,862 B2 | 8/2013 | Zhang et al. |
| 8,533,322 B2 | 9/2013 | Chamberlain et al. |
| 8,560,434 B2 | 10/2013 | Morris et al. |
| 8,566,029 B1 | 10/2013 | Lopatenko et al. |
| 8,566,167 B2 | 10/2013 | Munjal |
| 8,589,069 B1 | 11/2013 | Lehman |
| 8,589,208 B2 | 11/2013 | Kruger et al. |
| 8,595,101 B1 | 11/2013 | Daukas et al. |
| 8,600,854 B2 | 12/2013 | Mayr et al. |
| 8,606,626 B1 | 12/2013 | DeSoto et al. |
| 8,606,666 B1 | 12/2013 | Courbage et al. |
| 8,620,579 B1 | 12/2013 | Upstill et al. |
| 8,626,560 B1 | 1/2014 | Anderson |
| 8,626,618 B2 | 1/2014 | Psota et al. |
| 8,626,646 B2 | 1/2014 | Torrez et al. |
| 8,630,929 B2 | 1/2014 | Haggerty et al. |
| 8,639,920 B2 | 1/2014 | Stack et al. |
| 8,666,885 B1 | 3/2014 | Bramlage et al. |
| 8,682,770 B2 | 3/2014 | Haggerty et al. |
| 8,694,390 B2 | 4/2014 | Imrey et al. |
| 8,694,403 B2 | 4/2014 | Haggerty et al. |
| 8,706,596 B2 | 4/2014 | Cohen et al. |
| 8,732,004 B1 | 5/2014 | Ramos et al. |
| 8,738,515 B2 | 5/2014 | Chaudhuri et al. |
| 8,744,944 B2 | 6/2014 | Haggerty et al. |
| 8,762,053 B1 | 6/2014 | Lehman |
| 8,768,826 B2 | 7/2014 | Imrey et al. |
| 8,775,290 B2 | 7/2014 | Haggerty et al. |
| 8,775,299 B2 | 7/2014 | Achanta et al. |
| 8,775,301 B2 | 7/2014 | Haggerty et al. |
| 8,781,877 B2 | 7/2014 | Kruger et al. |
| 8,781,933 B2 | 7/2014 | Haggerty et al. |
| 8,781,951 B2 | 7/2014 | Lewis et al. |
| 8,781,953 B2 | 7/2014 | Kasower |
| 8,781,975 B2 | 7/2014 | Bennett et al. |
| 8,788,388 B2 | 7/2014 | Chatterji et al. |
| 8,805,805 B1 | 8/2014 | Kobori et al. |
| 8,825,544 B2 | 9/2014 | Imrey et al. |
| 8,930,251 B2 | 1/2015 | DeBie |
| 8,938,432 B2 | 1/2015 | Rossmark et al. |
| 8,966,649 B2 | 2/2015 | Stack et al. |
| 9,026,088 B2 | 5/2015 | Groenjes |
| 9,057,616 B1 | 6/2015 | Lopatenko et al. |
| 9,057,617 B1 | 6/2015 | Lopatenko et al. |
| 9,058,340 B1 | 6/2015 | Chamberlain et al. |
| 9,063,226 B2 | 6/2015 | Zheng et al. |
| 9,143,541 B1 | 9/2015 | Szamonek et al. |
| 9,147,042 B1 | 9/2015 | Haller et al. |
| 9,152,727 B1 | 10/2015 | Balducci et al. |
| 9,251,541 B2 | 2/2016 | Celka et al. |
| 9,378,500 B2 | 6/2016 | Jimenez et al. |
| 9,483,606 B1 | 11/2016 | Dean et al. |
| 9,508,092 B1 | 11/2016 | De Soto et al. |
| 9,509,711 B1 | 11/2016 | Keanini |
| 9,553,936 B2 | 1/2017 | Dijk et al. |
| 9,563,916 B1 | 2/2017 | Torrez et al. |
| 9,576,030 B1 | 2/2017 | Kapczynski et al. |
| 9,595,051 B2 | 3/2017 | Stack et al. |
| 9,619,579 B1 | 4/2017 | Courbage et al. |
| 9,652,802 B1 | 5/2017 | Kasower |
| 9,870,589 B1 | 1/2018 | Arnold et al. |
| 9,916,596 B1 | 3/2018 | DeSoto et al. |
| 9,916,621 B1 | 3/2018 | Wasser et al. |
| 10,019,508 B1 | 7/2018 | Kapczynski |

(56) References Cited

U.S. PATENT DOCUMENTS

| | | |
|---|---|---|
| 10,078,868 B1 | 9/2018 | Courbage et al. |
| 10,102,536 B1 | 10/2018 | Hickman et al. |
| 10,121,194 B1 | 11/2018 | Torrez et al. |
| 2001/0013011 A1 | 8/2001 | Day et al. |
| 2001/0014868 A1 | 8/2001 | Herz et al. |
| 2001/0014878 A1 | 8/2001 | Mitra et al. |
| 2001/0016833 A1 | 8/2001 | Everling et al. |
| 2001/0027413 A1 | 10/2001 | Bhutta |
| 2001/0029470 A1 | 10/2001 | Schultz et al. |
| 2001/0034631 A1 | 10/2001 | Kiselik |
| 2001/0037332 A1 | 11/2001 | Miller et al. |
| 2001/0039523 A1 | 11/2001 | Iwamoto |
| 2001/0049620 A1 | 12/2001 | Blasko |
| 2002/0019804 A1 | 2/2002 | Sutton |
| 2002/0023051 A1 | 2/2002 | Kunzle et al. |
| 2002/0023143 A1 | 2/2002 | Stephenson et al. |
| 2002/0026411 A1 | 2/2002 | Nathans et al. |
| 2002/0029162 A1 | 3/2002 | Mascarenhas |
| 2002/0035511 A1 | 3/2002 | Haji et al. |
| 2002/0046096 A1 | 4/2002 | Srinivasan et al. |
| 2002/0049626 A1 | 4/2002 | Mathis et al. |
| 2002/0049701 A1 | 4/2002 | Nabe et al. |
| 2002/0049738 A1 | 4/2002 | Epstein |
| 2002/0052836 A1 | 5/2002 | Galperin et al. |
| 2002/0052841 A1 | 5/2002 | Guthrie et al. |
| 2002/0055869 A1 | 5/2002 | Hegg |
| 2002/0069122 A1 | 6/2002 | Yun et al. |
| 2002/0072927 A1 | 6/2002 | Phelan et al. |
| 2002/0077964 A1 | 6/2002 | Brody et al. |
| 2002/0082892 A1 | 6/2002 | Raffel et al. |
| 2002/0087460 A1 | 7/2002 | Hornung |
| 2002/0091706 A1 | 7/2002 | Anderson et al. |
| 2002/0095360 A1 | 7/2002 | Joao |
| 2002/0099628 A1 | 7/2002 | Takaoka et al. |
| 2002/0099641 A1 | 7/2002 | Mills et al. |
| 2002/0099649 A1 | 7/2002 | Lee et al. |
| 2002/0099824 A1 | 7/2002 | Bender et al. |
| 2002/0099936 A1 | 7/2002 | Kou et al. |
| 2002/0111845 A1 | 8/2002 | Chong |
| 2002/0119824 A1 | 8/2002 | Allen |
| 2002/0120504 A1 | 8/2002 | Gould et al. |
| 2002/0123928 A1 | 9/2002 | Eldering et al. |
| 2002/0128960 A1 | 9/2002 | Lambiotte et al. |
| 2002/0128962 A1 | 9/2002 | Kasower |
| 2002/0129368 A1 | 9/2002 | Schlack et al. |
| 2002/0133444 A1 | 9/2002 | Sankaran et al. |
| 2002/0138297 A1 | 9/2002 | Lee |
| 2002/0138331 A1 | 9/2002 | Hosea et al. |
| 2002/0138333 A1 | 9/2002 | DeCotiis et al. |
| 2002/0138334 A1 | 9/2002 | DeCotiis et al. |
| 2002/0138417 A1 | 9/2002 | Lawrence |
| 2002/0143661 A1 | 10/2002 | Tumulty et al. |
| 2002/0147623 A1 | 10/2002 | Rifaat |
| 2002/0147669 A1 | 10/2002 | Taylor et al. |
| 2002/0147695 A1 | 10/2002 | Khedkar et al. |
| 2002/0156676 A1 | 10/2002 | Ahrens et al. |
| 2002/0161496 A1 | 10/2002 | Yamaki |
| 2002/0161664 A1 | 10/2002 | Shaya et al. |
| 2002/0161711 A1 | 10/2002 | Sartor et al. |
| 2002/0165757 A1 | 11/2002 | Lisser |
| 2002/0169747 A1 | 11/2002 | Chapman et al. |
| 2002/0173984 A1 | 11/2002 | Robertson et al. |
| 2002/0173994 A1 | 11/2002 | Ferguson, III |
| 2002/0184255 A1 | 12/2002 | Edd et al. |
| 2002/0188544 A1 | 12/2002 | Wizon et al. |
| 2002/0194099 A1 | 12/2002 | Weiss |
| 2002/0194103 A1 | 12/2002 | Nabe |
| 2002/0194140 A1 | 12/2002 | Makuck |
| 2002/0198824 A1 | 12/2002 | Cook |
| 2003/0000568 A1 | 1/2003 | Gonsiorawski |
| 2003/0002639 A1 | 1/2003 | Huie |
| 2003/0004787 A1 | 1/2003 | Tripp et al. |
| 2003/0004855 A1 | 1/2003 | Dutta et al. |
| 2003/0004865 A1 | 1/2003 | Kinoshita |
| 2003/0009368 A1 | 1/2003 | Kitts |
| 2003/0009393 A1 | 1/2003 | Norris et al. |
| 2003/0009418 A1 | 1/2003 | Green et al. |
| 2003/0009426 A1 | 1/2003 | Ruiz-Sanchez |
| 2003/0018549 A1 | 1/2003 | Fei et al. |
| 2003/0018578 A1 | 1/2003 | Schultz |
| 2003/0018769 A1 | 1/2003 | Foulger et al. |
| 2003/0023489 A1 | 1/2003 | McGuire et al. |
| 2003/0033242 A1 | 2/2003 | Lynch et al. |
| 2003/0033261 A1 | 2/2003 | Knegendorf |
| 2003/0041031 A1 | 2/2003 | Hedy |
| 2003/0046222 A1 | 3/2003 | Bard et al. |
| 2003/0060284 A1 | 3/2003 | Hamalainen et al. |
| 2003/0061132 A1 | 3/2003 | Yu et al. |
| 2003/0061163 A1 | 3/2003 | Duffield |
| 2003/0065563 A1 | 4/2003 | Elliott et al. |
| 2003/0069839 A1 | 4/2003 | Whittington et al. |
| 2003/0078877 A1 | 4/2003 | Beirne et al. |
| 2003/0093289 A1 | 5/2003 | Thornley et al. |
| 2003/0093311 A1 | 5/2003 | Knowlson |
| 2003/0093366 A1 | 5/2003 | Halper et al. |
| 2003/0097320 A1 | 5/2003 | Gordon |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0105696 A1 | 6/2003 | Kalotay et al. |
| 2003/0105728 A1 | 6/2003 | Yano et al. |
| 2003/0110111 A1 | 6/2003 | Nalebuff et al. |
| 2003/0110293 A1 | 6/2003 | Friedman et al. |
| 2003/0113727 A1 | 6/2003 | Girn et al. |
| 2003/0115080 A1 | 6/2003 | Kasravi et al. |
| 2003/0115133 A1 | 6/2003 | Bian |
| 2003/0120591 A1 | 6/2003 | Birkhead et al. |
| 2003/0135451 A1 | 7/2003 | O'Brien et al. |
| 2003/0139986 A1 | 7/2003 | Roberts |
| 2003/0144950 A1 | 7/2003 | O'Brien et al. |
| 2003/0149610 A1 | 8/2003 | Rowan et al. |
| 2003/0158751 A1 | 8/2003 | Suresh et al. |
| 2003/0158776 A1 | 8/2003 | Landesmann |
| 2003/0163708 A1 | 8/2003 | Tang |
| 2003/0164497 A1 | 9/2003 | Carcia et al. |
| 2003/0167218 A1 | 9/2003 | Field et al. |
| 2003/0171942 A1 | 9/2003 | Gaito |
| 2003/0182214 A1 | 9/2003 | Taylor |
| 2003/0195830 A1 | 10/2003 | Merkoulovitch et al. |
| 2003/0195859 A1 | 10/2003 | Lawrence |
| 2003/0200151 A1 | 10/2003 | Ellenson et al. |
| 2003/0205845 A1 | 11/2003 | Pichler et al. |
| 2003/0208362 A1 | 11/2003 | Enthoven et al. |
| 2003/0208428 A1 | 11/2003 | Raynes et al. |
| 2003/0212618 A1 | 11/2003 | Keyes et al. |
| 2003/0212654 A1 | 11/2003 | Harper et al. |
| 2003/0216965 A1 | 11/2003 | Libman |
| 2003/0219709 A1 | 11/2003 | Olenick et al. |
| 2003/0225656 A1 | 12/2003 | Aberman et al. |
| 2003/0225692 A1 | 12/2003 | Bosch et al. |
| 2003/0225742 A1 | 12/2003 | Tenner et al. |
| 2003/0229892 A1 | 12/2003 | Sardera |
| 2003/0233278 A1 | 12/2003 | Marshall |
| 2003/0233323 A1 | 12/2003 | Bilski et al. |
| 2003/0233370 A1 | 12/2003 | Barabas et al. |
| 2003/0233655 A1 | 12/2003 | Gutta et al. |
| 2003/0236738 A1 | 12/2003 | Lange et al. |
| 2004/0002916 A1 | 1/2004 | Timmerman et al. |
| 2004/0006536 A1 | 1/2004 | Kawashima et al. |
| 2004/0010443 A1 | 1/2004 | May et al. |
| 2004/0019518 A1 | 1/2004 | Abraham et al. |
| 2004/0023637 A1 | 2/2004 | Johnson et al. |
| 2004/0024692 A1 | 2/2004 | Turbeville et al. |
| 2004/0029311 A1 | 2/2004 | Snyder et al. |
| 2004/0030649 A1 | 2/2004 | Nelson et al. |
| 2004/0030667 A1 | 2/2004 | Xu et al. |
| 2004/0033375 A1 | 2/2004 | Mori |
| 2004/0034570 A1 | 2/2004 | Davis et al. |
| 2004/0039681 A1 | 2/2004 | Cullen et al. |
| 2004/0039688 A1 | 2/2004 | Sulkowski et al. |
| 2004/0044615 A1 | 3/2004 | Xue et al. |
| 2004/0044617 A1 | 3/2004 | Lu |
| 2004/0046497 A1 | 3/2004 | Shaepkens et al. |
| 2004/0049452 A1 | 3/2004 | Blagg |

(56) References Cited

U.S. PATENT DOCUMENTS

| | | |
|---|---|---|
| 2004/0054619 A1 | 3/2004 | Watson et al. |
| 2004/0059626 A1 | 3/2004 | Smallwood |
| 2004/0059653 A1 | 3/2004 | Verkuylen et al. |
| 2004/0062213 A1 | 4/2004 | Koss |
| 2004/0078248 A1 | 4/2004 | Altschuler |
| 2004/0078324 A1 | 4/2004 | Lonnberg et al. |
| 2004/0083215 A1 | 4/2004 | de Jong |
| 2004/0088221 A1 | 5/2004 | Katz et al. |
| 2004/0093278 A1 | 5/2004 | Burchetta et al. |
| 2004/0098625 A1 | 5/2004 | Lagadec et al. |
| 2004/0102197 A1 | 5/2004 | Dietz |
| 2004/0103147 A1 | 5/2004 | Flesher et al. |
| 2004/0107123 A1 | 6/2004 | Haffner et al. |
| 2004/0107125 A1 | 6/2004 | Guheen et al. |
| 2004/0111305 A1 | 6/2004 | Gavan et al. |
| 2004/0111358 A1 | 6/2004 | Lange et al. |
| 2004/0111363 A1 | 6/2004 | Trench et al. |
| 2004/0117235 A1 | 6/2004 | Shacham |
| 2004/0117358 A1 | 6/2004 | Von Kaenel et al. |
| 2004/0122730 A1 | 6/2004 | Tucciarone et al. |
| 2004/0122735 A1 | 6/2004 | Meshkin |
| 2004/0128150 A1 | 7/2004 | Lundegren |
| 2004/0128227 A1 | 7/2004 | Whipple et al. |
| 2004/0128230 A1 | 7/2004 | Oppenheimer et al. |
| 2004/0128232 A1 | 7/2004 | Descloux |
| 2004/0128236 A1 | 7/2004 | Brown et al. |
| 2004/0139035 A1 | 7/2004 | Wang |
| 2004/0143526 A1 | 7/2004 | Monasterio et al. |
| 2004/0143546 A1 | 7/2004 | Wood et al. |
| 2004/0153330 A1 | 8/2004 | Miller et al. |
| 2004/0153448 A1 | 8/2004 | Cheng et al. |
| 2004/0158520 A1 | 8/2004 | Noh |
| 2004/0158523 A1 | 8/2004 | Dort |
| 2004/0163101 A1 | 8/2004 | Swix |
| 2004/0167793 A1 | 8/2004 | Masuoka et al. |
| 2004/0176995 A1 | 9/2004 | Fusz |
| 2004/0177046 A1 | 9/2004 | Ogram |
| 2004/0186807 A1 | 9/2004 | Nathans et al. |
| 2004/0193535 A1 | 9/2004 | Barazesh |
| 2004/0193538 A1 | 9/2004 | Raines |
| 2004/0199456 A1 | 10/2004 | Flint et al. |
| 2004/0199458 A1 | 10/2004 | Ho |
| 2004/0199462 A1 | 10/2004 | Starrs |
| 2004/0199789 A1 | 10/2004 | Shaw et al. |
| 2004/0205157 A1 | 10/2004 | Bibelnieks et al. |
| 2004/0212299 A1 | 10/2004 | Ishikawa et al. |
| 2004/0220896 A1 | 11/2004 | Finlay et al. |
| 2004/0225545 A1 | 11/2004 | Turner et al. |
| 2004/0225586 A1 | 11/2004 | Woods et al. |
| 2004/0225594 A1 | 11/2004 | Nolan, III et al. |
| 2004/0225596 A1 | 11/2004 | Kemper et al. |
| 2004/0230448 A1 | 11/2004 | Schaich |
| 2004/0230459 A1 | 11/2004 | Dordick et al. |
| 2004/0230527 A1 | 11/2004 | Hansen et al. |
| 2004/0230534 A1 | 11/2004 | McGough |
| 2004/0230820 A1 | 11/2004 | Hui Hsu et al. |
| 2004/0243450 A1 | 12/2004 | Bernard, Jr. et al. |
| 2004/0243518 A1 | 12/2004 | Clifton et al. |
| 2004/0243588 A1 | 12/2004 | Tanner et al. |
| 2004/0261116 A1 | 12/2004 | Mckeown et al. |
| 2005/0004805 A1 | 1/2005 | Srinivasan |
| 2005/0015330 A1 | 1/2005 | Beery et al. |
| 2005/0021397 A1 | 1/2005 | Cui et al. |
| 2005/0021476 A1 | 1/2005 | Candella et al. |
| 2005/0027633 A1 | 2/2005 | Fortuna et al. |
| 2005/0027983 A1 | 2/2005 | Klawon |
| 2005/0033734 A1 | 2/2005 | Chess et al. |
| 2005/0038726 A1 | 2/2005 | Salomon et al. |
| 2005/0050027 A1 | 3/2005 | Yeh et al. |
| 2005/0058262 A1 | 3/2005 | Timmins et al. |
| 2005/0065874 A1 | 3/2005 | Lefner et al. |
| 2005/0086261 A1 | 4/2005 | Mammone |
| 2005/0091164 A1 | 4/2005 | Varble |
| 2005/0097039 A1 | 5/2005 | Kulcsar et al. |
| 2005/0102206 A1 | 5/2005 | Savasoglu et al. |
| 2005/0102226 A1 | 5/2005 | Oppenheimer et al. |
| 2005/0113991 A1 | 5/2005 | Rogers et al. |
| 2005/0125350 A1 | 6/2005 | Tidwell et al. |
| 2005/0130704 A1 | 6/2005 | McParland et al. |
| 2005/0137899 A1 | 6/2005 | Davies et al. |
| 2005/0137963 A1 | 6/2005 | Ricketts et al. |
| 2005/0144452 A1 | 6/2005 | Lynch et al. |
| 2005/0144641 A1 | 6/2005 | Lewis |
| 2005/0154664 A1 | 7/2005 | Guy et al. |
| 2005/0154665 A1 | 7/2005 | Kerr |
| 2005/0159996 A1 | 7/2005 | Lazaraus et al. |
| 2005/0177489 A1 | 8/2005 | Neff et al. |
| 2005/0189414 A1* | 9/2005 | Fano ............... G06Q 30/02 235/383 |
| 2005/0192008 A1 | 9/2005 | Desai et al. |
| 2005/0197953 A1 | 9/2005 | Broadbent et al. |
| 2005/0197954 A1 | 9/2005 | Maitland et al. |
| 2005/0201272 A1 | 9/2005 | Wang et al. |
| 2005/0209892 A1 | 9/2005 | Miller |
| 2005/0209922 A1 | 9/2005 | Hofmeister |
| 2005/0222900 A1 | 10/2005 | Fuloria et al. |
| 2005/0228692 A1 | 10/2005 | Hodgon |
| 2005/0246256 A1 | 11/2005 | Gastineau et al. |
| 2005/0251408 A1 | 11/2005 | Swaminathan et al. |
| 2005/0251474 A1 | 11/2005 | Shinn et al. |
| 2005/0251820 A1 | 11/2005 | Stefanik et al. |
| 2005/0256780 A1 | 11/2005 | Eldred |
| 2005/0256809 A1 | 11/2005 | Sadri |
| 2005/0257250 A1 | 11/2005 | Mitchell et al. |
| 2005/0262014 A1 | 11/2005 | Fickes |
| 2005/0262158 A1 | 11/2005 | Sauermann |
| 2005/0267774 A1 | 12/2005 | Merritt et al. |
| 2005/0273442 A1 | 12/2005 | Bennett et al. |
| 2005/0273849 A1 | 12/2005 | Araujo et al. |
| 2005/0278246 A1 | 12/2005 | Friedman et al. |
| 2005/0278542 A1 | 12/2005 | Pierson et al. |
| 2005/0279824 A1 | 12/2005 | Anderson et al. |
| 2005/0279827 A1 | 12/2005 | Mascavage et al. |
| 2005/0288954 A1 | 12/2005 | McCarthy et al. |
| 2005/0288998 A1 | 12/2005 | Verma et al. |
| 2005/0289003 A1 | 12/2005 | Thompson et al. |
| 2006/0004626 A1 | 1/2006 | Holmen et al. |
| 2006/0004731 A1 | 1/2006 | Seibel et al. |
| 2006/0010055 A1 | 1/2006 | Morita et al. |
| 2006/0014129 A1 | 1/2006 | Coleman et al. |
| 2006/0015425 A1 | 1/2006 | Brooks |
| 2006/0020611 A1 | 1/2006 | Gilbert et al. |
| 2006/0031158 A1 | 2/2006 | Orman |
| 2006/0031747 A1 | 2/2006 | Wada et al. |
| 2006/0032909 A1 | 2/2006 | Seegar |
| 2006/0041443 A1 | 2/2006 | Horvath |
| 2006/0041464 A1 | 2/2006 | Powers et al. |
| 2006/0041840 A1 | 2/2006 | Blair |
| 2006/0059073 A1 | 3/2006 | Walzak |
| 2006/0059110 A1 | 3/2006 | Madhok et al. |
| 2006/0074986 A1 | 4/2006 | Mallalieu et al. |
| 2006/0080126 A1 | 4/2006 | Greer et al. |
| 2006/0080230 A1 | 4/2006 | Freiberg |
| 2006/0080233 A1 | 4/2006 | Mendelovich et al. |
| 2006/0080251 A1 | 4/2006 | Fried et al. |
| 2006/0080263 A1 | 4/2006 | Willis et al. |
| 2006/0085334 A1 | 4/2006 | Murphy |
| 2006/0089842 A1 | 4/2006 | Medawar |
| 2006/0095363 A1 | 5/2006 | May |
| 2006/0095923 A1 | 5/2006 | Novack et al. |
| 2006/0100954 A1 | 5/2006 | Schoen |
| 2006/0122921 A1 | 6/2006 | Comerford et al. |
| 2006/0129428 A1 | 6/2006 | Wennberg |
| 2006/0129481 A1 | 6/2006 | Bhatt et al. |
| 2006/0131390 A1 | 6/2006 | Kim |
| 2006/0136330 A1 | 6/2006 | DeRoy et al. |
| 2006/0149674 A1 | 7/2006 | Cook et al. |
| 2006/0155624 A1 | 7/2006 | Schwartz |
| 2006/0155639 A1 | 7/2006 | Lynch et al. |
| 2006/0161435 A1 | 7/2006 | Atef et al. |
| 2006/0173726 A1 | 8/2006 | Hall et al. |
| 2006/0173772 A1 | 8/2006 | Hayes et al. |
| 2006/0173776 A1 | 8/2006 | Shalley et al. |
| 2006/0177226 A1 | 8/2006 | Ellis, III |

(56) References Cited

U.S. PATENT DOCUMENTS

| | | |
|---|---|---|
| 2006/0178189 A1 | 8/2006 | Walker et al. |
| 2006/0178957 A1 | 8/2006 | LeClaire |
| 2006/0178971 A1 | 8/2006 | Owen et al. |
| 2006/0178983 A1 | 8/2006 | Nice et al. |
| 2006/0184440 A1 | 8/2006 | Britti et al. |
| 2006/0195390 A1 | 8/2006 | Rusk et al. |
| 2006/0202012 A1 | 9/2006 | Grano et al. |
| 2006/0204051 A1 | 9/2006 | Holland, IV |
| 2006/0206416 A1 | 9/2006 | Farias |
| 2006/0212350 A1 | 9/2006 | Ellis et al. |
| 2006/0218069 A1 | 9/2006 | Aberman et al. |
| 2006/0218079 A1 | 9/2006 | Goldblatt et al. |
| 2006/0229943 A1 | 10/2006 | Mathias et al. |
| 2006/0229961 A1 | 10/2006 | Lyftogt et al. |
| 2006/0229996 A1 | 10/2006 | Keithley et al. |
| 2006/0239512 A1 | 10/2006 | Petrillo |
| 2006/0241923 A1 | 10/2006 | Xu et al. |
| 2006/0242046 A1 | 10/2006 | Haggerty et al. |
| 2006/0242047 A1 | 10/2006 | Haggerty et al. |
| 2006/0242048 A1 | 10/2006 | Haggerty et al. |
| 2006/0242050 A1 | 10/2006 | Haggerty et al. |
| 2006/0253328 A1 | 11/2006 | Kohli et al. |
| 2006/0253358 A1 | 11/2006 | Delgrosso et al. |
| 2006/0259364 A1 | 11/2006 | Strock et al. |
| 2006/0262929 A1 | 11/2006 | Vatanen et al. |
| 2006/0265243 A1 | 11/2006 | Racho et al. |
| 2006/0265323 A1 | 11/2006 | Winter et al. |
| 2006/0267999 A1 | 11/2006 | Cash et al. |
| 2006/0271456 A1 | 11/2006 | Romain et al. |
| 2006/0271457 A1 | 11/2006 | Romain et al. |
| 2006/0271552 A1 | 11/2006 | McChesney et al. |
| 2006/0276171 A1 | 12/2006 | Pousti |
| 2006/0277102 A1 | 12/2006 | Agliozzo |
| 2006/0277141 A1 | 12/2006 | Palmer |
| 2006/0282328 A1 | 12/2006 | Gerace et al. |
| 2006/0282359 A1 | 12/2006 | Nobili et al. |
| 2006/0293921 A1 | 12/2006 | McCarthy et al. |
| 2006/0293932 A1 | 12/2006 | Cash et al. |
| 2006/0293979 A1 | 12/2006 | Cash et al. |
| 2006/0294199 A1 | 12/2006 | Bertholf |
| 2007/0005508 A1 | 1/2007 | Chiang |
| 2007/0011026 A1 | 1/2007 | Higgins et al. |
| 2007/0011039 A1 | 1/2007 | Oddo |
| 2007/0011083 A1 | 1/2007 | Bird et al. |
| 2007/0016500 A1 | 1/2007 | Chatterji et al. |
| 2007/0016501 A1 | 1/2007 | Chatterji et al. |
| 2007/0016518 A1 | 1/2007 | Atkinson et al. |
| 2007/0016522 A1 | 1/2007 | Wang |
| 2007/0022141 A1 | 1/2007 | Singleton et al. |
| 2007/0022297 A1 | 1/2007 | Britti et al. |
| 2007/0027778 A1 | 2/2007 | Schellhammer et al. |
| 2007/0027791 A1 | 2/2007 | Young et al. |
| 2007/0030282 A1 | 2/2007 | Cash et al. |
| 2007/0033227 A1 | 2/2007 | Gaito et al. |
| 2007/0038483 A1 | 2/2007 | Wood |
| 2007/0038497 A1 | 2/2007 | Britti et al. |
| 2007/0043654 A1 | 2/2007 | Libman |
| 2007/0055598 A1 | 3/2007 | Arnott et al. |
| 2007/0055599 A1 | 3/2007 | Arnott |
| 2007/0055618 A1 | 3/2007 | Pogust |
| 2007/0055621 A1 | 3/2007 | Tischler et al. |
| 2007/0061195 A1 | 3/2007 | Liu et al. |
| 2007/0061243 A1 | 3/2007 | Ramer et al. |
| 2007/0067207 A1 | 3/2007 | Haggerty et al. |
| 2007/0067208 A1 | 3/2007 | Haggerty et al. |
| 2007/0067209 A1 | 3/2007 | Haggerty et al. |
| 2007/0067235 A1 | 3/2007 | Nathans et al. |
| 2007/0067285 A1 | 3/2007 | Blume et al. |
| 2007/0067297 A1 | 3/2007 | Kublickis |
| 2007/0067437 A1 | 3/2007 | Sindambiwe |
| 2007/0072190 A1 | 3/2007 | Aggarwal |
| 2007/0078741 A1 | 4/2007 | Haggerty et al. |
| 2007/0078985 A1 | 4/2007 | Shao et al. |
| 2007/0083460 A1 | 4/2007 | Bachenheimer |
| 2007/0093234 A1 | 4/2007 | Willis et al. |
| 2007/0094137 A1 | 4/2007 | Phillips et al. |
| 2007/0106582 A1 | 5/2007 | Baker et al. |
| 2007/0112667 A1 | 5/2007 | Rucker |
| 2007/0112668 A1 | 5/2007 | Celano et al. |
| 2007/0118393 A1 | 5/2007 | Rosen et al. |
| 2007/0121843 A1 | 5/2007 | Atazky et al. |
| 2007/0124235 A1 | 5/2007 | Chakraborty et al. |
| 2007/0156515 A1 | 7/2007 | Hasselback et al. |
| 2007/0156589 A1 | 7/2007 | Zimler et al. |
| 2007/0156718 A1 | 7/2007 | Hossfeld et al. |
| 2007/0168246 A1 | 7/2007 | Haggerty et al. |
| 2007/0168267 A1 | 7/2007 | Zimmerman et al. |
| 2007/0179860 A1 | 8/2007 | Romero |
| 2007/0192165 A1 | 8/2007 | Haggerty et al. |
| 2007/0192248 A1 | 8/2007 | West |
| 2007/0205266 A1 | 9/2007 | Carr et al. |
| 2007/0208653 A1 | 9/2007 | Murphy |
| 2007/0208729 A1 | 9/2007 | Martino |
| 2007/0220611 A1 | 9/2007 | Socolow et al. |
| 2007/0226093 A1 | 9/2007 | Chan et al. |
| 2007/0226114 A1 | 9/2007 | Haggerty et al. |
| 2007/0244732 A1 | 10/2007 | Chatterji et al. |
| 2007/0244807 A1 | 10/2007 | Andringa et al. |
| 2007/0250327 A1 | 10/2007 | Hedy |
| 2007/0271178 A1 | 11/2007 | Davis et al. |
| 2007/0282684 A1 | 12/2007 | Prosser et al. |
| 2007/0282730 A1 | 12/2007 | Carpenter et al. |
| 2007/0282736 A1 | 12/2007 | Conlin et al. |
| 2007/0288271 A1 | 12/2007 | Klinkhammer |
| 2007/0288355 A1 | 12/2007 | Roland et al. |
| 2007/0288360 A1 | 12/2007 | Seeklus |
| 2007/0288559 A1 | 12/2007 | Parsadayan |
| 2007/0294163 A1 | 12/2007 | Harmon et al. |
| 2007/0299759 A1 | 12/2007 | Kelly |
| 2007/0299771 A1 | 12/2007 | Brody |
| 2008/0004957 A1 | 1/2008 | Hildreth et al. |
| 2008/0005313 A1 | 1/2008 | Flake et al. |
| 2008/0010687 A1 | 1/2008 | Gonen et al. |
| 2008/0015887 A1 | 1/2008 | Drabek et al. |
| 2008/0015938 A1 | 1/2008 | Haddad et al. |
| 2008/0016099 A1 | 1/2008 | Ikeda |
| 2008/0021804 A1 | 1/2008 | Deckoff |
| 2008/0027859 A1 | 1/2008 | Nathans et al. |
| 2008/0028067 A1 | 1/2008 | Berkhin et al. |
| 2008/0033852 A1 | 2/2008 | Megdal et al. |
| 2008/0052182 A1 | 2/2008 | Marshall |
| 2008/0059224 A1 | 3/2008 | Schechter |
| 2008/0059317 A1 | 3/2008 | Chandran et al. |
| 2008/0059364 A1 | 3/2008 | Tidwell et al. |
| 2008/0059449 A1 | 3/2008 | Webster et al. |
| 2008/0065774 A1 | 3/2008 | Keeler |
| 2008/0066188 A1 | 3/2008 | Kwak |
| 2008/0071882 A1 | 3/2008 | Hering et al. |
| 2008/0077526 A1 | 3/2008 | Arumugam |
| 2008/0086368 A1 | 4/2008 | Bauman et al. |
| 2008/0091463 A1 | 4/2008 | Shakamuri |
| 2008/0097768 A1 | 4/2008 | Godshalk |
| 2008/0097928 A1 | 4/2008 | Paulson |
| 2008/0103800 A1 | 5/2008 | Domenikos et al. |
| 2008/0103972 A1 | 5/2008 | Lanc |
| 2008/0110973 A1 | 5/2008 | Nathans et al. |
| 2008/0120155 A1 | 5/2008 | Pliha |
| 2008/0120569 A1 | 5/2008 | Mann et al. |
| 2008/0126233 A1 | 5/2008 | Hogan |
| 2008/0133273 A1 | 6/2008 | Marshall |
| 2008/0133322 A1 | 6/2008 | Kalia et al. |
| 2008/0133325 A1 | 6/2008 | De et al. |
| 2008/0133531 A1 | 6/2008 | Baskerville et al. |
| 2008/0134042 A1 | 6/2008 | Jankovich |
| 2008/0140476 A1 | 6/2008 | Anand et al. |
| 2008/0140507 A1 | 6/2008 | Hamlisch et al. |
| 2008/0140549 A1 | 6/2008 | Eder |
| 2008/0140576 A1 | 6/2008 | Lewis et al. |
| 2008/0147454 A1 | 6/2008 | Walker et al. |
| 2008/0147523 A1 | 6/2008 | Mulry et al. |
| 2008/0154766 A1 | 6/2008 | Lewis et al. |
| 2008/0167883 A1 | 7/2008 | Khazaneh |
| 2008/0167936 A1 | 7/2008 | Kapoor |
| 2008/0167956 A1 | 7/2008 | Keithley |

(56) References Cited

U.S. PATENT DOCUMENTS

| | | |
|---|---|---|
| 2008/0172324 A1 | 7/2008 | Johnson |
| 2008/0175360 A1 | 7/2008 | Schwarz et al. |
| 2008/0177655 A1 | 7/2008 | Zalik |
| 2008/0177836 A1 | 7/2008 | Bennett |
| 2008/0183564 A1 | 7/2008 | Tien et al. |
| 2008/0195425 A1 | 8/2008 | Haggerty et al. |
| 2008/0195600 A1 | 8/2008 | Deakter |
| 2008/0208548 A1 | 8/2008 | Metzger et al. |
| 2008/0208610 A1 | 8/2008 | Thomas et al. |
| 2008/0208631 A1 | 8/2008 | Morita et al. |
| 2008/0208788 A1 | 8/2008 | Merugu et al. |
| 2008/0215470 A1 | 9/2008 | Sengupta et al. |
| 2008/0221934 A1 | 9/2008 | Megdal et al. |
| 2008/0221947 A1 | 9/2008 | Megdal et al. |
| 2008/0221970 A1 | 9/2008 | Megdal et al. |
| 2008/0221971 A1 | 9/2008 | Megdal et al. |
| 2008/0221972 A1 | 9/2008 | Megdal et al. |
| 2008/0221973 A1 | 9/2008 | Megdal et al. |
| 2008/0221990 A1 | 9/2008 | Megdal et al. |
| 2008/0222016 A1 | 9/2008 | Megdal et al. |
| 2008/0222027 A1 | 9/2008 | Megdal et al. |
| 2008/0228538 A1 | 9/2008 | Megdal et al. |
| 2008/0228539 A1 | 9/2008 | Megdal et al. |
| 2008/0228540 A1 | 9/2008 | Megdal et al. |
| 2008/0228541 A1 | 9/2008 | Megdal et al. |
| 2008/0228556 A1 | 9/2008 | Megdal et al. |
| 2008/0228606 A1 | 9/2008 | Megdal et al. |
| 2008/0228635 A1 | 9/2008 | Megdal et al. |
| 2008/0243680 A1 | 10/2008 | Megdal et al. |
| 2008/0244008 A1 | 10/2008 | Wilkinson et al. |
| 2008/0255897 A1 | 10/2008 | Megdal et al. |
| 2008/0255992 A1 | 10/2008 | Lin |
| 2008/0262925 A1 | 10/2008 | Kim et al. |
| 2008/0263638 A1 | 10/2008 | McMurtry et al. |
| 2008/0281737 A1 | 11/2008 | Fajardo |
| 2008/0288382 A1 | 11/2008 | Smith et al. |
| 2008/0294540 A1 | 11/2008 | Celka et al. |
| 2008/0294546 A1 | 11/2008 | Flannery |
| 2008/0301016 A1 | 12/2008 | Durvasula et al. |
| 2008/0301188 A1 | 12/2008 | O'Hara |
| 2008/0312963 A1 | 12/2008 | Reiner |
| 2008/0312969 A1 | 12/2008 | Raines et al. |
| 2009/0006185 A1 | 1/2009 | Stinson |
| 2009/0006475 A1 | 1/2009 | Udezue et al. |
| 2009/0012889 A1 | 1/2009 | Finch |
| 2009/0018996 A1 | 1/2009 | Hunt et al. |
| 2009/0019027 A1 | 1/2009 | Ju et al. |
| 2009/0024505 A1 | 1/2009 | Patel et al. |
| 2009/0030776 A1 | 1/2009 | Walker et al. |
| 2009/0037247 A1 | 2/2009 | Quinn |
| 2009/0037323 A1 | 2/2009 | Feinstein et al. |
| 2009/0043637 A1 | 2/2009 | Eder |
| 2009/0044279 A1 | 2/2009 | Crawford et al. |
| 2009/0048877 A1 | 2/2009 | Binns et al. |
| 2009/0076883 A1 | 3/2009 | Kilger et al. |
| 2009/0089190 A1 | 4/2009 | Girulat |
| 2009/0089205 A1 | 4/2009 | Bayne |
| 2009/0094675 A1 | 4/2009 | Powers |
| 2009/0106150 A1 | 4/2009 | Pelegero et al. |
| 2009/0112650 A1 | 4/2009 | Iwane |
| 2009/0113532 A1 | 4/2009 | Lapidous |
| 2009/0119169 A1 | 5/2009 | Chandratillake et al. |
| 2009/0119199 A1 | 5/2009 | Salahi |
| 2009/0125369 A1 | 5/2009 | Kloostra et al. |
| 2009/0132347 A1 | 5/2009 | Anderson et al. |
| 2009/0132559 A1 | 5/2009 | Chamberlain et al. |
| 2009/0144102 A1 | 6/2009 | Lopez |
| 2009/0144160 A1 | 6/2009 | Haggerty et al. |
| 2009/0144201 A1 | 6/2009 | Gierkink et al. |
| 2009/0172815 A1 | 7/2009 | Gu et al. |
| 2009/0182653 A1 | 7/2009 | Zimiles |
| 2009/0198557 A1 | 8/2009 | Wang et al. |
| 2009/0198602 A1 | 8/2009 | Wang et al. |
| 2009/0198612 A1 | 8/2009 | Meimes et al. |
| 2009/0199264 A1 | 8/2009 | Lang |
| 2009/0210886 A1 | 8/2009 | Bhojwani et al. |
| 2009/0215479 A1 | 8/2009 | Karmarkar |
| 2009/0216591 A1 | 8/2009 | Buerger et al. |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0240609 A1 | 9/2009 | Cho et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0249440 A1 | 10/2009 | Platt et al. |
| 2009/0254476 A1 | 10/2009 | Sharma et al. |
| 2009/0254971 A1 | 10/2009 | Herz et al. |
| 2009/0265326 A1 | 10/2009 | Lehrman et al. |
| 2009/0271248 A1 | 10/2009 | Sherman et al. |
| 2009/0271265 A1 | 10/2009 | Lay et al. |
| 2009/0276233 A1 | 11/2009 | Brimhall et al. |
| 2009/0276368 A1 | 11/2009 | Martin et al. |
| 2009/0300066 A1 | 12/2009 | Guo et al. |
| 2009/0313163 A1 | 12/2009 | Wang et al. |
| 2009/0319648 A1 | 12/2009 | Dutta et al. |
| 2009/0327120 A1 | 12/2009 | Eze et al. |
| 2010/0009320 A1 | 1/2010 | Wilkelis |
| 2010/0010935 A1 | 1/2010 | Shelton |
| 2010/0030649 A1 | 2/2010 | Ubelhor |
| 2010/0043055 A1 | 2/2010 | Baumgart |
| 2010/0094704 A1 | 4/2010 | Subramanian et al. |
| 2010/0094758 A1 | 4/2010 | Chamberlain et al. |
| 2010/0094768 A1 | 4/2010 | Miltonberger |
| 2010/0094774 A1 | 4/2010 | Jackowitz et al. |
| 2010/0100945 A1 | 4/2010 | Ozzie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0121767 A1 | 5/2010 | Coulter et al. |
| 2010/0130172 A1 | 5/2010 | Vendrow et al. |
| 2010/0142698 A1 | 6/2010 | Spottiswoode et al. |
| 2010/0145836 A1 | 6/2010 | Baker et al. |
| 2010/0145847 A1 | 6/2010 | Zarikian et al. |
| 2010/0169159 A1 | 7/2010 | Rose et al. |
| 2010/0169264 A1 | 7/2010 | O'Sullivan |
| 2010/0185453 A1 | 7/2010 | Satyavolu et al. |
| 2010/0198629 A1 | 8/2010 | Wesileder et al. |
| 2010/0205662 A1 | 8/2010 | Ibrahim et al. |
| 2010/0211445 A1 | 8/2010 | Bodington |
| 2010/0217837 A1 | 8/2010 | Ansari et al. |
| 2010/0223168 A1 | 9/2010 | Haggerty et al. |
| 2010/0228657 A1 | 9/2010 | Kagarlis |
| 2010/0229245 A1 | 9/2010 | Singhal |
| 2010/0248681 A1 | 9/2010 | Phills |
| 2010/0250364 A1 | 9/2010 | Song et al. |
| 2010/0250434 A1 | 9/2010 | Megdal et al. |
| 2010/0250469 A1 | 9/2010 | Megdal et al. |
| 2010/0268557 A1 | 10/2010 | Faith et al. |
| 2010/0274739 A1 | 10/2010 | Haggerty et al. |
| 2010/0293114 A1 | 11/2010 | Khan et al. |
| 2010/0312717 A1 | 12/2010 | Haggerty et al. |
| 2010/0332292 A1 | 12/2010 | Anderson |
| 2011/0004498 A1 | 1/2011 | Readshaw |
| 2011/0016042 A1 | 1/2011 | Cho et al. |
| 2011/0023115 A1 | 1/2011 | Wright |
| 2011/0029388 A1 | 2/2011 | Kendall et al. |
| 2011/0035333 A1 | 2/2011 | Haggerty et al. |
| 2011/0047071 A1 | 2/2011 | Choudhuri et al. |
| 2011/0054981 A1 | 3/2011 | Faith et al. |
| 2011/0066495 A1 | 3/2011 | Ayloo et al. |

(56) References Cited

U.S. PATENT DOCUMENTS

| | | |
|---|---|---|
| 2011/0071950 A1 | 3/2011 | Ivanovic |
| 2011/0076663 A1 | 3/2011 | Krallman et al. |
| 2011/0078073 A1 | 3/2011 | Annappindi et al. |
| 2011/0093383 A1 | 4/2011 | Haggerty et al. |
| 2011/0112958 A1 | 5/2011 | Haggerty et al. |
| 2011/0125595 A1 | 5/2011 | Neal et al. |
| 2011/0126275 A1 | 5/2011 | Anderson et al. |
| 2011/0131131 A1 | 6/2011 | Griffin et al. |
| 2011/0137789 A1 | 6/2011 | Kortina et al. |
| 2011/0145122 A1 | 6/2011 | Haggerty et al. |
| 2011/0161323 A1 | 6/2011 | Hagiwara |
| 2011/0164746 A1 | 7/2011 | Nice et al. |
| 2011/0173116 A1 | 7/2011 | Yan et al. |
| 2011/0178922 A1 | 7/2011 | Imrey et al. |
| 2011/0184838 A1 | 7/2011 | Winters et al. |
| 2011/0184851 A1 | 7/2011 | Megdal et al. |
| 2011/0196791 A1 | 8/2011 | Dominguez |
| 2011/0211445 A1 | 9/2011 | Chen |
| 2011/0213641 A1 | 9/2011 | Metzger, II et al. |
| 2011/0218826 A1 | 9/2011 | Birtel et al. |
| 2011/0219421 A1 | 9/2011 | Ullman et al. |
| 2011/0238566 A1 | 9/2011 | Santos |
| 2011/0251946 A1 | 10/2011 | Haggerty et al. |
| 2011/0258050 A1 | 10/2011 | Chan et al. |
| 2011/0258142 A1 | 10/2011 | Haggerty et al. |
| 2011/0264581 A1 | 10/2011 | Clyne |
| 2011/0270779 A1 | 11/2011 | Showalter |
| 2011/0276396 A1 | 11/2011 | Rathod |
| 2011/0282779 A1 | 11/2011 | Megdal et al. |
| 2011/0307397 A1 | 12/2011 | Benmbarek |
| 2011/0320307 A1 | 12/2011 | Mehta et al. |
| 2012/0005070 A1 | 1/2012 | McFall et al. |
| 2012/0011056 A1 | 1/2012 | Ward et al. |
| 2012/0011158 A1 | 1/2012 | Avner et al. |
| 2012/0016948 A1 | 1/2012 | Sinha |
| 2012/0029956 A1 | 2/2012 | Ghosh et al. |
| 2012/0035980 A1 | 2/2012 | Haggerty et al. |
| 2012/0047219 A1 | 2/2012 | Feng et al. |
| 2012/0054592 A1 | 3/2012 | Jaffe et al. |
| 2012/0066065 A1 | 3/2012 | Switzer |
| 2012/0066106 A1 | 3/2012 | Papadimitriou |
| 2012/0084230 A1 | 4/2012 | Megdal et al. |
| 2012/0101938 A1 | 4/2012 | Kasower |
| 2012/0101939 A1 | 4/2012 | Kasower |
| 2012/0106801 A1 | 5/2012 | Jackson |
| 2012/0110677 A1 | 5/2012 | Abendroth et al. |
| 2012/0116807 A1 | 5/2012 | Hane et al. |
| 2012/0123968 A1 | 5/2012 | Megdal et al. |
| 2012/0124498 A1 | 5/2012 | Santoro et al. |
| 2012/0136763 A1 | 5/2012 | Megdal et al. |
| 2012/0143637 A1 | 6/2012 | Paradis et al. |
| 2012/0143921 A1 | 6/2012 | Wilson |
| 2012/0158460 A1 | 6/2012 | Kruger et al. |
| 2012/0158574 A1 | 6/2012 | Brunzell et al. |
| 2012/0158654 A1 | 6/2012 | Behren et al. |
| 2012/0173339 A1 | 7/2012 | Flynt et al. |
| 2012/0179536 A1 | 7/2012 | Kalb et al. |
| 2012/0191479 A1 | 7/2012 | Gupta et al. |
| 2012/0209586 A1 | 8/2012 | Mieritz et al. |
| 2012/0215682 A1 | 8/2012 | Lent et al. |
| 2012/0216125 A1 | 8/2012 | Pierce |
| 2012/0232958 A1 | 9/2012 | Silbert |
| 2012/0239497 A1 | 9/2012 | Nuzzi |
| 2012/0239515 A1 | 9/2012 | Batra et al. |
| 2012/0265661 A1 | 10/2012 | Megdal et al. |
| 2012/0284118 A1 | 11/2012 | Mamich, Jr. et al. |
| 2012/0290660 A1 | 11/2012 | Rao et al. |
| 2012/0317016 A1 | 12/2012 | Hughes |
| 2012/0323954 A1 | 12/2012 | Bonalle et al. |
| 2013/0080242 A1 | 3/2013 | Alhadeff et al. |
| 2013/0080467 A1 | 3/2013 | Carson et al. |
| 2013/0085804 A1 | 4/2013 | Leff et al. |
| 2013/0085902 A1 | 4/2013 | Chew |
| 2013/0103571 A1 | 4/2013 | Chung et al. |
| 2013/0117832 A1 | 5/2013 | Gandhi |
| 2013/0124263 A1 | 5/2013 | Amaro et al. |
| 2013/0132151 A1 | 5/2013 | Stibel et al. |
| 2013/0137464 A1 | 5/2013 | Kramer et al. |
| 2013/0151388 A1 | 6/2013 | Falkenborg et al. |
| 2013/0159168 A1 | 6/2013 | Evans |
| 2013/0159411 A1 | 6/2013 | Bowen |
| 2013/0173359 A1 | 7/2013 | Megdal et al. |
| 2013/0173450 A1 | 7/2013 | Celka et al. |
| 2013/0173481 A1 | 7/2013 | Hirtenstein et al. |
| 2013/0218638 A1 | 8/2013 | Kilger et al. |
| 2013/0226787 A1 | 8/2013 | Haggerty et al. |
| 2013/0226820 A1 | 8/2013 | Sedota, Jr. et al. |
| 2013/0238413 A1 | 9/2013 | Carlson et al. |
| 2013/0268324 A1 | 10/2013 | Megdal et al. |
| 2013/0275331 A1 | 10/2013 | Megdal et al. |
| 2013/0293363 A1 | 11/2013 | Plymouth |
| 2013/0347059 A1 | 12/2013 | Fong et al. |
| 2014/0012633 A1 | 1/2014 | Megdal et al. |
| 2014/0019331 A1 | 1/2014 | Megdal et al. |
| 2014/0032265 A1 | 1/2014 | Paprocki et al. |
| 2014/0032384 A1 | 1/2014 | Megdal et al. |
| 2014/0046887 A1 | 2/2014 | Lessin |
| 2014/0095251 A1 | 4/2014 | Huovilainen |
| 2014/0096249 A1 | 4/2014 | Dupont et al. |
| 2014/0149179 A1 | 5/2014 | Haggerty et al. |
| 2014/0156501 A1 | 6/2014 | Howe |
| 2014/0164112 A1 | 6/2014 | Kala |
| 2014/0164398 A1 | 6/2014 | Smith et al. |
| 2014/0172686 A1 | 6/2014 | Haggerty et al. |
| 2014/0181285 A1 | 6/2014 | Stevens et al. |
| 2014/0244353 A1 | 8/2014 | Winters |
| 2014/0278774 A1 | 9/2014 | Cai et al. |
| 2014/0310157 A1 | 10/2014 | Haggerty et al. |
| 2014/0316852 A1 | 10/2014 | Chatterji et al. |
| 2014/0316855 A1 | 10/2014 | Haggerty et al. |
| 2014/0316969 A1 | 10/2014 | Imrey |
| 2014/0317022 A1 | 10/2014 | Haggerty et al. |
| 2014/0324538 A1 | 10/2014 | Haggerty et al. |
| 2014/0344069 A1 | 11/2014 | Haggerty et al. |
| 2015/0026039 A1 | 1/2015 | Annappindi |
| 2015/0066772 A1 | 3/2015 | Griffin et al. |
| 2015/0120391 A1 | 4/2015 | Jodice et al. |
| 2015/0120755 A1 | 4/2015 | Burger et al. |
| 2015/0295906 A1 | 10/2015 | Ufford et al. |
| 2015/0310543 A1 | 10/2015 | Debie et al. |
| 2015/0332414 A1 | 11/2015 | Unser |
| 2016/0055487 A1 | 2/2016 | Votaw et al. |
| 2016/0071175 A1 | 3/2016 | Reuss et al. |
| 2016/0092997 A1 | 3/2016 | Shen et al. |
| 2016/0171542 A1* | 6/2016 | Fanous ............ G06F 17/30867 705/14.54 |
| 2016/0210224 A1 | 7/2016 | Cohen et al. |
| 2016/0246581 A1 | 8/2016 | Jimenez et al. |
| 2017/0278182 A1 | 9/2017 | Kasower |
| 2018/0060546 A1 | 3/2018 | Yin |
| 2018/0189871 A1 | 7/2018 | Lennert |
| 2019/0012736 A1 | 1/2019 | Courbage et al. |
| 2019/0026354 A1 | 1/2019 | Kapczynski |

FOREIGN PATENT DOCUMENTS

| | | |
|---|---|---|
| EP | 0 419 889 | 4/1991 |
| EP | 0 458 698 | 11/1991 |
| EP | 0 468 440 | 1/1992 |
| EP | 0 554 083 | 8/1993 |
| EP | 0 566 736 | 8/1993 |
| EP | 0 559 358 | 9/1993 |
| EP | 0 869 652 | 10/1998 |
| EP | 0 913 789 | 5/1999 |
| EP | 0 919 942 | 6/1999 |
| EP | 0 977 128 | 2/2000 |
| EP | 1 028 401 | 8/2000 |
| EP | 1 077 419 | 2/2001 |
| EP | 0 772 836 | 12/2001 |
| EP | 2 088 743 | 8/2009 |
| EP | 2 151 793 | 2/2010 |
| GB | 2 392 748 | 3/2004 |
| JP | 10-222559 | 8/1998 |
| JP | 10-261009 | 9/1998 |

(56) References Cited

FOREIGN PATENT DOCUMENTS

| | | |
|---|---|---|
| JP | 10-293732 | 11/1998 |
| JP | 2000-331068 | 11/2000 |
| JP | 2001-282957 | 10/2001 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163449 | 6/2002 |
| JP | 2002-163498 | 6/2002 |
| JP | 2002-259753 | 9/2002 |
| JP | 2003-271851 | 9/2003 |
| JP | 2003-316881 | 11/2003 |
| JP | 2003-316950 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2013-0107394 | 10/2013 |
| TW | 256569 | 6/2006 |
| WO | WO 94/006103 | 3/1994 |
| WO | WO 95/0034155 | 12/1995 |
| WO | WO 96/000945 | 1/1996 |
| WO | WO 97/023838 | 7/1997 |
| WO | WO 98/041931 | 9/1998 |
| WO | WO 98/041932 | 9/1998 |
| WO | WO 98/041933 | 9/1998 |
| WO | WO 98/049643 | 11/1998 |
| WO | WO 99/008218 | 2/1999 |
| WO | WO 99/017225 | 4/1999 |
| WO | WO 99/017226 | 4/1999 |
| WO | WO 99/022328 | 5/1999 |
| WO | WO 99/038094 | 7/1999 |
| WO | WO 00/004465 | 1/2000 |
| WO | WO 00/028441 | 5/2000 |
| WO | WO 00/055778 | 9/2000 |
| WO | WO 00/055789 | 9/2000 |
| WO | WO 00/055790 | 9/2000 |
| WO | WO 01/010090 | 2/2001 |
| WO | WO 01/011522 | 2/2001 |
| WO | WO 01/016896 | 3/2001 |
| WO | WO 01/039090 | 5/2001 |
| WO | WO 01/039589 | 6/2001 |
| WO | WO 01/041083 | 6/2001 |
| WO | WO 01/057720 | 8/2001 |
| WO | WO 01/080053 | 10/2001 |
| WO | WO 01/084281 | 11/2001 |
| WO | WO 02/001462 | 1/2002 |
| WO | WO 02/027610 | 4/2002 |
| WO | WO 03/071388 | 8/2003 |
| WO | WO 03/101123 | 12/2003 |
| WO | WO 2004/046882 | 6/2004 |
| WO | WO 2004/051436 | 6/2004 |
| WO | WO 2004/061563 | 7/2004 |
| WO | WO 2004/114160 | 12/2004 |
| WO | WO 2005/059781 | 6/2005 |
| WO | WO 2005/124619 | 12/2005 |
| WO | WO 2007/004158 | 1/2007 |
| WO | WO 2007/014271 | 2/2007 |
| WO | WO 2007/149941 | 12/2007 |
| WO | WO 2008/022289 | 2/2008 |
| WO | WO 2008/054403 | 5/2008 |
| WO | WO 2008/076343 | 6/2008 |
| WO | WO 2008/127288 | 10/2008 |
| WO | WO 2008/147918 | 12/2008 |
| WO | WO 2009/061342 | 5/2009 |
| WO | WO 2009/076555 | 6/2009 |
| WO | WO 2009/117518 | 9/2009 |
| WO | WO 2009/132114 | 10/2009 |
| WO | WO 2010/045160 | 4/2010 |
| WO | WO 2010/062537 | 6/2010 |
| WO | WO 2010/132492 | 11/2010 |
| WO | WO 2010/150251 | 12/2010 |
| WO | WO 2011/005876 | 1/2011 |
| WO | WO 2014/018900 | 1/2014 |
| WO | WO 2015/162681 | 10/2015 |
| WO | WO 2018/039377 | 3/2018 |
| WO | WO 2018/128866 | 7/2018 |

OTHER PUBLICATIONS

"AT&T Expected to Turn Up Heat in Card Wars", American Banker, May 27, 1993, vol. 158, No. 101, pp. 3.

"Balance Transfers Offer Opportunities", Risk Credit Risk Management Report, Jan. 29, 1996, vol. 6, No. 2, pp. 2.

"Bank of America Direct Web-Based Network Adds Core Functionality to Meet Day-to-Day Treasury Needs", Business Wire, Oct. 25, 1999. pp. 2.

"Chase Gets Positive," Bank Technology News, May 6, 2000, vol. 14, No. 5, p. 33.

"Cole Taylor Bank Chooses Integrated E-Banking/E-Payments/Reconciliation Solution From Fundtech", Business Wire, Oct. 21, 1999, pp. 2.

"Equifax and FICO Serve Consumers", Mortgage Servicing News, Mar. 2001, vol. 5, No. 3, p. 19.

"Experian Launches Portfolio Monitor—Owner NoticesSM", News Release, Feb. 2003, Costa Mesa, CA.

"FinExtra, Basepoint Analytics Introduces Predictive Technology for Mortgage Fraud", Oct. 5, 2005, pp. 3.

"FTC Testifies: Identity Theft on the Rise", FTC News Release, Mar. 7, 2000, pp. 3.

"ID Thieves These Days Want Your Number, Not Your Name", The Colombus Dispatch, Columbus, Ohio, http://www.dispatch.com/content/stories/business/2014/08/03/id-thieves-these-days-want-your-number-not-your-name.html, Aug. 3, 2014 in 2 pages.

"Industry News, New Technology Identifies Mortgage Fraud: Basepoint Analytics Launches FraudMark", Inman News, American Land Title Association, Oct. 5, 2005, pp. 1.

"New Privista Product Provides Early Warning System to Combat Identity Theft", PR Newswire, Oct. 24, 2000, PR Newswire Association, Inc., New York.

AISG's National Underwriting Database, A-PLUS, is Now the Largest in the Industry, Business Wire, Aug. 7, 1997.

Announcing TrueProfiler, http://web.archive.org/web/20021201123646/http://www.truecredit.com/index.asp, dated Dec. 1, 2002, 2 pages.

Applied Geographic Solutions, "What is MOSAIC™", as captured Feb. 15, 2004 from http://web.archive.org/web/20040215224329/http://www.appliedgeographic.com/mosaic.html in 2 pages.

Bitran et al., "Mailing Decisions in Catalog Sales Industry", Management Science (JSTOR), vol. 42, No. 9, pp. 1364-1381, Sep. 1996.

Brown et al., "ALCOD IDSS:Assisting the Australian Stock Market Surveillance Team's Review Process," Applied Artificial Intelligence Journal, Dec. 1, 1996, pp. 625-641.

Cantor, R. and Packer, F., "The Credit Rating Industry," FRBNY Quarterly Review, Summer-Fall, 1994, pp. 1-24.

ChannelWave.com, PRM Central—About PRM, http://web.archive.org/web/20000510214859/http://www.channelwave.com as printed on Jun. 21, 2006, May 2000 Archive.

Chatterjee et al., "Expenditure Patterns and Aggregate Consumer Behavior, Some Experiments with Australian and New Zealand Data", The Economic Record, vol. 70, No. 210, Sep. 1994, pp. 278-291.

Chen, et al., "Modeling Credit Card 'Share of Wallet': Solving the Incomplete Information Problem", New York University: Kauffman Management Center, http://www.rhsmith.umd.edu/marketing/pdfs_docs/seminarssor05/abstract%20-%20chen.pdf, Spring 2005, 48 pages.

ComScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.

Cowie, Norman, "Warning Bells & 'The Bust-Out'", Business Credit, Jul. 1, 2000, pp. 5.

Credit Card Management, "Neural Nets Shoot for Jackpot," Dec. 1995, pp. 1-6.

Credit Risk Management Report, Potomac, Mar. 9, 1998, vol. 8, No. 4.

(56) References Cited

OTHER PUBLICATIONS

CreditAnalyst, Digital Matrix Systems, as printed out Mar. 4, 2008, pp. 2.
CreditXpert Inc., CredXpert 3-Bureau Comparison™, 2002, pp. 5, http://web.archive.org/web/200308171018/http://creditxpert.com/CreditXpert%203-Bureau%20Comparison(TM)%20sample.pdf.
CreditXpert Inc., CreditXpert Credit Score & Analysis™, Jan. 11, 2000, pp. 6, http://web.archive.org/web/20030611070058/http://www.creditxpert.com/CrediXpert%20Score%20&%20Analysis%20and%20Credit%20Wizard%20sample.pdf.
CreditXpert Inc., CreidtXpert Essentials™, Advisor View—Experian on Jul. 7, 2003, http://www.creditxpert.com/cx_ess_app.pdf.
CreditXpert Inc., CreditXpert Essentials™, Advisor View—TransUnion on Oct. 10, 1999, pp. 6, http://web.archive.org/web/20041211052543/http://creditxpert.com/cx_ess_app.pdf.
CreditXpert Inc., CreditXpert Essentials™, Applicant View—TransUnion on Oct. 10, 1999, pp. 6, http://www.creditxpert.com/cx_ess_app.pdf.
CreditXpert Inc., CreditXpert What-If Simulator™, 2002, pp. 8, http://web.archive.org/web/20030630132914/http://creditxpert.com/CreditXpert%20What-If%20Simulator(TM)%20sample.pdf.
CreditXpert, http://www.creditxpert.com/Products/individuals.asp printed Oct. 12, 2012 in 1 page.
Dataman Group, "Summarized Credit Statistics," Aug. 22, 2001, http://web.archive.org/web/20010822113446/http://www.datamangroup.com/summarized_credit.asp.
David, Alexander, "Controlling Information Premia by Repackaging Asset-Backed Securities," The Journal of Risk and Insurance, Dec. 1997, 26 pages.
DeGruchy, et al., "Geodemographic Profiling Benefits Stop-Smoking Service;" The British Journal of Healthcare Computing & Information Management; Feb. 2007; 24, 7; pp. 29-31.
Dillon et al., "Good Science", Marketing Research: A Magazine of Management & Applications™, Winter 1997, vol. 9, No. 4; pp. 11.
EFunds Corporation, "Data & Decisioning: Debit Report" printed Apr. 1, 2007, http://www.efunds.com/web/industry-solutions/financial-services/frm-debit-report/htm in 1 page.
Egol, Len; "What's New in Database Marketing Software," Direct, Aug. 1994, vol. 6, No. 8, pp. 39.
Ettorre, "Paul Kahn on Exceptional Marketing," Management Review, vol. 83, No. 11, Nov. 1994, pp. 48-51.
Experian and AGS Select SRC to Deliver Complete Marketing Solutions; Partnership First to Marketplace with Census2000 Data. PR Newswire. New York: Mar. 21, 2001. p. 1.
Experian Announces PLUS Score; Experian Press Release dated Oct. 16, 2003; Experian Global Press Office.
Experian Information Solutions, Inc., Credit Trends: Access Credit Trending Information Instantly, http://kewaneecreditbureau.com/Credit.Trends.pdf, Aug. 2000, pp. 4.
Fair Isaac Announces Integrated, End-to-End Collection and Recovery Solution, Business Wire, New York, Sep. 2, 2004, p. 1.
Fickenscher, Lisa, "Merchant American Express Seeks to Mine its Data on Cardholder Spending Patterns," American Banker, vol. 162, Issue 56, Mar. 24, 1997, pp. 1-2.
GAO-03-661, Best Practices: Improved Knowledge of DOD Service Contracts Could Reveal Significant Savings, GAO, Jun. 2003.
Gilje, Shelby, "Keeping Tabs on Businesses That Keep Tabs on Us", NewsRoom, The Seattle Times, Section: SCENE, Apr. 19, 1995, pp. 4.
Gonul, et al., "Optimal Mailing of Catalogs: A New Methodology Using Estimable Structural Dynamic Programming Models", 14 pages, Management Science, vol. 44, No. 9, Sep. 1998.
Hill, Kerry, "Identity Theft Your Social Security Number Provides Avenue for Thieves", NewsRoom, Wisconsin State Journal, Sep. 13, 1998, pp. 4.
Ideon, Credit-Card Registry that Bellyflopped this Year, Is Drawing some Bottom-Fishers, The Wall Street Journal, Aug. 21, 1995, pp. C2.

"Impac Funding Introduces Enhanced Website for Static Pool Tracking of MBS Transactions", Waltham, MA; Webpage printed out from http://www.lewtan.com/press/1208044_Impac-Lewtan.htm on Mar. 20, 2008.
Internal Revenue Service Data Book 2000, Issued Aug. 2001, Revised May 2003.
International Search Report and Written Opinion for Application No. PCT/US09/37565, dated May 12, 2009.
International Search Report and Written Opinion for Application No. PCT/US2007/06070, dated Nov. 10, 2008.
Jacob et al., A Case Study of Checking Account Inquiries and Closures in Chicago, The Center for Financial Services Innovation, Nov. 2006.
Jost, Allen; Neural Networks, Credit World, Mar./Apr. 1993, vol. 81, No. 4, pp. 26-33.
"JPMorgan Worldwide Securities Services to Acquire Paloma's Middle and Back Office Operations", Webpage printed from http://www.jpmorgan.com on Apr. 1, 2009.
Lee, W.A.; "Experian, on Deal Hunt, Nets Identity Theft Insurer", American Banker: The Financial Services Daily, Jun. 4, 2003, New York, NY, 1 page.
LifeLock, "How LifeLock Works," http://www.lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock, Various Pages, www.lifelock.com/, 2007.
Longo, Tracey, "Managing Money: Your Family Finances", Kiplinger's Personal Finance Magazine, Jun. 1, 1995, vol. 49, No. 6, pp. 4.
McManus et al.; "Street Wiser," American Demographics; ABI/Inform Global; Jul./Aug. 2003; 25, 6; pp. 32-35.
Merugu, et al.; "A New Multi-View Regression Method with an Application to Customer Wallet Estimation," The 12th International Conference on Knowledge Discovery and Data Mining, Aug. 20-23, 2006, Philadelphia, PA.
Muus, et al., "A Decision Theoretic Framework for Profit Maximization in Direct Marketing", Sep. 1996, pp. 20.
Occasional CF Newsletter; http://www.halhelms.com/index.cfm?fuseaction=newsletters.oct1999, Oct. 1999.
Office of Integrated Analysis and Forecasting, DOE/EIA-M065(2004), Model Documentation Report: Macroeconomic Activity Module (MAM) of the National Energy Modeling System, EIA, Washington DC, Feb. 2004.
Official Communication in Canadian Patent Application No. 2,381,349, dated Jul. 31, 2014.
Otter, et al., "Direct Mail Selection by Joint Modeling of the Probability and Quantity of Response", Jun. 1997, pp. 14.
"Parse", Definition from PC Magazine Encyclopedia, http://www/pcmag.com/encyclopedia_term_0.2542.t=parse&i=48862.00.asp as downloaded Mar. 5, 2012.
Perlich et al., "High Quantile Modeling for Customer Wallet Estimation with Other Applications," The 13th International Conference on Knowledge Discovery and Data Mining, Aug. 12-15, 2007, San Jose, CA.
Polatoglu et al., "Theory and Methodology, Probability Distributions of Cost, Revenue and Profit over a Warranty Cycle", European Journal of Operational Research, Jul. 1998, vol. 108, Issue 1, pp. 170-183.
Powerforms: Declarative Client-Side for Field Validation, ISSN 1386-145x, Dec. 2000.
Saunders, A., "Data Goldmine," Management Today, London: Mar. 1, 2004, 6 pages.
Singletary, Michelle, "Score One for Open Credit Ratings", The Washington Post, Washington DC, Jun. 18, 2000, 3 pages.
Stanton, T.H., "Credit Scoring and Loan Scoring as Tools for Improved Management of Federal Credit Programs", Financier, Philadelphia, Summer 1999, vol. 6, 36 pages.
Stein, Benchmarking Default Prediction Models: Pitfalls and Remedies in Model Validation, Moody's KMV, Revised Jun. 13, 2002, Technical Report #020305; New York.
Sweat, Jeff; "Know Your Customers," Information Week, Nov. 30, 1998, pp. 20.

(56) References Cited

OTHER PUBLICATIONS

Truston, "Checking if your Child is an ID Theft Victim can be Stressful," as posted by Michelle Pastor on Jan. 22, 2007 at http://www.mytruston.com/blog/cred/checking_if_your_child_is_an_id_theft_vi.html.
Van Collie, Shimon, "The Road to Better Credit-Card Marketing," Bank Technology News, Sep. 1995, pp. 4.
Verstraeten, Geert, Ph.D.; Issues in predictive modeling of individual customer behavior: Applications in targeted marketing and consumer credit scoring; Unversiteit Gent (Belgium) 2005.
Watts, Craig, "Consumers Now Can Know What Loan Rate Offers to Expect Based on Their FICO Credit Score at MyFICO.com," Mar. 6, 2002, pp. 2, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health,", May 21, 2002, pp. 3, http://www.myfico.com/PressRoom/PressReleases/2002_05_21.aspx.
Webber, Richard, "The Relative Power of Geodemographics vis a vis Person and Houshold Level Demographic Variables as Discriminators of Consumer Behavior,"CASA:Working Papers Series, http://www.casa.ucl.ac.uk/working_papers/paper84.pdf, Oct. 2004, pp. 17.
Webpage printed out from http://www.fairisaac.com/NR/rdonlyres/AC4C2F79-4160-4E44-B0CB-5C899004879A/0/ScoreNetnetworkBR.pdf on Mar. 4, 2008.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
Wyatt, Craig, "Usage Models just for Merchants," Credit Card Management, Sep. 1995, vol. 8, No. 6, pp. 4.
Yücesan et al., "Distributed Web-Based Simulation Experiments for Optimization", Simulation Practice and Theory 9, 2001, pp. 73-90.
Zimmerman et al., "A Web-Based Platform for Experimental Investigation of Electric Power Auctions," Decision Support Systems, 1999, vol. 24, pp. 193-205.
U.S. Appl. No. 12/705,489, filed Feb. 12, 2010, Bargoli et al.
U.S. Appl. No. 12/705,511, filed Feb. 12, 2010, Bargoli et al.
"A New Approach to Fraud Solutions", BasePoint Science Solving Fraud, pp. 8, 2006.
"Aggregate and Analyze Social Media Content: Gain Faster and Broader Insight to Market Sentiment," SAP Partner, Mantis Technology Group, Apr. 2011, pp. 4.
"Auto Market Statistics:Drive Response with Aggregated Motor Vehicle Information"; Experian; Apr. 2007; http://www.experian.com/assets/marketing-services/product-sheets/auto-market-statistics.pdf.
"Bank of America Launches Total Security Protection™; Features Address Cardholders' Financial Safety Concerns; Supported by $26 Million National Advertising Campaign; Free Educational Materials", PR Newswire, Oct. 9, 2002, pp. 2.
"Beverly Hills Man Convicted of Operating 'Bust-Out' Schemes that Caused More than $8 Million in Losses", Department of Justice, Jul. 25, 2006, 2 Pgs.
"Bust-Out Schemes", Visual Analytics Inc. Technical Product Support, Newsletter vol. 4, Issue 1, Jan. 2005, pp. 7.
"Carbon Calculator—Calculation Explanation," Warwick University Carbon Footprint Project Group, 2005, pp. 5, http://www.carboncalculator.co.uk/explanation.php.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003.
"Fighting the New Face of Fraud", FinanceTech, http://www.financetech.com/showArticle.jhtml?articleID=167100405, Aug. 2, 2005.
"Intelligent Miner Applications Guide", IBM Corp., Apr. 2, 1999, Chapters 4-7, pp. 33-132.
"PostX to Present at Internet Showcase", PR Newswire, Apr. 28, 1997, pp. 2.

"PremierGuide Announces Release 3.0 of Local Search Platform", Business Wire, Mar. 4, 2004, Palo Alto, CA, p. 5574.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
"Japan's JAAI system appraises used cars over internet", Asia Pulse, Mar. 3, 2000.
"Mosaic" (geodemography), available from http://en.wikipedia.org/wiki/Mosaic_ (geodemography), as last modified Jul. 13, 2012. pp. 4.
"WashingtonPost.com and Cars.com launch comprehensive automotive web site for the Washington area", PR Newswire, Oct. 22, 1998.
Adzilla, Press Release, "Zillacasting Technology Approved and Patent Pending," http://www.adzilla.com/newsroom/pdf/patent_051605.pdf, May 16, 2005, pp. 2.
Akl, Selim G., "Digital Signatures: A Tutorial Survey," Computer, Feb. 1983, pp. 15-24.
Alexander, Walter, "What's the Score", ABA Banking Journal, vol. 81, 1989. [Journal Article Excerpt].
BackupBox, http://mybackupbox.com printed Feb. 8, 2013 in 2 pages.
BBC Green Home, "My Action Plan", as printed from The Wayback Machine at http://web.archive.org/web/20080513014731/http://www.bbcgreen.com/actionplan, May 13, 2008, pp. 50.
Berr: Department for Business Enterprise & Regulatory Reform, "Regional Energy Consumption Statistics", Jun. 10, 2008, http://webarchive.nationalarchives.gov.uk/20080610182444/http://www.berr.gov.uk/energy/statistics/regional/index.html.
Bult et al., "Optimal Selection for Direct Mail," Marketing Science, 1995, vol. 14, No. 4, pp. 378-394.
Burr Ph.D., et al., "Utility Payments as Alternative Credit Data: A Reality Check", Asset Builders of America, Inc., Oct. 5, 2006, pp. 1-18, Washington, D.C.
Burr Ph.D., et al., "Payment Aggregation and Information Dissemination (Paid): Annotated Literature Search", Asset Builders of America, Inc., Sep. 2005.
Caliendo, et al., "Some Practical Guidance for the Implementation of Propensity Score Matching", IZA:Discussion Paper Series, No. 1588, Germany, May 2005, pp. 32.
Chandler et al., "The Benefit to Consumers from Generic Scoring Models Based on Credit Reports", The MDS Group Atlanta, Georgia, Jul. 1, 1991, Abstract.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
Davies, Donald W., "Applying the RSA Digital Signature to Electronic Mail," Computer, Feb. 1983, pp. 55-62.
Declaration of Paul Clark, DSc. for Inter Partes Review of U.S. Pat. No. 8,504,628 (Symantec Corporation, Petitioner), dated Jan. 15, 2014 in 76 pages.
Elmasri et al., "Fundamentals of Database Systems, Third Edition (Excerpts)", Jun. 2000, pp. 253, 261, 268-270, 278-280, 585, 595.
Energy Saving Trust™, "HEED Online User Manual (1.7)", Jul. 24, 2008, pp. 18, www.energysavingtrust.org.uk, Jul. 24, 2008.
Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *Experian Marketing Solutions. Inc.*, No. 2:12-cv-00513-JRG (E.D. Tex.)) Filed Jan. 14, 2014 in 9 pages.
Experian: Improve Outcomes Through Applied Customer Insight, Brochure, Nov. 2009, pp. 20.
Experian: Mosaic Geodemographic Lifestyle Segmentation on ConsumerView [Data Card], as printed from http://datacards.experian.com/market?page=research/datacard_print&prin, Apr. 6, 2012, pp. 4.
Experian: Mosaic Public Sector 2009 Launch, 2009, pp. 164.
Experian: Mosaic UK—Unique Consumer Classification Based on In-Depth Demographic Data, as printed from http://www.experian.co.uk/business-strategies/mosaic-uk.html, Jul. 30, 2012, pp. 2.

(56) References Cited

OTHER PUBLICATIONS

Experian: Mosaic UK—Optimise the Value of Your Customers and Locations, Now and in the Future, Brochure, 2010, pp. 24.
Experian: Mosaic United Kingdom, Brochure, Jun. 2009, pp. 24.
Experian: Mosaic USA, Brochure, May 2009, pp. 14.
Experian: Mosaic USA—Consumer Lifestyle Segmentation [Data Card], Dec. 2009, pp. 2.
Experian: Public Sector, as printed form http://publicsector.experian.co.uk/Products/Mosaicpublicsector.aspx, 2012, pp. 2.
Experian-Scorex Announces New Credit Simulation Tool, PR Newswire, Costa Mesa, CA, Jun. 13, 2005.
Fanelli, Marc, "Building a Holistic Customer View", MultiChannel Merchant, Jun. 26, 2006, pp. 2.
Findermind, "PeopleFinders Review", as archived Jun. 1, 2012 in 4 pages. http://web.archive.org/web/20120601010134/http://www.findermind.com/tag/peoplefinders-review/.
First Amended Complaint in Civil Action No. 2:12-cv-511-JRG (*Rpost Holdings, Inc. and Rpost Communications Limited* V. *Constant Contact, Inc.; et al.*) filed Feb. 11, 2013 in 14 pages.
First Amended Complaint in Civil Action No. 2:12-cv-511-JRG (*Rpost Holdings, Inc. and Rpost Communications Limited* V. *Epsilon Data Management, LLC.*) filed Sep. 13, 2013 in 9 pages.
First Amended Complaint in Civil Action No. 2:12-cv-513-JRG (*Rpost Holdings, Inc. and Rpost Communications Limited* V. *Experian Marketing Solutions, Inc.*) filed Aug. 30, 2013 in 9 pages.
Frontporch, "Ad Networks-Partner with Front Porch!," www.frontporch.com printed Apr. 2008 in 2 pages.
Frontporch, "New Free Revenue for Broadband ISPs!", http://www.frontporch.com/html/bt/FPBroadbandISPs.pdf printed May 28, 2008 in 2 pages.
Garcia-Molina, "Database Systems: The Complete Book", Prentice Hall, 2002, pp. 713-715.
Haughton et al., "Direct Marketing Modeling with CART and CHAID", Journal of Direct Marketing, Fall 1997, vol. 11, No. 4, pp. 42-52.
Hojoki, http://hojoki.com printed Feb. 8, 2013 in 5 pages.
IFTTT, "About IFTTT," http://ifttt.com/wtf printed Feb. 18, 2013 in 4 pages.
Instant Access to Credit Reports Now Available Online with DMS' CreditBrowser-based system also Simplifies Credit Decisioning and Offers a Central Point of Control, Business Wire, p. 0264, Dallas, May 23, 2000.
International Preliminary Report and Written Opinion in PCT/US2008/064594, dated Dec. 10, 2009.
International Preliminary Report on Patentability for Application No. PCT/US2013/052342, dated Feb. 5, 2015.
International Search Report and Written Opinion for Application No. PCT/US2008/064594, dated Oct. 30, 2008.
International Search Report and Written Opinion for Application No. PCT/US2013/052342, dated Nov. 21, 2013.
Jowit, Juliette, "Ever wondered how big your own carbon footprint might be?", Nov. 4, 2007, pp. 4, http://www.guardian.co.uk/money/2007/nov/04/cash.carbonfootprints/print.
Karlan et al., "Observing Unobservables:Identifying Information Asymmetries with a Consumer Credit Field Experiment", Jun. 17, 2006, pp. 58, http://aida.econ.vale.edu/karlan/papers/ObservingUnobservables.KarlanZinman.pdf.
Kessler, Josh "How to Reach the Growing 'Thin File' Market: Huge Immigration Market and Other Groups with Little or No Credit History May Be Creditworthy. There are Several Ways to Tap This Well of Business", ABA Banking Journal, vol. 97, 2005.
King et al., Local and Regional CO2 Emissions Estimates for 2004 for the UK, AEA Energy & Environment, Report for Department for Environment, Food and Rural Affairs, Nov. 2006, London, UK, pp. 73.
Klein, et al., "A Constant-Utility Index of the Cost of Living", The Review of Economic Studies, pp. 84-87, vol. XV-XVI, Kraus Reprint Corporation, New York, 1960.

Klein, et al., "An Econometric Model of the United States: 1929-1952", North-Holland Publishing Company, Amsterdam, 1955, pp. 4-41.
Klein, Lawrence R., "The Keynesian Revolution", New York, The MacMillan Company, 1947, pp. 56-189.
Kohavi, Ron, "A Study of Cross-Validation and Bootstrap for Accuracy Estimation and Model Selection", Internation Joint Conference on Artificial Intelligence, 1995, pp. 7.
Lamons, Bob, "Be Smart: Offer Inquiry Qualification Services," Marketing News, ABI/Inform Global, Nov. 6, 1995, vol. 29, No. 23, pp. 13.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.
LifeLock, http://web.archive.org/web/20110724011010/http://www.lifelock.com/? as archived Jul. 24, 2011 in 1 page.
McNamara, Paul, "Start-up's pitch: The Envelope, please," Network World, Apr. 28, 1997, vol. 14, No. 17, p. 33.
Miller, Joe, "NADA used-car prices go online", Automotive News, Jun. 14, 1999, p. 36.
Mint.com, http://www.mint.com/how-it-works/ printed Feb. 5, 2013 in 2 pages.
Mover, "One API for the Cloud," http://mover.io printed Feb. 6, 2013 in 3 pages.
MyReceipts—How it Works, http://www.myreceipts.com/howItWorks.do, printed Oct. 16, 2012 in 1 page.
MyReceipts, http://www.myreceipts.com/, printed Oct. 16, 2012 in 1 page.
NebuAd, "Venture Capital: What's New—The Latest on Technology Deals From Dow Jones VentureWire", Press Release, http://www.nebuad.com/company/media_coverage/media_10_22_07.php, Oct. 22, 2007, pp. 2.
Organizing Maniac's Blog—Online Receipts Provided by MyQuickReceipts.com, http://organizingmaniacs.wordpress.com/2011/01/12/online-receipts-provided-by-myquickreceipts-com/ dated Jan. 12, 2011 printed Oct. 16, 2012 in 3 pages.
Otixo, "Your Dashboard for the Cloud," http://Otixo.com/product printed Feb. 6, 2013 in 3 pages.
Padgett et al., "A Comparison of Carbon Calculators", Environmental Impact Assessment Review 28, pp. 106-115, Jun. 7, 2007.
Perry et al., "Integrating Waste and Renewable Energy to Reduce the Carbon Footprint of Locally Integrated Energy Sectors", Energy 33, Feb. 15, 2008, pp. 1489-1497.
Petition for Covered Business Method Patent Review in U.S. Pat. No. 8,161,104 (*Experian Marketing Solutions, Inc., Epsilon Data Management, LLC, and Constant Contact, Inc.*, v. *Rpost Communications Limited*) dated Jan. 29, 2014 in 90 pages.
Phorm, "BT PLC TalkTalk and Virgin Media Inc. confirm exclusive agreements with Phorm", Press Release, http://www.phorm.com/about/launch_agreement.php, Feb. 14, 2008, pp. 2.
Phorm, "The Open Internet Exchange, 'Introducing the OIX'", http://www.phorm.com/oix/ printed May 29, 2008 in 1 page.
Pipes, http://pipes.yahoo.com/pipes printed Feb. 18, 2013 in 1 page.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Planwise, http://planwise.com printed Feb. 8, 2013 in 5 pages.
PostX, "PostX® Envelope and ActiveView", http://web.archive.org/web/19970714203719/http://www.postx.com/priducts_fm.html, Jul. 14, 1997 (retrieved Nov. 7, 2013) in 2 pages.
Primadesk, http://primadesk.com printed Feb. 8, 2013 in 1 page.
PrivacyGuard, http://web.archive.org/web/20110728114049/http://www.privacyguard.com/ as archived Jul. 28, 2011 in 1 page.
RapUP, Attribute Management & Report Systems:Absolute Advantage!, Magnum Communications Brochure, Copyright 2004, pp. 5.
Rodgers, Zachary, "ISPs Collect User Data for Behavioral Ad Targeting", ClickZ, www.clickz.com/showPage.html?page=clickz, Jan. 3, 2008, pp. 3.
Rosset et al., "Wallet Estimation Models", IBM TJ Watson Research Center, 2005, Yorktown Heights, NY, pp. 12.

(56) References Cited

OTHER PUBLICATIONS

Sakia, R.M., "The Box-Cox Transformation Technique: a Review", The Statistician, 41, 1992, pp. 169-178.
SalesLogix.net, SalesLogix Sales Tour, Apr. 11, 2001, http:///www.saleslogix.com, pp. 19.
Sawyers, Arlena, "NADA to Offer Residual Guide", Automotive News, May 22, 2000, p. 3.
Schmittlein et al., "Customer Base Analysis: An Industrial Purchase Process Application", Marketing Science, vol. 13, No. 1, Winter 1994
ServiceObjects, "DOTS Web Services—Product Directory", http://www.serviceobjects.com/products/directory_of_web_services.asp printed Aug. 17, 2006 in 4 pages.
ShoeBoxed, https://www.shoeboxed.com/sbx-home/ printed Oct. 16, 2012 in 4 pages.
Smith, Richard M., "The Web Bug FAQ", Nov. 11, 1999, Version 1.0, pp. 4.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
Source Code Appendix attached to U.S. Appl. No. 08/845,722 by Venkatraman et al., Exhibit A, Part 1 & 2, pp. 32.
Stone, "Linear Expenditure Systems and Demand Analysis: An Application to the Pattern of British Demand", The Economic Journal: The Journal of The Royal Economic Society, Sep. 1954, pp. 511-527, vol. LXIV, Macmillan & Co., London.
Storage Made Easy(SME), http://storagemadeeasy.com printed Feb. 6, 2013 in 1 page.
Sumner, Anthony "Tackling the Issue of Bust-Out Fraud", e-News, Experian: Decision Analytics, pp. 4, [Originally Published in Retail Banker International Magazine Jul. 24, 2007].
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", Retail Banker International, Jul. 24, 2007, pp. 4.
Tao, Lixin, "Shifting Paradigms with the Application Service Provider Model"; Concordia University, IEEE, Oct. 2001, Canada.
Thoemmes, Felix, "Propensity Score Matching in SPSS", Center for Educational Science and Psychology, University of Tübingen, Jan. 2012.
White, Ron, "How Computers Work", Millenium Edition, Que Corporation, Indianapolis, IN, Sep. 1999. [Uploaded in 2 parts].
Wiedmann, et al., "Report No. 2: The use of input-output analysis in REAP to allocate Ecological Footprints and material flows to final consumption categories", Resources and Energy Analysis Programme, Stockholm Environment Institute—York, Feb. 2005, York, UK, pp. 33.
Wilson, Andrea, "Escaping the Alcatraz of Collections and Charge-Offs", http://www.transactionworld.net/articles/2003/october/riskMgmt1.asp, Oct. 2003.
Working, Holbrook, "Statistical Laws of Family Expenditure", Journal of the American Statistical Association, pp. 43-56, vol. 38, American Statistical Association, Washington, D.C., Mar. 1943.
Zapier, "Integrate Your Web Services," http://www.Zapier.com printed Feb. 18, 2013 in 3 pages.
"A Google Health update," Google Official Blog, Sep. 15, 2010 in 4 pages, http://googleblog.blogspot.com/2010/09/google-health-update.html.
Amo, Tina, "How to Find Out Who Has Lived in Your House Before You", https://web.archive.org/web/20130327090532/http://homeguides.sfgate.com/out-lived-house-before-50576.html as archived Mar. 27, 2013, pp. 2.
Babcock, Gwen, "Aggregation Without Aggravation: Determining Spatial Contiguity and Joining Geographic Areas Using Hashing", SAS Global Forum 2010, Reporting and Information Visualization, Paper 223-2010, pp. 17.
Corepoint Health, "The Continuity of Care Document—Changing the Landscape of Healthcare Information Exchange," Jan. 2009, pp. 9.
Dankar et al., "Efficient Private Information Retrieval for Geographical Aggregation", Procedia Computer Science, 2014, vol. 37, pp. 497-502.
Dé, Andy, "Will mHealth Apps and Devices Empower ePatients for Wellness and Disease Management? A Case Study," Jan. 10, 2011 in 6 pages, http://www.healthsciencestrategy.com/2011/04/will-mhealth-apps-and-devices-empower-epatients-for-wellness-and-disease-management-a-case-study-2/.
Downey, Sarah A., "Smile, you're on Spokeo.com! Concerned? (here's what to do)", https://www.abine.com/blog/2011/how-to-remove-yourself-from-spokeo/, as posted Jan. 13, 2011 in 7 pages.
Equifax; "White Paper: Driving Safe Growth in a Fluid Economy", http://www.equifax.com/assets/USCIS/efx_safeGrowth_wp.pdf, Oct. 2012 in 14 pages.
Equifax; "True In-Market Propensity Scores™", http://www.equifax.com/assets/USCIS/efx-00174-11-13_efx_tips.pdf, Nov. 2013 in 1 page.
"Experian Helps Verify the Identity of Patients and Provide Secure Enrollment to Healthcare Portals by Integrating with Major Electronic Medical Records Platform," http://press.experian.com/United-States/Press-Release/experian-helps-verify-the-identity-of-patients-and-provide-secure-enrollment-to-healthcare.aspx?&p=1, Dec. 19, 2013, pp. 2.
Experian; "Case study: SC Telco Federal Credit Union", http://annualcreditreport.experian.com/assets/consumer-information/case-studies/sc-telco-case-study.pdf, Jun. 2011 in 2 pages.
Experian; "In the Market ModelsSM", http://www.experian.com/assets/consumer-information/product-sheets/in-the-market-models.pdf, Sep. 2013 in 2 pages.
Fisher, Joseph, "Access to Fair Credit Reports: Current Practices and Proposed Legislation," American Business Law Journal, Fall 1981, vol. 19, No. 3, p. 319.
Gao et al., "Exploring Temporal Effects for Location Recommendation on Location-Based Social Networks", RecSys'13, Oct. 12-16, 2013, Hong Kong, China, pp. 93-100.
"Geographic Aggregation Tool SAS Beta Version 4.1", Environmental Health Surveillance Section, New York State Dept. in Health, Troy, NY, Mar. 24, 2015, pp. 10.
Glenn, Brandon, "Multi-provider patient portals get big boost with ONC ruling", Feb. 25, 2013, http://medicaleconomics.modernmedicine.com/medical-economics/news/user-defined-tags/meaningful-use/multi-provider-patient-portals-get-big-boost in 2 pages.
Hampton et al., "Mapping Health Data: Improved Privacy Protection With Donut Method Geomasking", American Journal of Epidemiology, Sep. 3, 2010, vol. 172, No. 9, pp. 8.
Healow.com, Various screenshots from page titled "Health and Online Wellness," https://healow.com/apps/jsp/webview/index.jsp printed Aug. 19, 2013 in 4 pages.
Healthspek.com, "How Good Are We?" http://healthspek.com/how-good-are-we/ printed Jan. 21, 2014 in 2 pages.
"Healthspek Users Can Now Import Their Doctors' Records into Their Personal Health Record," PRWeb, Nashville, TN, Jan. 14, 2014, pp. 1 http://www.prweb.com/releases/2014/01/prweb11485346.htm.
HealthVault, "Share Health Information," https://account.healthvault.com/sharerecord.aspx, printed Feb. 20, 2013 in 2 pages.
HealthVault, "What Can you do with HealthVault?" https://www.healthvault.com/us/en/overview, http://www.eweek.com/mobile/diversinet-launches-mobihealth-wallet-for-patient-data-sharing/, printed Feb. 20, 2013 in 2 pages.
Horowitz, Brian T., "Diversinet Launches MobiHealth Wallet for Patient Data Sharing," eWeek, Dec. 4, 2012, http://www.eweek.com/mobile/diversinet-launches-mobihealth-wallet-for-patient-data-sharing/.
igiHealth.com, "Orbit® PHR: Personal Health Record (PHR)," http://www.igihealth.com/consumers/orbit_phr.html, printed Jan. 21, 2014 in 2 pages.
InsightsOne.com, "Healthcare," http://insightsone.com/healthcare-predictive-analytics/ printed Mar. 6, 2014 in 5 pages.
Kwan et al., "Protection of Geoprivacy and Accuracy of Spatial Information: How Effective are Geographical Masks?", Carographica, Summer 2004, vol. 39, No. 2, pp. 15-27.

(56) References Cited

OTHER PUBLICATIONS

Lovelace, Robin, "IPFinR: An Implementation of Spatial Microsimulation in R", RL's Powerstar, Jun. 12, 2013, pp. 9, https://robinlovelace.wordpress.com/2013/06/12/ipfinr-an-implementation-of-spatial-microsimulation-in-r/.

Maciejewski et al., "Understanding Syndromic Hotspots—A Visual Analytics Approach", Conference Paper, IEEE Sumposium on Visual Analytics Science and Technoloby, Oct. 21-23, 2017, pp. 8.

MergePower, Inc., "Attribute Pro", http://web.archive.org/web/20060520135324/http://www.mergepower.com/attribute_pro.html, dated May 20, 2006 in 1 page.

MergePower, Inc., "Attribute Pro", http://web.archive.org/web/20080708204709/http:/www.mergepower.com/APInfo.aspx, dated Jul. 8, 2008 in 2 pages.

MergePower, Inc., "Attribute Pro®—Credit Bureau Attributes", http://web.archive.org/web/20120307000028/http:/www.mergepower.com/APInfo.aspx, dated Mar. 7, 2012 in 2 pages.

MergePower, Inc., "MergePower, Inc", http://web.archive.org/web/20060513003556/http:/www.mergepower.com/, dated May 13, 2006 in 1 page.

MergePower, Inc., "MergePower, Inc", http://web.archive.org/web/20070208144622/http:/www.mergepower.com/, dated Feb. 8, 2007 in 1 page.

MergePower, Inc., "MergePower, Inc", http://web.archive.org/web/20070914144019/http:/www.mergepower.com/, dated Sep. 14, 2007 in 1 page.

MergePower, Inc., "MergePower, Inc", http://web.archive.org/web/20110828073054/http:/www.mergepower.com/, dated Aug. 28, 2011 in 2 pages.

MERit Credit Engine™, Diagram, http://creditengine.net/diagram.htm, copyright 1997, pp. 1.

"New FICO score extends lenders' reach to credit-underserved millions", Viewpoints: News, Ideas and Solutions from Fair Isaac, Sep./Oct. 2004 as downloaded from http://www.fairisaac.com/NR/exeres/F178D009-B47A-444F-BD11-8B4D7D8B3532,frame . . . in 6 pages.

Pagano, et al., "Information Sharing in Credit Markets," Dec. 1993, The Journal of Finance, vol. 48, No. 5, pp. 1693-1718.

Partnoy, Frank, Rethinking Regulation of Credit Rating Agencies: An Institutional Investor Perspective, Council of Institutional Investors, Apr. 2009, pp. 21.

Shvachko et al., "The Hadoop Distributed File System", 2010 IEEE 26th Symposium on Mass Storage Systems and Technologies (MSST), May 3, 2010, pp. 1-10.

"STAGG Variables Sum Up Credit Attributes for Automated Decisions", PRWeb, May 11, 2011, pp. 2. http://www.prweb.com/releases/2011/5/prweb8404324.htm.

Tennant, Don, "How a Health Insurance Provider Uses Big Data to Predict Patient Needs," http://www.itbusinessedge.com/blogs/from-under-the-rug/how-a-health-insurance-provider-uses-big-data-to-predict-patient-needs.html, printed Mar. 6, 2014 in 2 pages.

Yuan et al., "Time-Aware Point-of-Interest Recommendation", SIGIR'13, Jul. 28-Aug. 1, 2013, Dublin, Ireland, pp. 363-372.

Zandbergen, Paul A., "Ensuring Confidentiality of Geocoded Health Data: Assessing Geographic Masking Strategies for Individual-Level Data", Review Article, Hindawi Publishing Corporation, Advances in Medicine, VI. 2014, pp. 14.

International Search Report for Application No. PCT/US2005/041814, dated Aug. 29, 2007.

International Search Report and Written Opinion in PCT Application No. PCT/US07/76152, dated Mar. 20, 2009.

International Search Report and Written Opinion for Application No. PCT/US2017/048265, dated Dec. 5, 2017.

International Search Report and Written Opinion for Application No. PCT/US2017/068340, dated Feb. 26, 2018.

\* cited by examiner

SYSTEMS AND METHODS FOR DYNAMIC REPORT GENERATION BASED ON AUTOMATIC MODELING OF COMPLEX DATA STRUCTURES

INCORPORATION BY REFERENCE TO ANY PRIORITY APPLICATIONS

This application claims priority benefit under 35 U.S.C. § 119(e) to U.S. Provisional Application No. 62/094,819, filed on Dec. 19, 2014, entitled "Systems and Interactive User Interfaces for Database Access and Application of Rules to Determine Recommendations for User Actions," the disclosure of which is incorporated herein by reference in its entirety. Any and all applications for which a foreign or domestic priority claim is identified in the Application Data Sheet as filed with the present application, or any correction thereto, are hereby incorporated by reference under 37 CFR 1.57.

This application is also related to U.S. application Ser. No. 14/975,654 (now U.S. Pat. No. 10,242,019) filed on the same day as the present application, entitled "USER BEHAVIOR SEGMENTATION USING LATENT TOPIC DETECTION," the disclosure of which is hereby incorporated herein by reference in its entirety.

This application is also related to U.S. application Ser. No. 14/975,536 filed on the same day as the present application, entitled "SYSTEMS AND METHODS FOR GENERATING ENTITY RECOMMENDATION DATA," the disclosure of which is hereby incorporated herein by reference in its entirety.

BACKGROUND

With the advent of modern computing devices and communication networks, the ways in which users use electronic devices to interact with various entities has dramatically increased. Each user event—whether by making a small purchase at a grocery store, logging into a web-site, checking out a book from a library, driving a car, making a phone call, or exercising at the gym—can be tracked. The availability of this data makes it possible to analyze a user's event behaviors and take actions based on the analysis.

One particular advantage of having access to such event data is the ability to identify when a user's activity patterns change. A change in a user's behavior may signal an opportunity for an interested party (e.g., a merchant or a credit issuer) to actively engage the user to motivate or otherwise incentivize the user to transact. The change in behavior may also provide an opportunity for the interested party to engage the user to gain an understanding of the user's reasons for changing behavior.

SUMMARY

Various systems and methods are disclosed for accessing and traversing disparate, complex, and multi-dimensional data structures to dynamically and interactively generate reports based on automated modeling of complex and non-uniformly formatted data. Automated analysis of probabilistic functions and temporal based data records enable non-technical users to quickly and dynamically act on time-sensitive information. In response to various user inputs, the system automatically accesses and traverses complex data structures (including, for example, frequency distribution models) calculates complex data based on the traversals, displays the calculated complex data to the user, and enters the calculated complex data into the reports.

This disclosure presents systems, methods, devices, and non-transitory, computer-readable media directed to accessing and traversing disparate, complex, and multi-dimensional data structures to analyze event behavior of populations of users and of individual users. In particular, changes in an individual user's event behavior may be detected, and timely, actionable alerts may be transmitted to interested parties.

According to one embodiment, a system dynamically generates event frequency distribution models for populations and for individual users by automatically modeling data traversed, accessed, and derived from complex and multi-dimensional data structures. The system employs principles of artificial intelligence and machine-learning to automatically update the event frequency distribution models. The system performs automated analysis of probabilistic functions and temporal-based data records to enable non-technical clients and users to quickly and dynamically act on time-sensitive information. In certain embodiments, the system enables real-time analysis and corresponding action in response to event triggers.

In one embodiment, various client inputs are provided interactively. In response to the inputs, the system automatically accesses and traverses complex and disparate data structures, calculates complex data based on the traversals, automatically generates probabilistic event frequency distribution models to predict future behavior, displays the calculated complex data and models to the client, and enters the calculated complex data into reports that are generated for and transmitted to the client.

In certain embodiments, an event frequency distribution model is constructed for each user. The event frequency distribution model may be based, initially, on the event data of a population relevant to the user as well as the user's historical event behavior. The event frequency distribution model provides the likelihood that the user will perform a particular event in the future. Future event behavior (i.e., new events or a lack of new events) cause changes to this distribution model. If a preset unlikeliness threshold is exceeded an alert may be generated. These event frequency distribution models can be constructed for a user's overall volume of events and/or for a user's events in certain categories and/or sub-categories of events that a client might wish to monitor. Advantageously, event change alerts may be transmitted to the interested entities when specific conditions are met. In one embodiment, the output of this solution is zero or more event change alerts for each user for whom a significant change in event behavior has occurred. Additional information about the user, for example attributes describing the user's recent behavior or characteristics of the user's event frequency distribution model can also be included in the event alert output to assist interested parties in acting on the provided information.

According to an embodiment, a computing system is configured to access one or more electronic data sources in response to periodic automated inquiries in order to automatically calculate data for inclusion into a report. The computing system comprises a computer processor that is configured to execute software instructions and a non-transitory storage device storing a plurality of software components. The software components include, without limitation, a data aggregation component that is configured to access a plurality of event records associated with respective users, where each of the event records indicates an event made by the associated respective user. For each of the event records, the data aggregation component assigns a category to the event record. The category is selected from a plurality of predetermined categories. Another of the software components is an event distribution component configured to generate a baseline event frequency distribution model that indicates a likelihood of an event by a generic user based on the accessed plurality of event records. The event distribution component also generates a user profile for a particular user, wherein the user profile comprises categorized event records associated with the particular user during a set time period. The event distribution component updates the baseline event frequency distribution model, based on the categorized event records in the user profile of the particular user, to generate a user event frequency distribution model. Another software component is an event distribution update component configured to periodically access event data sources to determine whether there is an additional event record associated with the particular user that has not been analyzed by the computing system. In response to determining that there is an additional event record associated with the particular user that has not been analyzed by the computing system, the event distribution update component updates the user event frequency distribution model based on the additional event record to form an updated user event frequency distribution model. Another software component is an event change alert component configured to access the generated user profile for the particular user and the updated user event frequency distribution model. The component determines a gap, indicating a time period since a last event by the particular user occurred, and compares the determined gap to a gap limit that indicates an expected period of time between events. In response to determining that the gap is greater than the gap limit, the event change alert component generates an event change alert and transmits, to a client system, the generated event change alert.

In one aspect of the present disclosure, the event change alert component is further configured to determine, in response to determining that the gap is greater than the gap limit, if a filter condition exists, and in response to determining that a filter condition does not exist, generate an event change alert.

In another aspect of the present disclosure, the gap limit is a period of time in which the particular user is expected to perform a next event within a specified probability, the gap limit being based on the updated user event frequency distribution model for the particular user.

In another aspect of the present disclosure, the gap limit is a period of time within which the particular user is expected to perform a next event, for example, a ninety-five percent (95%) probability, based on the updated user event frequency distribution model for the particular user.

In another aspect of the present disclosure, the event distribution component is further configured to generate a category baseline event frequency distribution model for a particular category. The model indicates a likelihood of an event in the particular category by a generic user based on a set of the accessed plurality of event records that are assigned to the particular category. The event distribution component is also configured to update the generated category baseline event frequency distribution model for the particular category based on a set of the categorized event records of the particular user and associated with the particular category to generate a category-specific user event frequency distribution model.

In another aspect of the present disclosure, the event distribution update component is further configured to periodically access event data sources to determine whether there is an additional event record associated with the particular user and with the particular category, and in response to determining that there is an additional event record associated with the particular user and with the particular category, update the category-specific user event frequency distribution model based on the determined additional event record.

In another aspect of the present disclosure, the event change alert component is further configured to determine a second gap, indicating a time period since a last event by the particular user associated with the particular category occurred, and compare the second gap to a second gap limit indicating an expected period of time between events associated with the particular user and with the particular category. In response to determining that the second gap is greater than the second gap limit, the event change alert component is configured to generate a category-specific event change alert, and to transmit, to a client system, the category-specific event change alert.

In another aspect of the present disclosure, the event distribution update component is further configured to generate an event frequency distribution model for the additional event record associated with the particular user, and calculate a weighted sum of the event distribution for the additional event record and the user event frequency distribution model to generate the updated user event frequency distribution model.

In another aspect of the present disclosure, the event frequency distribution model for the additional event record associated with the particular user comprises a distribution having a one hundred percent (100%) probability of occurring within a time period between a last event by the particular user and a time of an event associated with the additional event record associated with the particular user. In another embodiment, the event frequency distribution model for the additional event record associated with the particular user comprises a distribution centered on a time period between a last event by the particular user and a time of an event associated with the additional event record.

In another aspect of the present disclosure, the event change alert component is further configured to generate the event change alert comprising an identification of an event category associated with the event change alert, a number of days since a last event by the particular user occurred, and a number of events performed by the particular user within a preceding two months.

In another aspect of the present disclosure, the event change alert component is further configured to, in response to determining that a filter condition exists, determine whether the filter condition is met, and in response to determining that a filter condition is not met, generate an event change alert indicating that the gap is greater than the gap limit and transmit, to a client system, the event change alert. The event change alert includes an identification of an event category associated with the event change alert, a number of days since a last event by the particular user occurred, and a number of events performed by the particular user within the preceding two months.

In another aspect of the present disclosure, the computing system further comprises a card reader in communication with the computer processor. The card reader includes an event information detector configured to detect event information for an event of a user, a targeted content generator configured to receive event data during the event of the user, and to identify content stored by the card reader using a comparison between a content selection rule and the event data, the content for presentation via the card reader, and a display configured to present the content to the user.

According to another embodiment, a method of automatically generating a transaction frequency change alert is disclosed. The method comprises accessing, from a raw transaction data store, a plurality of transaction records associated with respective users. Each of the transaction records includes attributes of a transaction made by the associated respective user. The method also includes accessing, from a categorized transaction data store, a transaction categories data structure including a plurality of transaction categories and, for each transaction category, attribute criteria usable to identify transactions associated with respective transaction categories. For each of the accessed plurality of transaction records, the method identifies one or more of the attributes of the transaction record and compares the identified one or more attributes of the transaction record to the attribute criteria of respective transaction categories to identify a transaction category among the plurality of transaction categories that matches the one or more attributes of the transaction record. The method categorizes the accessed transaction record with the identified transaction category and stores, in the categorized transaction data store, a plurality of categorized transaction records. The method also accesses, from the categorized transaction data store, the plurality of categorized transaction records and determines, for each user and for each pair of consecutive transactions of the user based on the accessed plurality of categorized transaction records, a time between transactions. The method generates, based on the determined time between transactions, a user base transaction frequency distribution model that indicates a likelihood of a transaction by a generic user based on the accessed plurality of categorized transaction records. The method identifies, from the accessed plurality of categorized transaction records, a first plurality of categorized transaction records associated with a first user and updates the generated user base transaction frequency distribution model based on the first plurality of categorized transaction records to generate a first user transaction frequency distribution model. The method periodically accesses, from the categorized transaction data store, additional categorized transaction records to determine whether there is an additional categorized transaction record associated with the first user which has not been analyzed, and in response to determining that there is an additional categorized transaction record associated with the first user that has not been analyzed, the method updates the first user transaction frequency distribution model based on the additional categorized transaction record. The method accesses the updated first user transaction frequency distribution model and determines a time duration since a last transaction by the first user occurred and compares the determined time duration to a threshold period of time. The threshold period of time indicates an expected period of time between transactions. In response to determining that the time duration is greater than the threshold period of time, the method generates a spend change alert and transmits, to a client system, the generated spend change alert.

DETAILED DESCRIPTION

Figure 1:
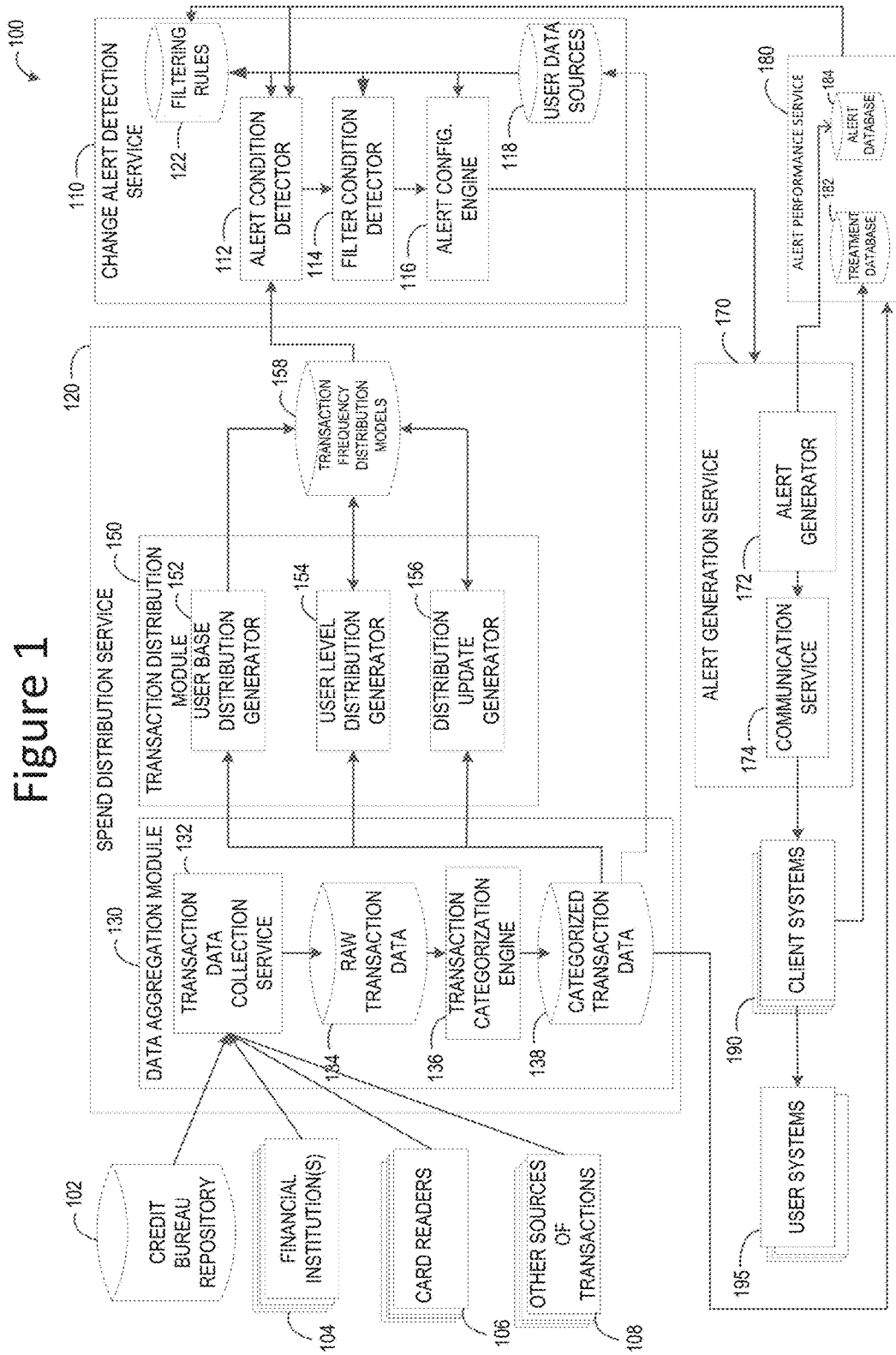
FIG. 1 is a functional block diagram of an example of a transaction data spend change alert system.

Disclosed herein are systems, methods, devices, and non-transitory, computer-readable media for accessing, traversing, analyzing, processing, and manipulating complex, multi-dimensional data structures having large sets of transaction data (also referred to herein as "event data") of users to provide automated reports, visualizations, alerts, and other actionable intelligence to merchants, users, and others. The transaction data structures may include, for example, specific transactions (also referred to herein as "events") on one or more credit cards of a user, such as the detailed transaction data that is available on credit card statements. Transaction data may also include transaction-level debit information, such as regarding debit card or checking account transactions. The transaction data may be obtained from various sources, such as from credit issuers (e.g., financial institutions that issue credit cards), transaction processors (e.g., entities that process credit card swipes at points-of-sale), transaction aggregators, merchant retailers, and/or any other source. Transaction data may also include non-financial exchanges, such as for example, login activity, Internet search history, Internet browsing history, posts to a social media platform, or other interactions between communication devices. In some implementations, the users may be machines interacting with each other (e.g., machine-to-machine communications).

This disclosure describes unique methods of accessing, traversing, and processing event data. In general, the features relate to probabilistic modeling and analysis of user transaction data which enable prediction of a user's transactional behavior based on that user's transactional history. The disclosure describes automated analysis of probabilistic functions and temporal-based data records to enable non-technical users to quickly and dynamically act on time-sensitive information. More particularly, the disclosure relates to machine-learning as applied to tracking the spending behavior of users, possibly within certain segments or categories, and predicting a likelihood of the user transacting in one or more particular segments within a certain time frame, again based largely on the transaction data of the user and/or populations of users. Further aspects are described for including features in transaction processing data flows and devices such as card readers or point-of-sale systems. Features for identifying targeted users and for providing content to the targeted users based on spending activity, and in particular, on changes in spending activity, are also included.

In some embodiments, a user's transaction data may be analyzed and processed to create a transaction frequency distribution model that may be used to predict a likelihood of the user spending in one or more particular segments or categories within a certain time frame. Advantageously, the transaction data spend change alert system may detect downward changes in the frequency and/or volume of a user's transactions, and provide alerts of such changes to merchants and/or other interested parties (i.e., clients).

Figure 10:
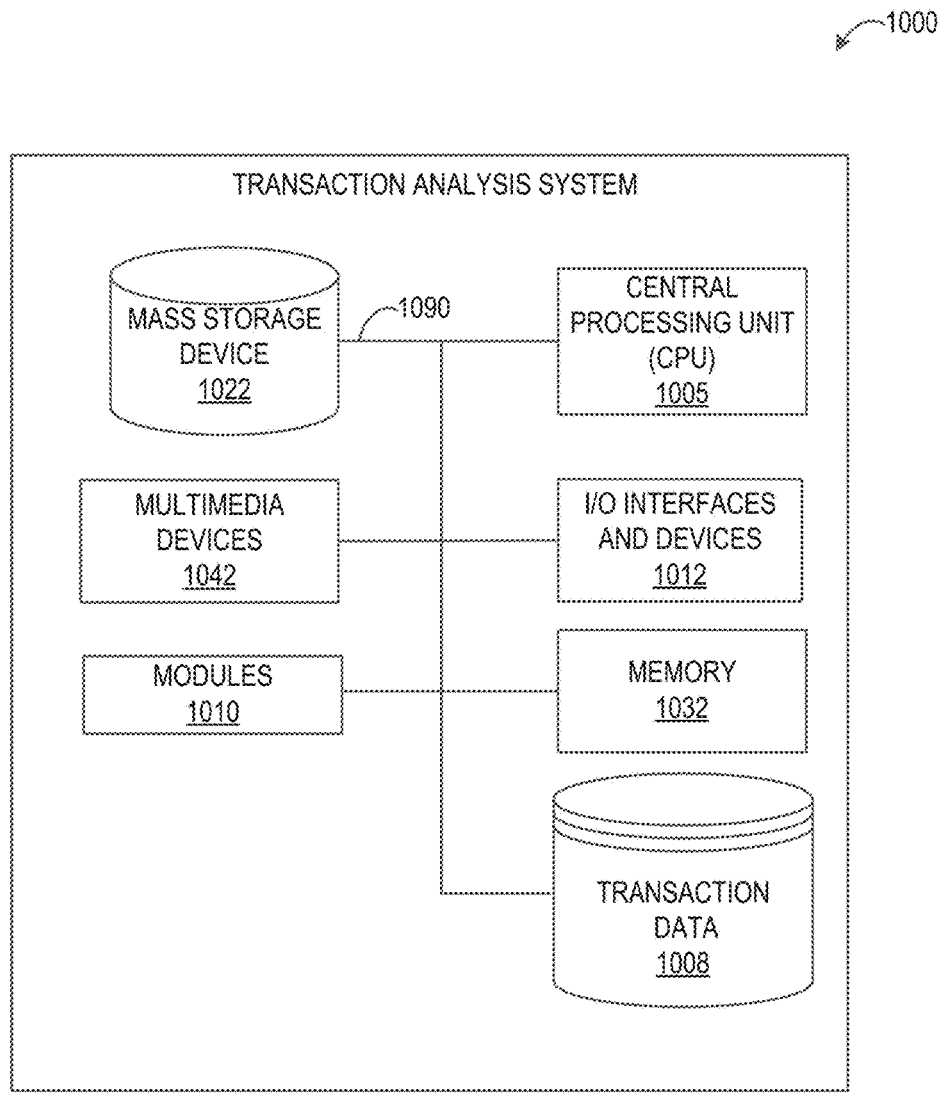
FIG. 10 is a block diagram showing example components of a computing system that may be used to implement the transaction data spend change alert system.

Each of the processes described herein may be performed by a transaction data spend change alert processing system (also referred to herein as "the system," "the transaction spend change alert system," or "the processing system"), which may be implemented in a computing system such as the example computing system illustrated in FIG. 10 and discussed below. In other embodiments, other processing systems, such as systems including additional or fewer components than are illustrated in FIG. 10 may be used to implement and perform the processes. In other embodiments, certain processes are performed by multiple processing systems, such as one or more servers performing certain processes in communication with a client's or a user's computing device (e.g., mobile device) that performs other processes.

As noted above, in one embodiment the transaction data spend change alert system accesses transaction data associated with a user (and populations of users) to generate a transaction frequency distribution model for the user. This transaction frequency distribution model provides an assessment of the user's historical transactional activity that may be used to probabilistically predict the user's future transactions. In particular, the transaction data spend change alert system can identify when the user's spending activity decreases, generate one or more spend change alerts, and transmit the generated spend change alerts to one or more clients, enabling the clients to take actions, such as, by way of non-limiting example, sending promotional materials to the user.

Exemplary Definitions

To facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms; they provide exemplary definitions.

Transaction data (also referred to as event data) generally refers to data associated with any event, such as an interaction by a user device with a server, website, database, and/or other online data owned by or under control of a requesting entity, such as a server controlled by a third party, such as a merchant. Transaction data may include merchant name, merchant location, merchant category, transaction dollar amount, transaction date, transaction channel (e.g., physical point of sale, Internet, etc.) and/or an indicator as to whether or not the physical payment card (e.g., credit card or debit card) was present for the transaction. Transaction data structures may include, for example, specific transactions on one or more credit cards of a user, such as the detailed transaction data that is available on credit card statements. Transaction data may also include transaction-level debit information, such as regarding debit card or checking account transactions. The transaction data may be obtained from various sources, such as from credit issuers (e.g., financial institutions that issue credit cards), transaction processors (e.g., entities that process credit card swipes at points-of-sale), transaction aggregators, merchant retailers, and/or any other source. Transaction data may also include non-financial exchanges, such as login activity, Internet search history, Internet browsing history, posts to a social media platform, or other interactions between communication devices. In some implementations, the users may be machines interacting with each other (e.g., machine-to-machine communications). Transaction data may be presented in raw form. Raw transaction data generally refers to transaction data as received by the transaction processing system from a third party transaction data provider. Transaction data may be compressed. Compressed transaction data may refer to transaction data that may be stored and/or transmitted using fewer resources than when in raw form. Compressed transaction data need not be "uncompressible." Compressed transaction data preferably retains certain identifying characteristics of the user associated with the transaction data such as spend patterns, data cluster affinity, or the like.

A message encompasses a wide variety of formats for communicating (e.g., transmitting or receiving) information. A message may include a machine-readable aggregation of information such as an XML document, a fixed-field message, a comma-separated message, or the like. A message may, in some implementations, include a signal utilized to transmit one or more representations of the information. While recited in the singular, a message may be composed, transmitted, stored, received, etc. in multiple parts.

The terms determine or determining encompass a wide variety of actions. For example, "determining" may include calculating, computing, processing, deriving, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The term selectively or selective may encompass a wide variety of actions. For example, a "selective" process may include determining one option from multiple options. A "selective" process may include one or more of: dynamically-determined inputs, preconfigured inputs, or user-initiated inputs for making the determination. In some implementations, an n-input switch may be included to provide selective functionality where n is the number of inputs used to make the selection.

The terms provide or providing encompass a wide variety of actions. For example, "providing" may include storing a value in a location for subsequent retrieval, transmitting a value directly to a recipient, transmitting or storing a reference to a value, and the like. "Providing" may also include encoding, decoding, encrypting, decrypting, validating, verifying, and the like.

A user interface (also referred to as an interactive user interface, a graphical user interface, a GUI, or a UI) may refer to a web-based interface including data fields for receiving input signals or for providing electronic information and/or for providing information to the user in response to any received input signals. A UI may be implemented in whole or in part using technologies such as HTML, Flash, Java, .net, web services, and RSS. In some implementations, a UI may be included in a stand-alone client (for example, thick client, fat client) configured to communicate (e.g., send or receive data) in accordance with one or more of the aspects described.

Example Spend Change Alert System

FIG. 1 shows a functional block diagram of an example of a transaction data spend change alert system 100. The transaction data spend change alert system 100 shown can process transaction data from a variety of sources. As shown, transaction data may be received from a credit bureau repository 102 or one or more financial institutions 104, such as financial institutions that issue credit and debit cards to users. Transaction data may also be received from credit/debit card readers 106 or from other sources of transactions 108, such as, by way of non-limiting example, a user's car, a gym, a library, a merchant, or another system with which the user interacts to perform a transaction.

Illustratively, transaction data may include, for example, data elements such as merchant name, merchant location, merchant category, transaction category, transaction sub-category, transaction dollar amount, transaction time, and whether the physical credit or debit card was present or not. The transaction data may be processed by the disclosed transaction data spend change alert system 100 using, e.g., machine learning algorithms applied to a large set of transaction data associated with multiple users.

The transaction data may be received by a spend distribution service 120. Although FIG. 1 shows a direct connection between the spend distribution service 120 and the sources of transaction data, it will be understood that other intermediate systems may be used during transmission. The spend distribution service 120 analyzes transactional data to predict when users—both individual users and populations of users—will likely engage in transactions in the future. The transaction data spend change alert system 100 may be particularly useful to provide clients with timely notifications when an individual user's transactional behavior changes. In some implementations, the transaction data spend change alert system 100 determines when a user exhibits a reduction in spending behavior. The reduction in spending behavior may be determined for example by a time between (or frequency of) transactions, thereby enabling the client to engage the user with timely and/or targeted communications designed to motivate the user to engage in transactions. Accordingly, the spend distribution service 120 is provided to generate and update probability distributions, based on historical transaction data, that can predict the likelihood a user will transact within a specified period of time (e.g., within 5 days).

The spend distribution service 120 includes a data aggregation module 130. The data aggregation module 130 is provided to organize transaction data prior to performing spend frequency distribution analysis. A transaction data collection service 132 is included to receive the transaction data from transaction data sources, such as a credit bureau repository 102, financial institutions 104, and credit/debit card readers 106, and other sources of transactions 108. The transaction data may be received via wire, wireless, or hybrid wired and wireless means. The transaction data collection service 132 may collect data by requesting transaction data from a data source. In some implementations, the transaction data collection service 132 may receive transaction data from a transaction data source such as according to a schedule.

The transaction data received from a transaction data source may be stored in a raw transaction data store 134. The raw transaction data store 134 may be a specialized data store device configured to handle large volumes of data.

The data aggregation module 130 shown in FIG. 1 includes a transaction categorization engine 136 that may be implemented using a hardware processor specially programmed with executable instructions to generate categorized transaction data. Illustratively, each user may be represented by a list of his or her transactions during the designated time period, and each transaction may be represented by a categorical description of the type of transaction. For example, a particular card transaction may be associated with a category of "Restaurant," or more specifically "Chinese Restaurant." Alternatively a transaction may also be represented by the specific merchant the transaction occurred at, for example "Starbucks," or "Home Depot." A more complex pre-processing step that automatically groups correlated merchants together may also be used to perform category assignment.

The executable instructions may further cause the transaction categorization engine 136 to categorize the transaction data. Categories may be included in the raw transaction data. In some implementations, the categories may be added to the raw transaction data by the transaction categorization engine 136. The category assigned to a particular transaction may be determined by the transaction categorization engine 136 using the transaction data such as an item identifier, an item name, merchant name, a merchant code, or a merchant category code, to name a few. For example, the spend distribution service 120 may analyze the transactional data for specific content, such as health and safety information. As such, it may be desirable to categorize the transactions in a variety of health and safety categories. In certain embodiments, the transaction categorization engine 136 may access from the categorized transaction data store 138, a transaction categories data structure that includes a plurality of transaction categories. For each transaction category, the data structure identifies attribute criteria that may be used to identify transactions associated with respective transaction categories. For each of the accessed transaction records, the transaction categorization engine 136 identifies one or more attributes of the transaction, compares the identified attributes with the attribute criteria to identify a transaction category that matches the identified attributes of the transaction record, categories the transaction record, and stores the categorized transaction record in the categorized transaction data store 138. The categories may be provided as a configuration to the spend distribution service 120 such that the same raw transaction data may be analyzed in different ways. The configuration may identify the available categories and transaction data that cause the transaction categorization engine 136 to assign the associated category.

The categorization process may also include normalizing the data such that transaction data from different sources provided in different data formats may each appear in a standardized data record. For example, the transaction data spend change alert system 100 may have a target record type and include one or more conversion algorithms to map data from the raw transaction record to a field of the target record type.

The normalization may also include spend level normalization. For example, the transaction categorization engine 136 may normalize a level of the transaction based on spend levels of individual users. This type of normalization helps smooth the discrete outlier transaction events in such a manner that a single relatively large or relatively small transaction does not skew the transaction data for a given user account.

The transaction categorization engine 136 is in data communication with a categorized transaction data store

138. The categorized transaction data store 138 may be a specially-configured transaction data storage device capable of handling large volumes of data. Illustratively, the transaction data spend change alert system 100 may include hundreds of millions, or billions of transaction records. Advantageously, the disclosed transaction data spend change alert system 100 is able to process these records in a duration of a few hours, whereas if such processing were to be performed manually by humans, it could take days, weeks, months, or years, depending on the number of human resources applied to the effort. In some implementations, the categorized transaction data store 138 may be commonly-implemented with the raw transaction data store 134. In some implementations, such as when the spend distribution service 120 provides data for different clients, it may be desirable to maintain separate data stores to ensure the security of the categorized data for each client.

The spend distribution service 120 includes a transaction distribution module 150. The transaction distribution module 150 is in data communication with the categorized transaction data store 138. The transaction distribution module 150 may be configured to generate and update user transaction frequency distribution models. According to some embodiments, a user transaction frequency distribution model is generated by compiling a multi-dimensional, relational data structure identifying, for example, each transaction and the amount of time between each transaction, among other parameters. Additional parameters of the transaction frequency distribution model data structure may include, without limitation, the merchant name, the merchant location, the merchant category, the transaction category, the transaction sub-category, the dollar amount of the purchase, the date of the transaction, the time of day that the transaction occurred, and whether or not the physical credit card was present, to name a few. Based on historical transaction data, a user transaction frequency distribution model may predict—with a degree of confidence—the likelihood that the user will engage in a future transaction within a specified period of time. Illustratively, by way of non-limiting example, a user transaction frequency distribution model may predict with a 95% probability that a user will transact within the next seven days.

To generate the user transaction frequency distribution models, the transaction distribution module 150 may include a user base distribution generator 152. The user base distribution generator 152 generates transaction frequency distribution models based on transactional histories of multiple users (i.e., populations). Illustratively, the user base distribution generator 152 may generate one or more transaction frequency distribution models based on the transactional data of users who share one or more attributes. For example, the user base distribution generator 152 may generate a transaction frequency distribution model for a set of users who attend live sporting events. The transaction frequency distribution models may include all users in the transaction data collection that meet this category, or alternatively, the transaction frequency distribution model may be based on a more selective set of users, such as those who have attended at least five live sporting events in the past year.

The transaction distribution module 150 may also include a user level distribution generator 154. The user level distribution generator 154 generates user transaction frequency distribution models for individual users, based at least in part on each user's historical transaction data. In some embodiments, the user level transaction frequency distribution model begins with a population-based user base model and then is updated with a user's specific transaction data. The user's transaction data may be weighted more heavily in the updating process so as to better account for the individual transactional practices and behaviors of the particular user.

In certain embodiments, the user level transaction frequency distribution model is based only on an individual user's transaction data. For certain users, the user level spend distribution based only on the user's transaction data may be the most accurate predictor of the user's future transactional behavior because it reflects only the past behavior of the user.

A distribution update generator 156 may be included in the transaction distribution module 150 to update previously-generated user base and user level distributions with new transaction data. The transaction frequency distribution models generated and updated by the user base distribution generator 152, the user level distribution generator 154, and the distribution update generator 156 can be stored on a transaction frequency distribution model data store 158 which is in data communication with the generators 152, 154, and 156.

The transaction data spend change alert system 100 may also include elements configured to generate alerts to clients based on, for example, changes in transactional behavior of a user. For example, an alert may be generated and communicated to a client enrolled in the services offered by the transaction data spend change alert system 100 when a user fails to transact within a predefined period of time.

As shown in FIG. 1, a change alert detection service 110 includes an alert condition detector 112, a filter condition detector 114, and an alert configuration engine 116. The change alert detection service 110 may use the transaction frequency distribution models stored in the transaction frequency distribution model data store 158 to detect an alert condition, to detect a filter condition, and to generate an alert to be sent to a client of the transaction data spend change alert system 100. A set of alert filtering rules may be stored in the filtering rules data store 122 and accessed by the alert condition detector 112 and the filter condition detector 114 and the alert configuration engine 116 to govern the circumstances under which an alert may be generated. Advantageously, the alert filtering rules, which optionally may be informed by user data sources, offer a high degree of customization for generating and communicating spend change alerts to a client.

The change alert detection service 110 may then generate an electronic communication to provide to the client, the electronic communication including content indicated by the alert configuration engine 116. In some implementations, the change alert detection service 110 may provide a description of the content of the generated alert to another aspect of the transaction data spend change alert system 100, such as an alert generation service 170. The alert generation service 170 may generate and communicate the identified content to the identified client.

To support these features of the change alert detection service 110, the alert condition detector 112 may be included to compare the user's transaction data with the user's transaction frequency distribution model to determine whether the user's spending behavior has changed to the point where it will trigger an alert condition. Illustratively, by way of non-limiting example, an alert condition may be detected when the user fails to transact within the time period that, according to the user's transaction frequency distribution model, has a ninety-five percent (95%) likelihood of occurring. The filter condition detector 114 may be included to detect additional filters to increase or decrease the sensitivity of the alerts. The alert configuration engine 116 may be included to configure an alert to be transmitted to the client. Using alert and filtering rules, the alert configuration engine 116 may automatically retrieve the relevant user transaction data to be included in the alert.

The filtering rules data store 122 may also be provided. The filtering rules data store 122 may include additional conditions necessary to generate an alert by the change alert detection service 110. A filtering rule identifies one or more conditions that must be met before an alert may be transmitted to client. Illustratively, by way of non-limiting example, a filtering rule might instruct the transaction data spend change alert system 100 to wait seven days before transmitting the alert. Such a filtering rule may serve to avoid taking action despite the occurrence of a spend change alert or an event change alert condition. For example, it may be desirable to wait before sending an alert to account for irregular but nevertheless ordinary circumstances, such as illnesses, vacations, or other brief (i.e., weeklong) breaks from normal transactional behavior.

The change alert detection service 110 may store information about the identified user in a user data sources store 118. This user data sources store 118 may be accessed by the alert configuration engine 116 to associate additional or supplemental user-specific information with the alert data the engine 116 prepares. In some embodiments, a standard data format for the alert is established, and therefore the alert configuration engine 116 is able to format the alert in the predefined, standard format.

An alert generation service 170 may generate and deliver the alert to the client or clients that subscribe to the service and are interested in the particular user. According to some embodiments, to generate the alert, an alert generator 172 may be included in the alert generation service 170. The alert generator 172 may be configured to provide the alert in a customized format for each client. For example, different clients may use different devices and systems to receive and process alerts provided by the transaction data spend change alert system 100. In such instances, the alert generator 172 may adjust, reformat, convert, or otherwise change the alert so that a client can receive the content in the client's preferred format.

Once the alert is prepared, a communication service 174 is included to communicate the generated alert to the clients. As shown in FIG. 1, the communication service 174 provides the alert to client systems 190. In some embodiments, the communication service 174 may be configured to control the timing of the alert delivery.

In some embodiments, the disclosed transaction data spend change alert system 100 generates an alert that automatically activates a user communication function in the client system 190. For example, the automatically-activated user communication function may generate and transmit a communication to one or more user systems 195 associated with a particular user. Illustratively, by way of non-limiting example, a spend change alert may be generated by the transaction data spend change alert system 100 and transmitted to a particular client system 190 to indicate that a particular user has stopped using his or her fuel credit card. The spend change alert is triggered once a period of time between timewise consecutive transactions exceeds a predetermined gap limit for this particular category of transaction, such as seven days. The client system 190 may be configured to enable the received alert to automatically activate a user communication functionality which is stored and operated on the client system 190. In response to the received spend alert, the client system 190 may generate and transmit one or more communications to one or more user systems 195 associated with the particular user. For example, a communication may be sent by email to the particular user. The email communication may include a coupon or an offer to provide an incentive for the particular user to engage in a transaction. Additionally, a communication may be sent by text (SMS) message to the particular user. In some embodiments, similarly, a print communication may be generated and sent to the particular user by regular mail or to be included in the user's next bill.

In some embodiments, the communication transmitted to the particular user (e.g., a mobile device of the particular user) is automatically transmitted from the client system 190 at the time that the client system 190 receives the alert, or at some determined time after receiving the alert. When received by the user's device, the user communication can cause the user's device to display the communication via the activation of an application on the device (e.g., a browser, a mobile application, etc.). For example, receipt of the user communication may automatically activate an application on the device, such as a messaging application (e.g., SMS or MMS messaging application), a standalone application, or a browser, and display information included in the user communication. If the device is offline when the user communication is transmitted, the application may be automatically activated when the device is online such that the user communication is displayed. The user communication may include a URL of a webpage (or other online information) associated with the user communication, such that when the device (e.g., a mobile device) receives the user communication, a browser (or other application) is automatically activated, and the URL included in the user communication is accessed via the Internet.

In some embodiments, the transaction data spend change alert system 100 may detect downward changes in the volume and/or frequency of a user's transactions, and provide alerts of such changes to merchants or other interested parties. For example, an alert may indicate that a user has failed to engage in a transaction within a predicted time period, thereby indicating a change in the user's transactional behavior. The transaction data spend change alert system 100 analyzes a user's historical transaction data to create one or more user transaction frequency distribution models which may be used to make predictions about the user's future spending habits.

An alert performance service 180 includes a treatment database 182 that receives input from client system 190, and an alert database 184 that receives input from the alert generator 172. The alert performance service 180 also receives categorized transaction data from the categorized transaction data store 138. The alert performance service 180 may be implemented using a hardware processor specially programmed with executable instructions to determine one or more gap limits for particular users. The alert performance service 180 analyzes the user's historical transactional behavior and, based on the analysis, determines one or more gap limits for that particular user which are communicated to the alert condition detector 112. The alert performance service 180 may also determine filtering rules for a particular user and/or client, which may be communicated to the filtering rules data store 122 for implementation by the filter condition detector 114.

Figure 2:
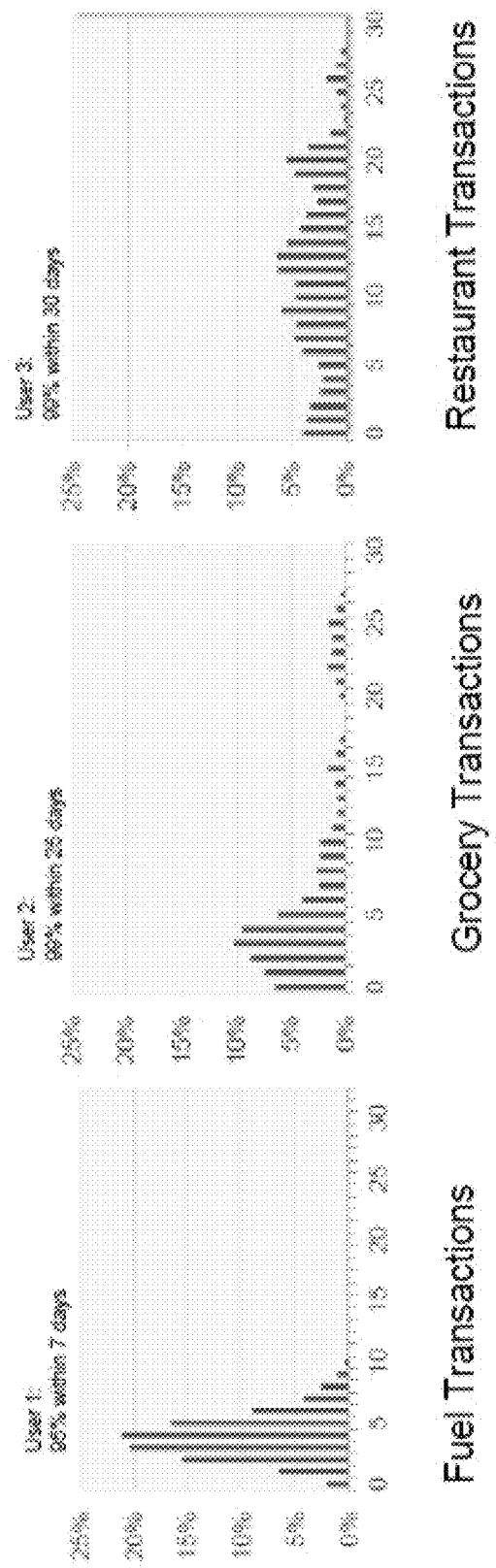
FIG. 2 illustrates example transaction frequency distribution models for three different users that may be used to predict when the users will likely transact in the future.

FIG. 2 shows, by way of illustrative example, three sample visualizations of spend prediction information for three different users. The three charts of FIG. 2 indicate, respectively, that 95% of the time User 1 will make a fuel transaction within 7 days; that 99% of the time User 2 will make a grocery transaction within 25 days; and 99% of the time User 3 will make a restaurant transaction within 30 days.

The user's transaction data may be analyzed based on the frequency by which the user transacts in a particular segment or category. The time between transactions provides insight into the user's spending behavior. Accordingly, analysis of the data relative to the time between adjacent (i.e., consecutive) transactions may be analyzed to indicate a frequency of occurrence. For example, the graph on the left in FIG. 2 relates the percentage of historical fuel transactions to the time between adjacent transactions. Thus, the user made adjacent fuel transactions: one day apart approximately 2% of the time, two days apart approximately 6% of the time, three days apart approximately 15% of the time, and so on. Each bar on the graph represents a percentage of the user's historical fuel transactions for which adjacent transactions were separated by a particular number of days. Necessarily, the sum of all of the bars equals 100%. Thus, according to the frequency distribution model, as indicated in FIG. 2, there is a 95% likelihood that User 1 will engage in a fuel transaction within seven days from User 1's most recent fuel transaction. Similarly, there is a 99% likelihood that the User 2 will engage in a grocery transaction within twenty-five days of User 2's most recent grocery transaction, and there is a 99% likelihood that User 3 will engage in a restaurant transaction within thirty days of User 3's most recent restaurant transaction. In other embodiments, predicted spending may be analyzed and visualized in any other manner.

In accordance with certain embodiments of the present disclosure, an initial transaction frequency distribution model may be constructed by creating a histogram that identifies the percentage of historical transactions corresponding to specific time periods between each transaction. Illustratively, the time period may be days, weeks, months, hours or minutes, depending on what time period is most relevant to the set of transactions being analyzed.

In one embodiment, a transaction frequency distribution model describing how a user transacted historically is constructed. Future transactions—or a lack of future transactions within a predetermined period of time—can trigger a process to update the transaction frequency distribution model. If a predetermined gap limit (i.e., a maximum expected time between transactions) is exceeded, an alert may be generated. Notably, each new transaction by a given user presents a need to update the existing one or more transaction frequency distribution models for that user. Thus, the disclosed transaction data spend change alert system 100 is regularly updated to provide current transactional information. The transaction frequency distribution models can be calculated for the overall volume of transactions of a user as well as for categories or sub-categories of transactions that a client might wish to monitor. Alerts may be transmitted to the interested entities (i.e., clients that subscribe to the services provided by the transaction data spend change alert system 100) when deemed appropriate. In one embodiment, the output of this solution is zero or more alerts for each user for which a significant change in spending has occurred in the user's transactional behavior. Additional information about the user, for example attributes describing the user's recent behavior or characteristics of the transaction distribution, can also be included in the output to assist interested parties in acting on the information provided.

Example Method

Figure 3:
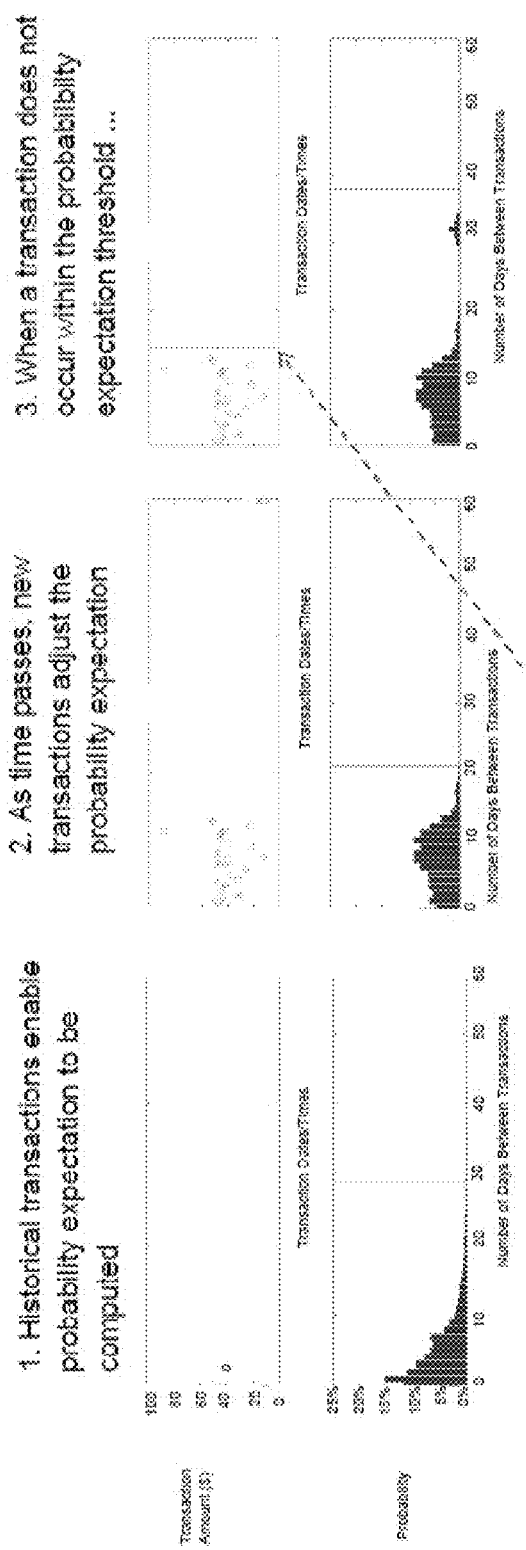
FIG. 3 is an example process for delivering timely alerts in response to detected spend attrition risk.

FIG. 3 is a flowchart illustrating an example process of detecting spending patterns of a user and generating an alert based on those patterns. The top graphs in FIG. 3 illustrate the transaction history of a user over time in which the abscissa (x-axis) corresponds to the date and time of the transaction (typically spanning a multi-year timeframe), and the ordinate (y-axis) reflects dollar amounts of transactions. The data points on the graphs indicate transactions made by the user at a particular date and time. The bottom graphs are transaction frequency distribution models for the user at three different points in time.

At label 1, an initial transaction frequency distribution model based at least partially on the historical transactional behavior of a user is constructed. In the illustrated example, only one transaction by the user has been recorded. Thus, the initial transaction distribution model for the user may be based on the transaction data of a population that is representative of the user. Times between transactions (i.e., gaps) are identified and organized, as illustrated by the bottom graph at label 1. Based on the initial transaction frequency distribution model, a gap limit that indicates an expected period of time between transactions can be determined. For example, the gap limit may be selected to have a ninety-five percent (95%) likelihood that the user will make a transaction within an expected time period, based on the transaction frequency distribution model. In this example, a gap limit of twenty-eight (28) days is set as illustrated by the vertical line in the bottom graph at label 1.

The transaction frequency distribution model enables the transaction data spend change alert system 100 to calculate probabilities that the user will engage in a transaction within a specified period of time, such as within a day, a week, or a month, and the like. At label 2, new transactions by the user are identified, and the transaction frequency distribution model is updated to reflect the new information. Additionally, new probabilities that the user will engage in a transaction within a specified period of time are calculated based on the updated transaction frequency distribution model. In this example, a new gap limit is set to twenty (20) days, corresponding to the expected period of time between transactions by the user.

At label 3, a period in excess of the previously-calculated gap limit of twenty (20) days has transpired since the most recent user transaction, as indicated by the vertical line in the top graph at label 3. This triggers a spend change alert condition (also referred to herein as an event change alert condition), indicating that the user has potentially reduced his or her spending behavior. Under such a circumstance, the process may transmit a spend change alert (also referred to herein as an event change alert) to one or more interested parties to inform the interested parties of the user's change in spending behavior. In light of the detected change in the user's transactional behavior, the gap limit is updated to reflect a new expectation. As illustrated in the bottom graph at label 3, the new gap limit is set to thirty-seven (37) days.

Figure 4:
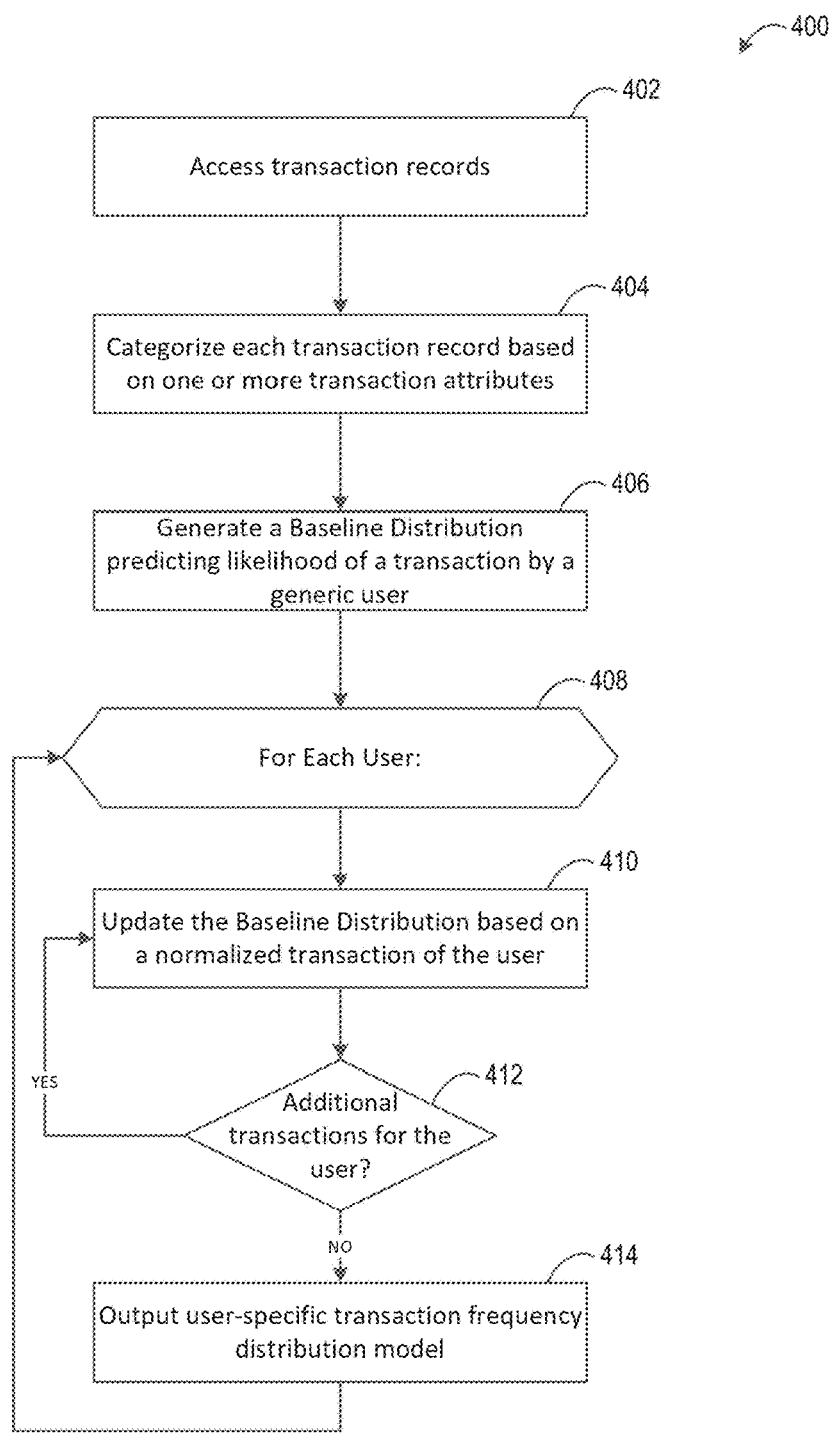
FIG. 4 is a process flow diagram of an example method of generating and updating a transactional frequency distribution model.

FIG. 4 is a process flow diagram of an example method of generating and updating a transaction frequency distribution model. At block 402 the process 400 accesses transaction records for a set of users. As describe above, the transaction records may be aggregated from multiple sources including credit bureau repositories 102, financial institutions 104, credit/debit card readers 106, and other sources 108 that engage with users in transactions.

At block 404, the process 400 categorizes each transaction record based on one or more transaction attributes. The category (or categories) assigned to a particular transaction record may be determined based on specific transaction attributes such as, by way of non-limiting example, an item name, a merchant name, a merchant code, a merchant category code (e.g., clothing, auto, coffee, etc.), and the like.

At Block 406, the process 400 generates, based on the transaction records of multiple users, a baseline probability distribution model (Baseline Distribution). The Baseline Distribution is developed by determining each time between transactions for each pair of adjacent (i.e., consecutive) transactions of each user. The Baseline Distribution describes the overall probability of a generic user having a transaction within in a given time period. The Baseline Distribution represents a transaction frequency distribution model of a population. Such a model may be particularly useful when the population data is selected based on one or more attributes, such as age, gender, category, and the like.

Each individual user may be represented by the list of transactions that were initiated by that user during the specified time period. Each transaction will have a date and time associated with it. Each user's initial transaction frequency distribution model is set to the Baseline Distribution. At block 408, user-specific transactions over a certain period of time are accessed. Each transaction for that user is processed in the order that it occurred. Such processing may include normalizing the user's transaction. At block 410, the Baseline Distribution is updated to the user's transaction data reflecting the difference in time between the user's prior transaction and most recent transaction. At block 412, the process 400 checks to determine whether another user transaction has occurred. If so, the process 400 returns to block 410. After processing each user transaction, the Baseline Distribution has been transformed by user transaction data to the user's transaction frequency distribution model, reflecting the user's specific transaction activity. This version of the user's transaction frequency distribution model may be referred to as the user's "Initial Distribution." Next, the process 400 advances to block 414, where the user-specific transaction frequency distribution model is output and stored.

According to certain embodiments of the present disclosure, each user's transaction frequency distribution model may be developed based only on the individual user's transaction data. The user transaction frequency distribution model may be developed analytically. In particular, each pair of timewise adjacent transactions (i.e., two consecutive transactions in time) is analyzed statistically to determine the time between the two transactions of the pair. Illustratively, each transaction for a particular user is processed relative to the preceding transaction. The results are binned (i.e., grouped together) into relevant time periods, such as, by way of non-limiting example, days or weeks. Once constructed, the transaction frequency distribution model describes the overall probability of a user engaging in a transaction within a given time period, based on the user's historical transactional behavior. Once historical transactions have been processed to the present time, each user's frequency of transaction is represented by the user's transaction frequency distribution model up to that point in time.

The transaction frequency distribution model has a point referred to as a "gap limit" which represents the maximum desired length of time before an alert will be transmitted. The gap limit is based on the user's transaction history and may be set by the client interested in receiving spend change alerts. The gap limit may be different for different clients. Illustratively, a gap limit may be defined as the period of time by which the user is expected to make a next transaction within a specified probability of certainty. For example, a gap limit may be set to the period of time by which the user will engage in a next transaction with a ninety-five percent (95%) probability of occurrence. The gap limit may be used as a spend change alert triggering mechanism. For example, when a user does not make a transaction within the time period defined by the gap limit, an alert may be sent to the client indicating that the user has changed his or her spending behavior.

The transaction data spend change alert system 100 may create, update, and store multiple transaction frequency distribution models for a single user. For example, a client that subscribes to the service offered by the transaction data spend change alert system 100 may be interested in a user's overall transactional behavior as well as the user's transactional behavior with respect to specific categories and/or sub-categories. In such circumstances, the transaction data spend change alert system 100 will generate multiple transaction frequency distribution models for the user.

Figure 5A:
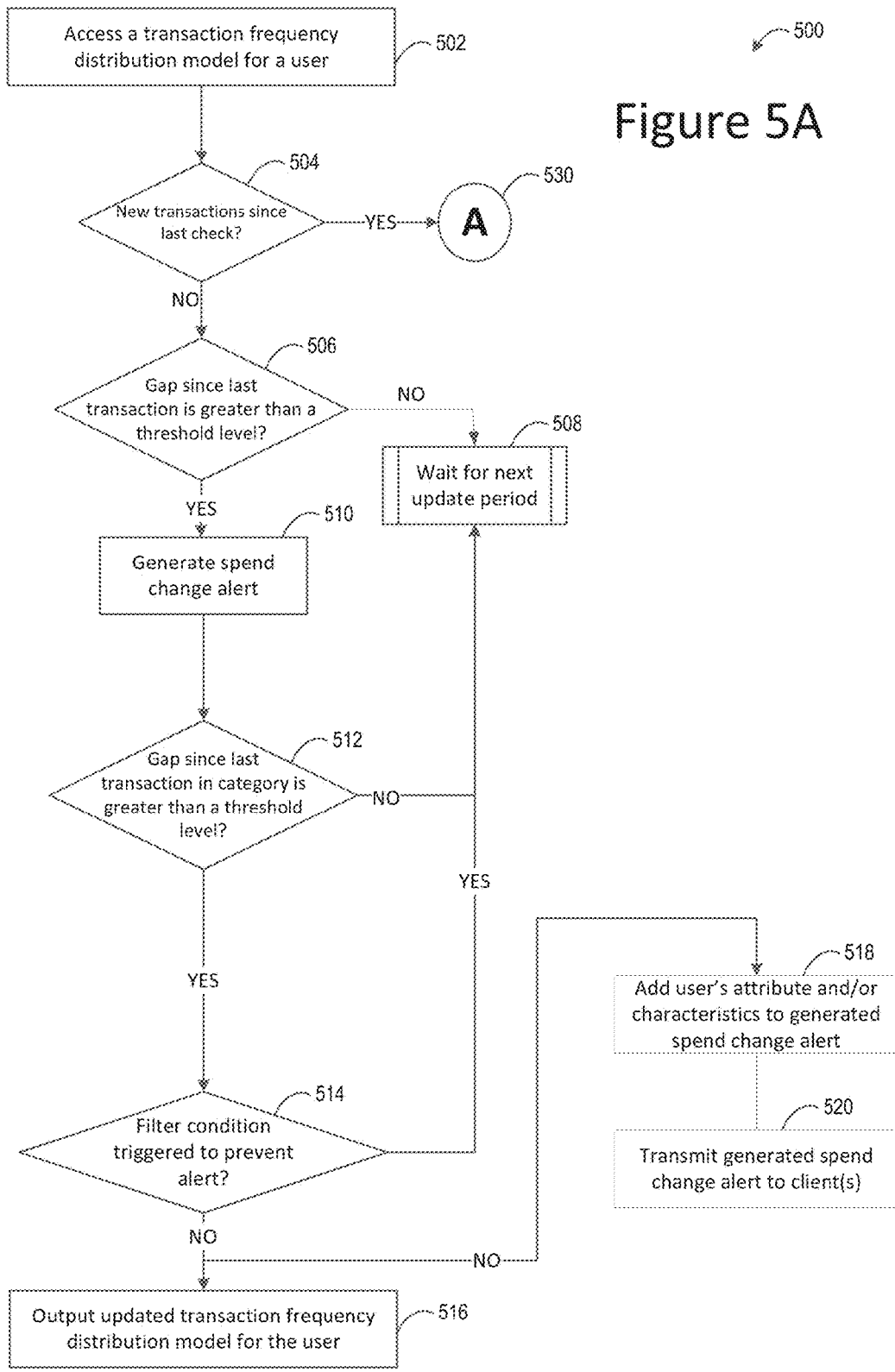
FIGS. 5A and 5B depict a process flow diagram of an example method of updating a transactional frequency distribution model as well as generating and transmitting a spend change alert based on a change in the user's transactional behavior.
Figure 5B:
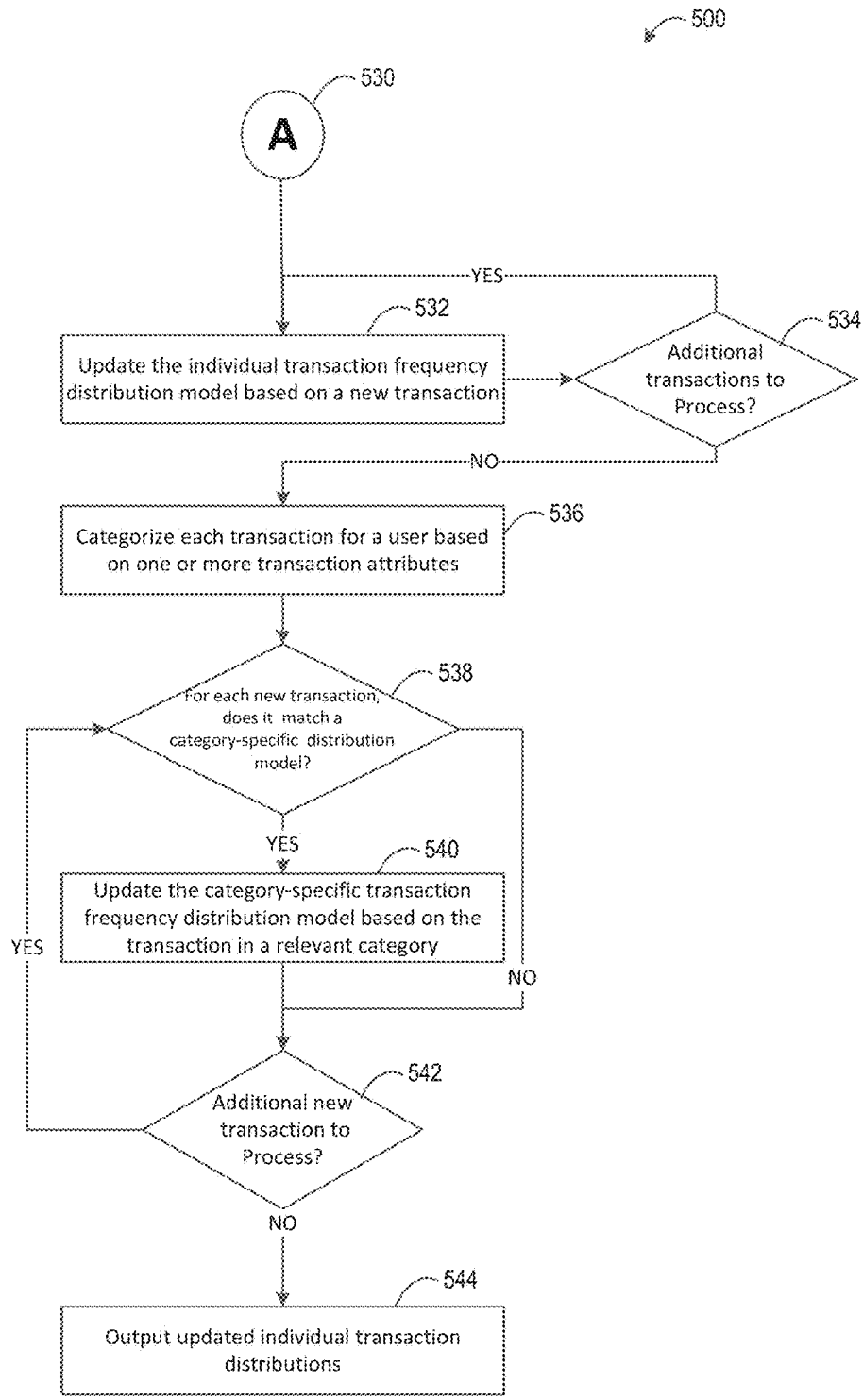

FIGS. 5A and 5B depict a process flow diagram of another example process 500 of updating a transactional frequency distribution model as well as generating and transmitting a spend change alert based on a change in the user's transactional behavior. Illustratively, after a designated period of time (for example one day) the disclosed process 500 processes transactions that have occurred between the last time this action was performed and the present. If a user has not had any new transactions, the distribution associated with that user is analyzed to determine whether the gap limit has been met. If the time between the most recent transaction and the present time (i.e., the present gap) exceeds the "gap limit," then the system will evaluate whether an alert will be transmitted to one or more clients. This process is repeated for as long as it is desirable to monitor that user. The user's transaction frequency distribution model may then be replaced by the updated distribution model which may be used the next time the analysis is performed.

At block 502, the process 500 accesses a transaction frequency distribution model for a particular user. The accessed transaction frequency distribution model may have been created in the manner or manners described above.

At block 504, the process 500 determines whether the user has engaged in a new transaction since the last time the process 500 checked for an update. If a new transaction has taken place, then the process 500 advances to block 530, which is described in further detail below with respect to FIG. 5B. If the user has not engaged in a new transaction since the last time that the process 500 checked for an update, then the process 500 advances to block 506.

At block 506, the process 500 determines whether the time period (i.e., gap) since the user's most recent transaction is greater than a predetermined threshold time period for alert generation (i.e., gap limit). As discussed above, the gap limit may be set by a client to define the conditions by which the client desires to be informed of a change in the user's transactional behavior. The gap limit is flexible and can be determined by examining the user's historical behavior as performed by the alert performance service 180. The gap limit can be set at any value or values that meet the client's needs. In some embodiments, the gap limit may be set to a particular probability value, such as for example, the time period associated with a ninety-five percent (95%) likelihood that the user will make a transaction, as determined by the user's transaction frequency distribution model. Illustratively, the time period associated with a ninety-five percent (95%) likelihood that the user will make a transaction may change as the user's transaction frequency distribution model is updated with additional transaction data. Thus, by selecting a probability value (as opposed to a particular time duration) the transaction data spend change alert system 100 advantageously relates the user's historical transactional behavior to the alert condition. If the process 500 determines that the gap since the user's most recent transaction is not greater than the gap limit, then no action is taken. The process 500 advances to block 508, where the process 500 waits for the next update period. If the process 500 determines that the gap since the user's most recent transaction is greater than the gap limit, then the process 500 advances to block 510.

At block 510, the process 500 generates a spend change alert based on the time period since the user's most recent transaction and the present time. Generated alerts may be applied either to known transactions or alternatively and additionally to specific subsets of transactions which are of interest. For example, for credit card transactions, one could apply the above-described methodology to overall transactions as well as to sub-categories of transactions, such as automobile fuel or restaurant transactions. Illustratively, a spend change alert may include an alert category (e.g., overall, eat, fuel, grocery, etc.), the number of days since the last transaction, and the number of transactions within the previous two months. At block 512, the process 500 determines whether the gap is greater than a category gap limit for a particular category of interest to the client. The category gap limit may be based on a different value that is more relevant to a transaction cycle of that category. For example, transactions related to hair grooming services may be likely to occur on a weekly, every-two-week, or monthly cycle, whereas transactions related to coffee boutique services may be likely to occur on a daily cycle. If the process 500 determines that the gap since the user's most recent transaction is not greater than the category gap limit, then the process 500 advances to block 508 and waits for the next update period. If the process 500 determines that the gap since the user's most recent transaction is greater than the category gap limit, then the process 500 advances to block 514.

In addition to simply using the transaction frequency distribution model to trigger alerts, the process 500 can also optionally add filters to increase or decrease the sensitivity of the alerts. Illustratively, by way of non-limiting example, filters having rules such as "do not alert prior to at least a one week gap between transactions," or "wait a specified number of days after exceeding the gap limit to transmit an alert" may be employed. Additional illustrative examples of filter rules may include "do not alert unless: a share of wallet is reduced by a specified percentage; a specified number of days have passed since the user's last transaction, the total number of transactions within a specified number of months has decreased by a specified percentage; the total dollar transaction within a specified number of months has decreased by a specified percentage, and a specified number of days since the last alert have passed. At block 514, the process 500 determines whether a filter condition that would prevent transmission of the generated spend change alert is associated with the particular user's transaction data. If such a filter condition exists, then the process 500 advances to block 508 and waits for the next update period. If the process 500 determines that such a filter condition does not exist, then it advances to block 516, where the process 500 outputs an updated transaction frequency distribution model for the particular user.

At block 518, the process 500 may generate a set of attributes or characteristics describing the user's behavior to be included in the generated alert. Such attributes or characteristics can be used by interested entities to further understand the circumstances or causes of the user's transaction velocity change. At block 520, the process transmits the generated spend change alert for the user to the client or clients that seek to be alerted.

FIG. 5B illustrates a portion of the process 500 when the process 500 has determined that the user has engaged in a new transaction since the last time the process 500 checked for an update. Illustratively, the process updates overall and category-specific transaction frequency distribution models for the user based on the new transactions. At block 532, the process 500 updates the user's transaction frequency distribution model based on the new transaction. At block 534, the updating is repeated for each new transaction since the last time the process 500 checked for an update. Once new transactions are included in the updated transaction frequency distribution model, the process 500 advances to block 536, where each new transaction is categorized for the user based on one or more transaction attributes, as discussed above. At block 538, the process 500 determines whether a new transaction matches a category-specific transaction frequency distribution model for the user. If it does, the process 500 advances to block 540 where it updates the category-specific transaction frequency distribution model based on the new transaction, and then advances to block 542. If it does not, the process 500 advances directly to block 542. At block 542, the updating is repeated for each new transaction that matches a category-specific transaction frequency distribution model for the user. At block 544, the updated transaction frequency distribution model(s) for the user are output and stored for subsequent use.

Updating the Transaction Frequency Distribution Model

Figure 6:
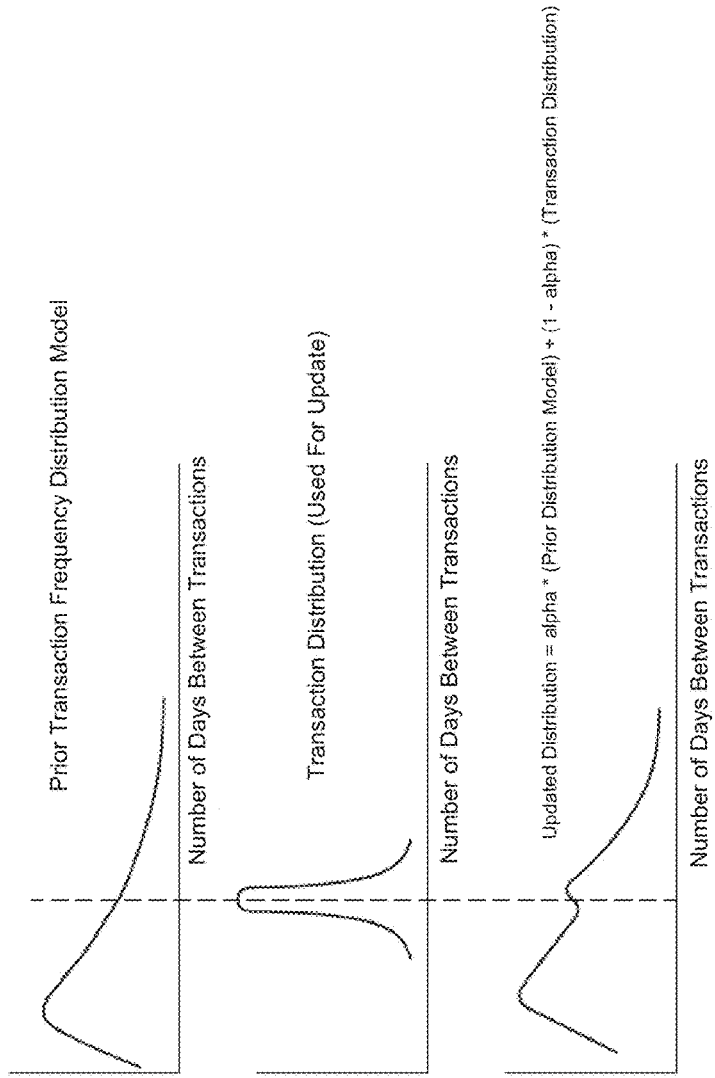
FIG. 6 is an example of a process to update a transaction frequency distribution model.

FIG. 6 illustrates graphically a method of updating the transaction frequency distribution model by representing the current (new) transaction as its own probability distribution ("Transaction Distribution"). The Transaction Distribution can be represented by a distribution having a 100% probability of occurring on the particular transaction gap and zero probability everywhere else. Alternatively the current transaction can be represented as a distribution centered on the actual gap but with a non-zero probability elsewhere, as depicted in FIG. 6. The weighted sum of the prior distribution and the current transaction distribution may then be calculated according to preset parameters such as:

Updated Transaction Frequency Distribution Model=$\alpha$*(Prior Distribution Model)+(1−$\alpha$)* (Transaction Distribution), where, $\alpha$ is a weighting factor. In an embodiment, $\alpha$ is chosen to be a number close to 1, such as by way of non-limiting example, 0.95, to minimize the sensitivity to a single transaction. Advantageously, this updating process can be used to give greater weight to more recent transactions by the user which are likely to more accurately reflect the frequency of the user's transaction behavior at the present time. The distribution can be normalized so that the sum of all probabilities continues to equal one. The result may be used to replace the user's prior transaction frequency distribution model. Illustratively, by way of non-limiting example, for a user with twenty (20) past transactions, the nineteen (19) gaps between those transactions can be expressed as $g_1, g_2, g_3, \ldots g_{19}$. The relative contributions of $g_1$ to $g_{19}$ in the transaction frequency distribution model is $\alpha^{19}$, which is approximately 0.377 for $\alpha$=0.95. Accordingly, the more recent transactions have larger weights than the older transactions in the transaction frequency distribution model.

Alerts

Figure 7:
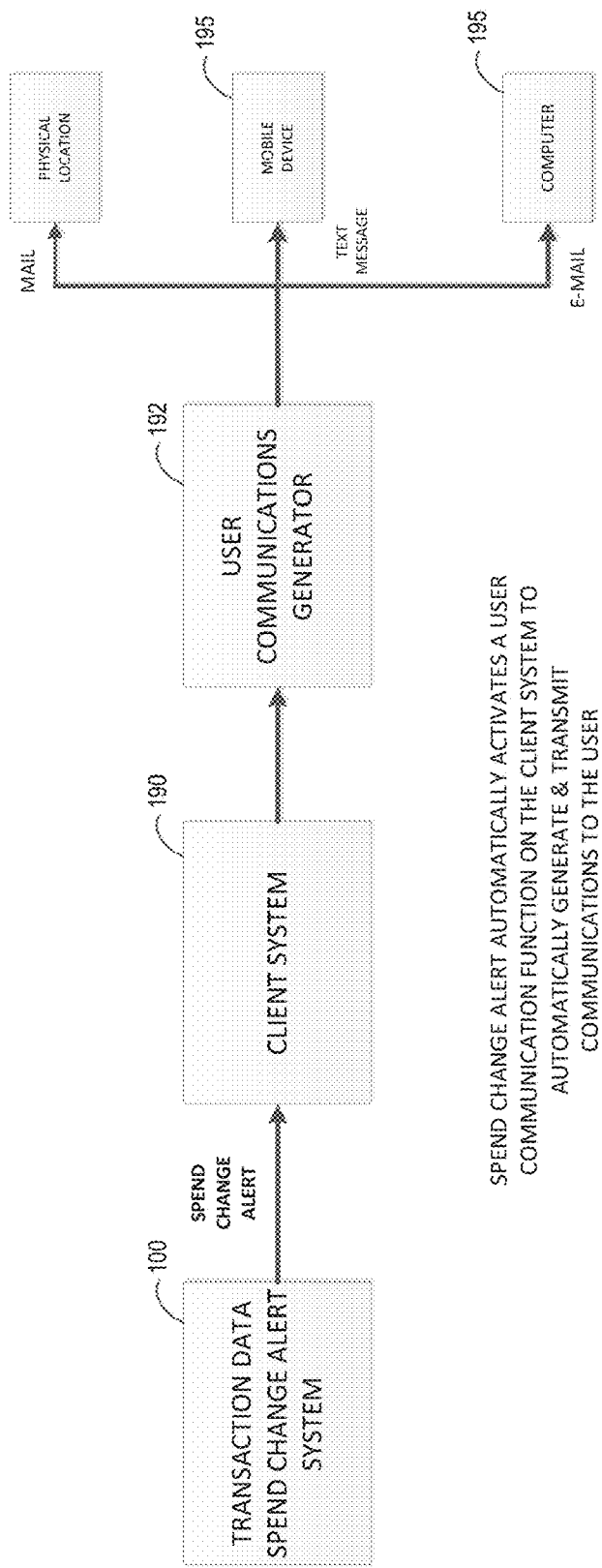
FIG. 7 is a process flow diagram of an example method of transmitting a spend change alert to a client, which in turn, transmits user communications to a user.

FIG. 7 is a block diagram illustrating a spend change alert condition related to transactions for a particular user. The transaction data spend change alert system 100 delivers a spend change alert to a client system 190. In response to receiving the spend change alert, the client system 190 generates one or more user communications to be transmitted to the user, whose transactional behavior has changed. The user communications may be generated by the client system 190 or by a user communications generator 192. The user communications may be transmitted to one or more user systems 195, such as by way of non-limiting example, the user's computer and mobile device. The client system 190 may generate and transmit various forms of communications to the user, such as coupons or notifications providing incentives for the user to engage in transactions. Illustratively, by way of non-limiting example, the user communications can present coupons, offers for discounts, advertisements for specific products or services, and the like. The user communications can relate to products and services in which the user is expected to transact, such as, for example, restaurants, fuel, grocery shopping, and the like to stimulate transactions by the user. FIG. 7 illustrates non-limiting examples of such potential forms of user communications directed to various user systems 195 that include transmission of email messages directed to the user's e-mail account(s), text messages (e.g., SMS or MMS) directed to the user's mobile device, and printed messages directed by postal or other delivery services to the user's home, place of business, or other physical location.

In certain implementations, the spend change alert is operable to automatically activate a user communication service program on the client system 190. The activated user communication service program automatically generates one or more communications directed to the user about whom the spend change alert was transmitted. Generation of the user communications can be informed by the informational content of the spend change alert. The user communications are then automatically transmitted to the user in one or more modes of communication, such as, for example, electronic mail, text messaging, and regular postal mail, to name a few. In certain modes of communication to the user, the user communication may be configured to automatically operate on the user's electronic device. For example, the user's mobile device may, upon receipt of the transmitted user communication, activate a software application installed on the user's mobile device to deliver the user communication to the user. Alternatively, the user communication may activate a web browser and access a web site to present the user communication to the user. In another example, a user communication may be transmitted to a user's email account and, when received, automatically cause the user's device, such as a computer, tablet, or the like, to display the transmitted user communication. In another example, the user may receive from the client a coupon/discount offer in various manners, such as in a billing statement delivered via postal or other delivery service, in a text message to the user's mobile device, and in an email message sent to one or more of the user's email accounts. When the spend change alert is transmitted to the client in response to the user having exceeded an expected time period to engage in a transaction, such offers may be effective because they are provided at a time that the product or service may be purchased by the user.

Example Point-of-Sale Card Reader

Figure 8:
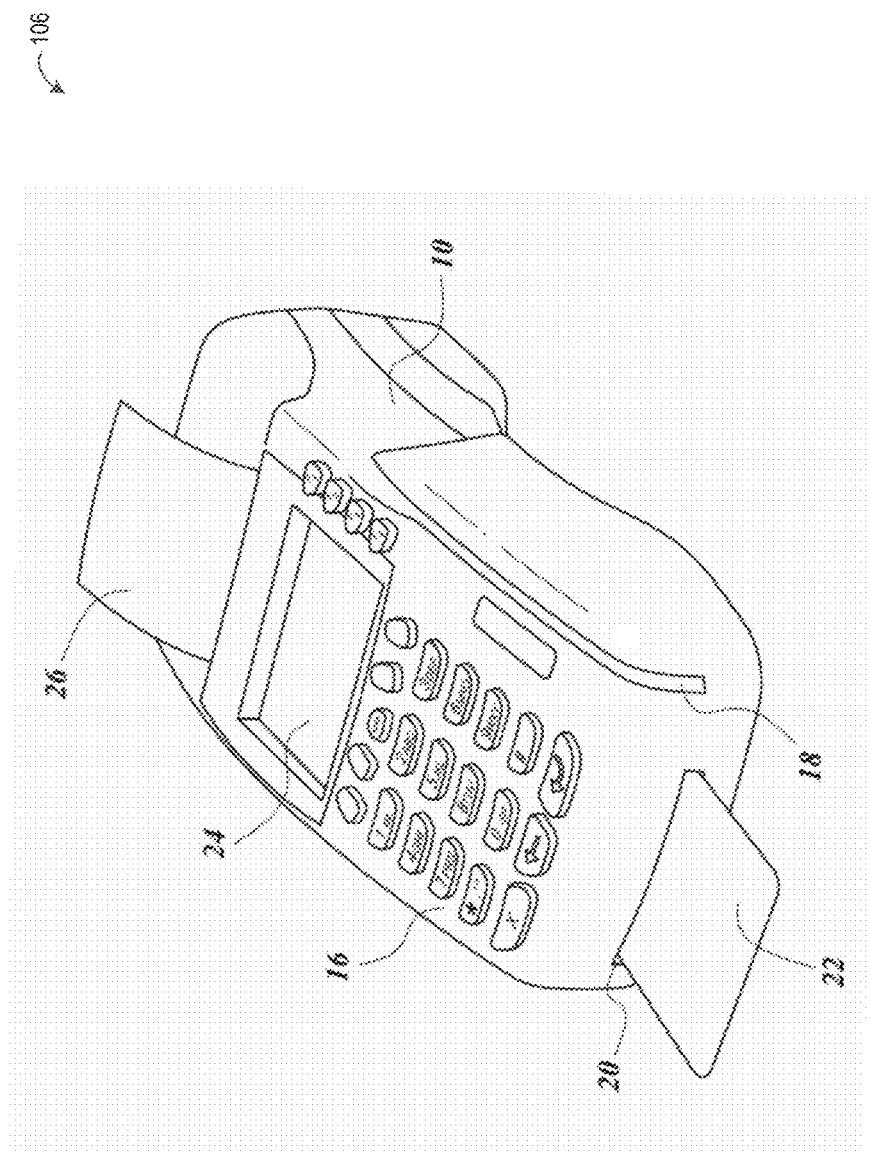
FIG. 8 is a schematic perspective view of an example credit/debit card reader.

FIG. 8 shows a schematic perspective view of an exemplary credit/debit card reader 106. As seen in FIG. 8, a point-of-sale credit/debit card reader 106 includes a housing 10. The housing 10 may enclose transaction circuitry (not shown) and other electronic components to implement one or more of the transaction data spend change alert features described.

The credit/debit card reader 106 includes a keypad 16, which interfaces with the point-of-sale transaction circuitry to provide input signals. The credit/debit card reader 106 also includes a magnetic card reader 18 and a smart card reader 20, which is adapted to receive a smart card 22.

The credit/debit card reader 106 also includes a display 24 and a printer 26 configured to provide output information prior to, during, or after a transaction. In some implementations, the display 24 may present content selected based on transaction data. The content may include single media or multimedia content. The content may be static (e.g., a movie, a text, an image, and/or audio) or dynamically generated. For example, using the transaction data, the card swiped may be identified with a data cluster for sports fans. In such an implementation, the content may be adapted to include sports-centric information such as inserting a team logo into the presented content.

Figure 9:
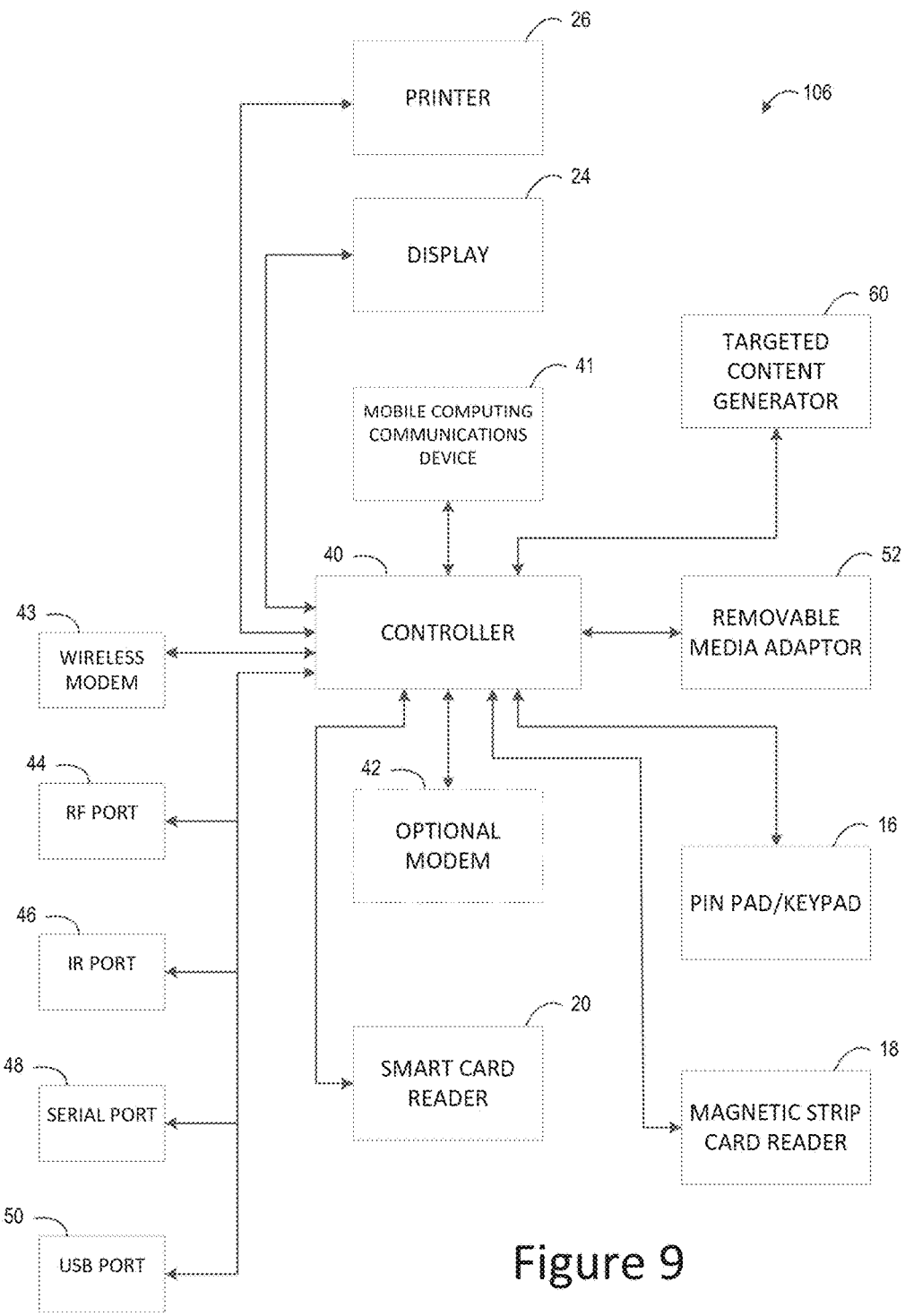
FIG. 9 is a functional block diagram of the example credit/debit card reader of FIG. 8.

FIG. 9 shows a functional block diagram of the exemplary credit/debit card reader 106, including a controller 40 which interfaces with the keypad 16, the display 24, the printer 26, and with a targeted content generator 60. A controller 40, which may include card reader and/or point-of-sale terminal functionality interfaces with the conventional magnetic card reader 18 and, when available, the smart card reader 20. The controller 40 also interfaces with a mobile computing communication device 41 and may interface with an optional modem 42. The mobile computing communication device 41 and the modem 42 may be used by the credit/debit card reader 106 to communicate messages such as between a point-of-sale system or other merchant transaction processing equipment.

The credit/debit card reader 106 shown in FIG. 9 includes a wireless modem 43 and various types of communications points such as an RF port 44, an IR port 46, a serial port 48, and a USB port 50. The communication ports may also be used by the credit/debit card reader 106 to communicate messages as described in this application. A removable media adapter 52 may also interface with the controller 40. Removable media may be employed for storage, archiving, and processing of data relevant to the credit/debit card reader 106 functionality. For example, transaction data may be stored on removable media for transfer, at a later time, to merchant transaction processing equipment.

The targeted content generator 60 may be configured to obtain content and transaction data. Using the transaction data, the targeted content generator 60 may identify one or more elements of obtained content for presentation via one or more of the outputs of the credit/debit card reader 106. For example, the display 24 may be used to show content to a user who presented a card at the credit/debit card reader 106. During the transaction, such as part of the authorization process, a transactional record for the user may be received and processed by the credit/debit card reader 106. By comparing at least a portion of the transaction data to selection criteria associated with the obtained content, the targeted content generator 60 may identify a relevant content element for presentation to the user and cause it to be presented.

Example System Implementation Architecture

FIG. 10 is a block diagram showing example components of a computing system 1000. The computing system 1000 includes, for example, a personal computer that is IBM, Macintosh, or Linux/Unix compatible or a server or workstation. In one embodiment, the computing system 1000 comprises a server, a laptop computer, a smart phone, a personal digital assistant, a kiosk, or a media player, for example. In one embodiment, the computing system 1000 includes one or more central processing unit ("CPU") 1005, which may each include a conventional or proprietary microprocessor. The computing system 1000 further includes one or more memory 1032, such as random access memory ("RAM") for temporary storage of information, one or more read only memory ("ROM") for permanent storage of information, and one or more mass storage device 1022, such as a hard drive, diskette, solid state drive, or optical media storage device. Typically, the components of the computing system 1000 are connected to the computer using a standards-based bus system 1090. In different embodiments, the standards-based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 1000 may be combined into fewer components and modules or further separated into additional components and modules.

The computing system 1000 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the computing system 1000 may be controlled by a proprietary operating system. Conventional operating systems control and schedule computer processes for execution, perform memory management, provide file system, networking, I/O services, and provide a user interface, such as a graphical user interface ("GUI"), among other things.

The computing system 1000 may include one or more commonly available input/output (I/O) devices and interfaces 1012, such as a keyboard, mouse, touchpad, and printer. In one embodiment, the I/O devices and interfaces 1012 include one or more display devices, such as a monitor, that allows the visual presentation of data to a user. More particularly, a display device provides for the presentation of GUIs, application software data, and multimedia presentations, for example. The computing system 1000 may also include one or more multimedia devices 1042, such as speakers, video cards, graphics accelerators, and microphones, for example.

In the embodiment of FIG. 10, the I/O devices and interfaces 1012 may provide a communication interface to various external devices. The computing system 1000 may be electronically coupled to one or more networks, which comprise one or more of a LAN, WAN, and/or the Internet, for example, via a wired, wireless, or combination of wired and wireless, communication link. The networks communicate with various computing devices and/or other electronic devices via wired or wireless communication links, such as the credit bureau repository 102 data sources and the financial institution 104 data sources.

In some embodiments, information may be provided to the computing system 1000 over a network from one or more data sources. The data sources may include one or more internal and/or external data sources that provide transaction data, such as credit issuers (e.g., financial institutions that issue credit cards), transaction processors (e.g., entities that process credit card swipes at points-of-sale), and/or transaction aggregators. The data sources may include internal and external data sources which store, for example, credit bureau data (for example, credit bureau data from File One$^{SM}$) and/or other user data. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 1000, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules. They may be represented in hardware or firmware. Generally, the modules described herein refer to logical modules that may be combined with other modules or divided into sub-modules despite their physical organization or storage.

Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, compact disk read-only memories (CD-ROMs), magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. A computing system operable to access one or more electronic data sources in response to periodic automated inquiries in order to automatically calculate data for inclusion into a report, the computing system comprising:
   a non-transitory storage device configured to store a plurality of event records associated with respective users, each of the event records indicating an event associated with a respective user; and
   a physical processor that is in communication with the non-transitory storage device and that is configured to:
      access the plurality of event records associated with respective users; and
      for each individual event record of at least a subset of the event records, assign a category to the individual event record, the category selected from a plurality of predetermined categories;
      generate a user profile for a particular user, wherein the user profile comprises categorized event records associated with the particular user during a set time period;
      generate a user event frequency distribution model based on at least some of the categorized event records in the user profile of the particular user of a particular category, wherein the user event frequency distribution model predicts a likelihood that the particular user will engage in a future event in the particular category within a specified period of time;
      access the generated user profile for the particular user and the user event frequency distribution model;
      determine a gap for the particular user, the gap indicating a time period since a most recent event associated with the particular category by the particular user occurred;
      determine a gap limit associated with the particular user, the gap limit indicating a period of time by which the particular user is expected to engage in the future event with the predicted likelihood based on the user event frequency distribution model;
      compare the determined gap to the gap limit;
      in response to determining that the gap is greater than the gap limit, trigger generation of an event change alert; and
      transmit, to a client system, the generated event change alert indicating that the particular user has changed event behavior in the particular category.

2. The computing system of claim 1, wherein the physical processor is further configured to:
   determine, in response to determining that the gap is greater than the gap limit, if a filter condition exists; and
   in response to determining that a filter condition does not exist, trigger the generation of the event change alert.

3. The computing system of claim 1, wherein the gap limit is a period of time in which the particular user is expected to make a next event within a ninety-five percent (95%) probability, based on the user event frequency distribution model for the particular user.

4. The computing system of claim 1, wherein the physical processor is further configured to:
   generate a category baseline event frequency distribution model for a particular category, the category baseline event frequency distribution model indicating a likelihood of an event in the particular category by a generic user based on a set of the accessed plurality of event records that are assigned to the particular category; and
update the category baseline event frequency distribution model for the particular category based on a set of the categorized event records of the particular user and associated with the particular category to generate a category-specific user event frequency distribution model.

5. The computing system of claim 4, wherein the physical processor is further configured to:
periodically access event data sources to determine whether there is an additional event record associated with the particular user and associated with the particular category; and
in response to determining that there is an additional event record associated with the particular user and associated with the particular category, update the category-specific user event frequency distribution model based on the determined additional event record.

6. The computing system of claim 4, wherein the physical processor is further configured to:
determine a second gap, indicating a time period since the most recent event by the particular user associated with the particular category occurred;
determine a second gap limit indicating a second expected period of time between events associated with the particular user and associated with the particular category;
compare the second gap to the second gap limit;
in response to determining that the second gap is greater than the second gap limit, trigger generation of a category-specific event change alert; and
transmit, to a client system, the category-specific event change alert.

7. The computing system of claim 1, wherein the physical processor is further configured to:
generate an event frequency distribution model for the additional event record associated with the particular user; and
calculate a weighted sum of the event distribution for the additional event record and the user event frequency distribution model to generate the updated user event frequency distribution model.

8. The computing system of claim 7, wherein the user event frequency distribution model for the additional event record associated with the particular user comprises a distribution having a one hundred percent (100%) probability of occurring within a time period between the most recent event by the particular user and a time of an event associated with the additional event record associated with the particular user.

9. The computing system of claim 7, wherein the user event frequency distribution model for the additional event record associated with the particular user comprises a distribution centered on a time period between the most recent event by the particular user and a time of an event associated with the additional event record.

10. The computing system of claim 1, wherein the physical processor is further configured to generate the event change alert comprising an identification of an event category associated with the event change alert, a number of days since the most recent event by the particular user occurred, and a number of events the particular user has made within a preceding two months.

11. The computing system of claim 1, wherein the physical processor is further configured to:
in response to determining that a filter condition exists, determine whether the filter condition is met; and
in response to determining that a filter condition is not met, generate an event change alert indicating that the gap is greater than the gap limit; and
transmit, to a client system, the event change alert, the event change alert including an identification of an event category associated with the event change alert, a number of days since a last event by the particular user occurred, and a number of events the particular user has made within a preceding two months.

12. The computing system of claim 1, further comprising a card reader in communication with the physical processor, the card reader including:
a payment information detector configured to detect payment information for an event of a user;
a targeted content generator configured to:
receive event data during the event of the user; and
identify content stored by the card reader using a comparison between a content selection rule and the event data, said content for presentation via the card reader; and
a display configured to present the content to the user.

13. A method of automatically generating a transaction frequency change alert, the method comprising:
accessing, from a transaction data store, a plurality of transaction records associated with respective users, the transaction records including attributes of a transaction made by the associated respective user;
accessing, from a categorized transaction data store, a transaction categories data structure including a plurality of transaction categories and, for each transaction category, attribute criteria usable to identify transactions associated with respective transaction categories;
for each of the accessed plurality of transaction records:
identifying one or more of the attributes of the transaction record;
comparing the identified one or more attributes of the transaction record to the attribute criteria of respective transaction categories to identify a transaction category among the plurality of transaction categories that matches the one or more attributes of the transaction record;
categorizing the accessed transaction record with the identified transaction category;
storing, in the categorized transaction data store, a plurality of categorized transaction records;
accessing, from the categorized transaction data store, the plurality of categorized transaction records;
determining, for each user and for each pair of timewise consecutive transactions of the user based on the accessed plurality of categorized transaction records, a time between transactions;
identifying, from the accessed plurality of categorized transaction records, a first plurality of categorized transaction records associated with a first user;
generate a first user transaction frequency distribution model based on at least some of the categorized transaction records associated with the first user of a particular category, wherein the first user transaction frequency distribution model predicts a likelihood that the first user will engage in a future transaction in the particular category within a specified period of time;
accessing the first user transaction frequency distribution model;

determining a time duration since a most recent transaction by the first user occurred associated with the particular category and comparing the determined time duration to a threshold period of time associated with the first user, the threshold period of time indicating a period of time by which the first user is expected to engage in the future transaction with the predicted likelihood;

in response to determining that the time duration is greater than the threshold period of time, triggering generation of a spend change alert; and transmitting, to a client system, the generated spend change alert.

14. The method of claim 13, wherein determining a time duration since a last transaction by the first user occurred and comparing the determined time duration to a threshold period of time comprises using a threshold period of time based on the first user transaction frequency distribution model.

15. The method of claim 13, further comprising:

generating a baseline transaction frequency distribution model for a particular category, the baseline transaction frequency distribution model indicating a likelihood of a transaction in the particular category by a generic user, the model based on a set of the accessed plurality of categorized transaction records that are categorized to the particular category;

identifying, from the first plurality of categorized transaction records associated with the first user, a second plurality of categorized transaction records that are categorized to the particular category; and updating the baseline transaction frequency distribution model for the particular category based on the second plurality of categorized transaction records that are categorized to the particular category to generate a first user category-specific transaction frequency distribution model.

16. The method of claim 15, further comprising:

determining a second time duration since the most recent transaction associated with the category by the first user occurred and a present time and comparing the second time duration to a category-specific threshold period of time indicating a second expected period of time between transactions by the first user in the particular category; and in response to determining that the second time duration is greater than the category-specific threshold period of time, generating a spend change alert indicating that the second time duration is greater than the category-specific threshold period of time.

17. The method of claim 13, wherein updating the first user transaction frequency distribution model based on the additional categorized transaction record comprises:

generating a transaction frequency distribution model for the additional categorized transaction record associated with the first user which has not been analyzed; and calculating a weighted sum of the generated transaction frequency distribution model for the additional transaction record and the first user transaction frequency distribution model to generate the updated first user transaction frequency distribution model.

18. The method of claim 17, wherein generating a transaction frequency distribution model for the additional categorized transaction record associated with the first user which has not been analyzed comprises generating a distribution having a one hundred percent (100%) probability of occurring within a time period between the most recent transaction by the first user and a time of a transaction associated with the additional transaction record associated with the first user.

19. The method of claim 17, wherein generating a transaction frequency distribution model for the additional categorized transaction record associated with the first user which has not been analyzed by the system comprises generating a distribution centered on a time period between the most recent transaction by the first user and a time of a transaction associated with the additional transaction record associated with the first user.

* * * * *